United States Patent
Lee et al.

(10) Patent No.: US 9,307,525 B2
(45) Date of Patent: Apr. 5, 2016

(54) METHOD AND USER EQUIPMENT FOR TRANSMITTING UPLINK CONTROL INFORMATION, AND METHOD AND BASE STATION FOR RECEIVING UPLINK CONTROL INFORMATION

(75) Inventors: Hyunwoo Lee, Anyang-Si (KR); Sungho Moon, Anyang-si (KR); Jaehoon Chung, Anyang-Si (KR); Seunghee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 229 days.

(21) Appl. No.: 13/989,670

(22) PCT Filed: Nov. 22, 2011

(86) PCT No.: PCT/KR2011/008903
§ 371 (c)(1),
(2), (4) Date: Jul. 5, 2013

(87) PCT Pub. No.: WO2012/070831
PCT Pub. Date: May 31, 2012

(65) Prior Publication Data
US 2013/0279459 A1    Oct. 24, 2013

Related U.S. Application Data

(60) Provisional application No. 61/416,747, filed on Nov. 24, 2010, provisional application No. 61/422,663, filed on Dec. 14, 2010, provisional application No. 61/427,481, filed on Dec. 28, 2010.

(30) Foreign Application Priority Data

Mar. 31, 2011 (KR) .................. 10-2011-0029917

(51) Int. Cl.
*H04W 4/00* (2009.01)
*H04W 72/04* (2009.01)
(Continued)

(52) U.S. Cl.
CPC ......... *H04W 72/0413* (2013.01); *H04L 1/0029* (2013.01); *H04L 1/1607* (2013.01);
(Continued)

(58) Field of Classification Search
USPC .......................... 370/329, 280, 281, 311, 336
See application file for complete search history.

(56) References Cited

U.S. PATENT DOCUMENTS

2010/0172290 A1    7/2010    Nam et al.
2010/0232382 A1    9/2010    Gauvreau et al.
(Continued)

FOREIGN PATENT DOCUMENTS

CN    101299629 A    11/2008
CN    101588224 A    11/2009
(Continued)

OTHER PUBLICATIONS

Fujitsu, "Channel Selection for A/N feedback in CA", 3GPP TSG-RAN1 #62, R1-104875, Aug. 23-27, 2010, 6 pages provided.
(Continued)

*Primary Examiner* — Phuongchau Ba Nguyen
(74) *Attorney, Agent, or Firm* — Birch, Stewart, Kolasch & Birch, LLP

(57) ABSTRACT

In the present invention, when a user equipment (UE) transmits ACK/NACK information of multiple CCs to a base station (BS), ACK/NACK responses of one CC detected in the order of [ACK, ACK, ACK, ACK], and other ACK/NACK responses of the CC detected in the order of [ACK, DTX, DTX, DTX] are treated to be the same. According to the present invention, control information can be effectively transmitted in a wireless system.

8 Claims, 32 Drawing Sheets

| Case | ACK/NACK responses for first CC | ACK/NACK responses for second CC | Resource: $n^{(1)}_{PUCCHi}$ | Constellation: a0,a1 |
|---|---|---|---|---|
| 1 | A,A,A,A | A,A,A,A | $n^{(1)}_{PUCCH2}$ | 1,0 |
| 2 | A,A,A,A | A,A,A,N/D | $n^{(1)}_{PUCCH3}$ | 1,1 |
| 3 | A,A,A,A | A,A,N/D,any | $n^{(1)}_{PUCCH0}$ | 0,1 |
| 4 | A,A,A,A | A,D,D,D | $n^{(1)}_{PUCCH2}$ | 1,0 |
| ... | ... | ... | ... | ... |
| 7 | A,A,A,N/D | A,A,A,A | $n^{(1)}_{PUCCH2}$ | 1,1 |
| ... | ... | ... | ... | ... |
| 10 | A,A,A,N/D | A,D,D,D | $n^{(1)}_{PUCCH2}$ | 1,1 |
| ... | ... | ... | ... | ... |
| 13 | A,A,N/D,any | A,A,A,A | $n^{(1)}_{PUCCH2}$ | 0,1 |
| ... | ... | ... | ... | ... |
| 16 | A,A,N/D,any | A,D,D,D | $n^{(1)}_{PUCCH2}$ | 0,1 |
| ... | ... | ... | ... | ... |
| 19 | A,D,D,D | A,A,A,A | $n^{(1)}_{PUCCH2}$ | 1,0 |
| 20 | A,D,D,D | A,A,A,N/D | $n^{(1)}_{PUCCH3}$ | 1,1 |
| 21 | A,D,D,D | A,A,N/D,any | $n^{(1)}_{PUCCH0}$ | 0,1 |
| 22 | A,D,D,D | A,D,D,D | $n^{(1)}_{PUCCH2}$ | 1,0 |
| ... | ... | ... | ... | ... |

(51) Int. Cl.
*H04L 1/00* (2006.01)
*H04L 1/16* (2006.01)
*H04L 5/00* (2006.01)

(52) U.S. Cl.
CPC ............. *H04L 5/001* (2013.01); *H04L 5/0053* (2013.01); *H04L 5/0055* (2013.01); *H04L 5/0091* (2013.01); *H04L 5/0007* (2013.01)

(56) References Cited

U.S. PATENT DOCUMENTS

| | | | |
|---|---|---|---|
| 2011/0090825 A1* | 4/2011 | Papasakellariou et al. ... | 370/280 |
| 2011/0134968 A1 | 6/2011 | Han et al. | |
| 2011/0268001 A1 | 11/2011 | Lee et al. | |
| 2012/0113948 A1 | 5/2012 | Kwon et al. | |
| 2012/0127869 A1* | 5/2012 | Yin et al. ............. | 370/252 |
| 2013/0148610 A1* | 6/2013 | Berggren et al. ............. | 370/329 |
| 2015/0055606 A1* | 2/2015 | Yang et al. ............. | 370/329 |

FOREIGN PATENT DOCUMENTS

| | | |
|---|---|---|
| KR | 10-2010-0019946 A | 2/2010 |
| KR | 10-2011-0007591 A | 1/2011 |
| WO | WO 2010/114252 A2 | 10/2010 |

OTHER PUBLICATIONS

LG Electronics, "ACK/NACK channel selection mapping for LTE-A", 3GPP TSG RAN WG1 #62 bis, R1-105338, Oct. 11-15, 2010, 11 pages provided.

Nokia Siemens Networks et al., "Mapping table and other remaining details for Format 1b with Channel Selection", 3GPP TSG RAN WG1 Meeting #62bis, R1-105520, Oct. 11-15, 2010, 6 pages provided.

Samsung, "UL HARQ-ACK Multiplexing: Mapping for 4 Bits", 3GPP TsSG RAN WG1 #62, R1-104577, Aug. 23-28, 2010, 3 pages provided.

Huawei et al., "Remaining details on PUCCH format 3 for LTE-A TDD", 3GPP TSG RAN WG1, R1-105831, Nov. 15-19, 2010, 5 pages.

3rd Generation Partnership Project, "Technical Specification Group Radio Access Network; Evolved Universal Terrestrial Radio Access (E-UTRA); Physical Layer Procedures (Release 10)," 3GPP TS 36.213, V10.1.0, Technical Specification, Mar. 2011, pp. 1-115.

\* cited by examiner

Fig. 3
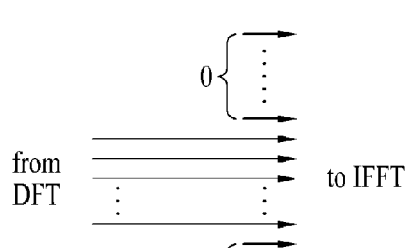
(a)
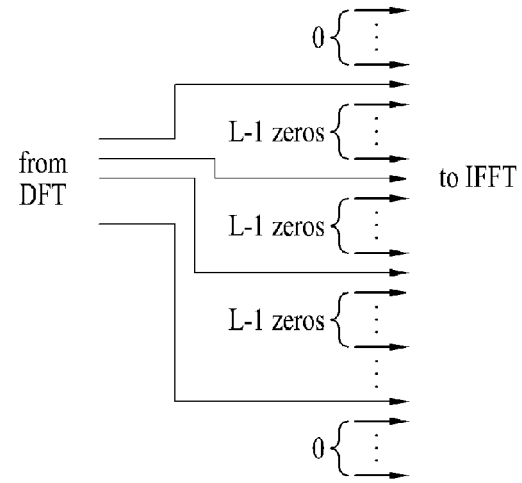
(b)

Fig. 11
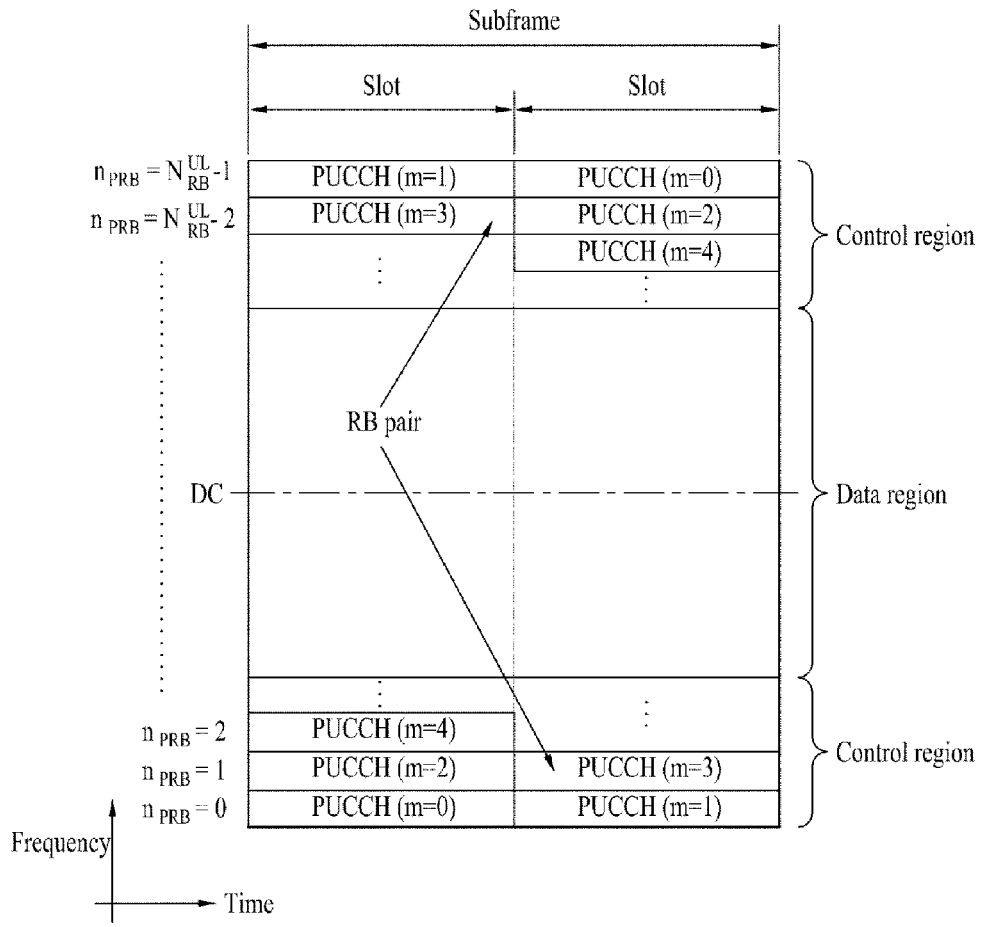
[Fig. 12]
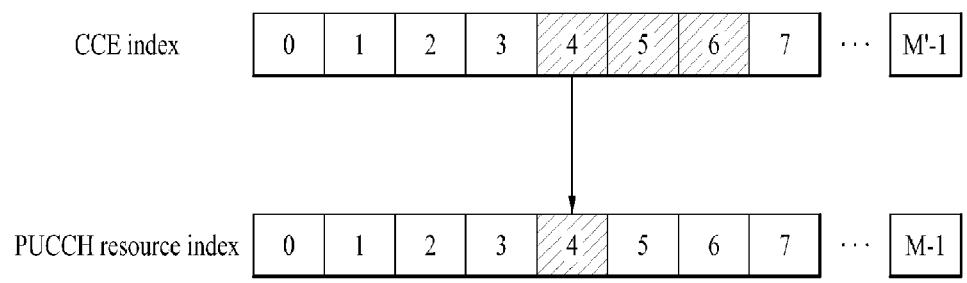

Fig. 13
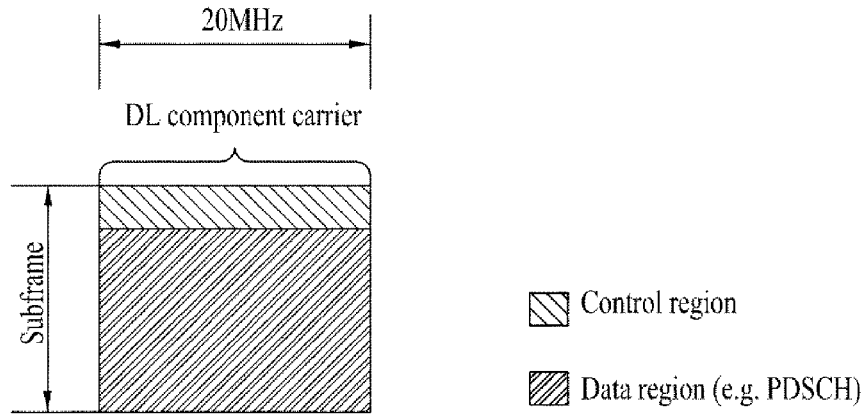
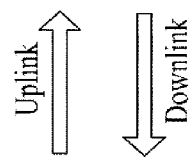
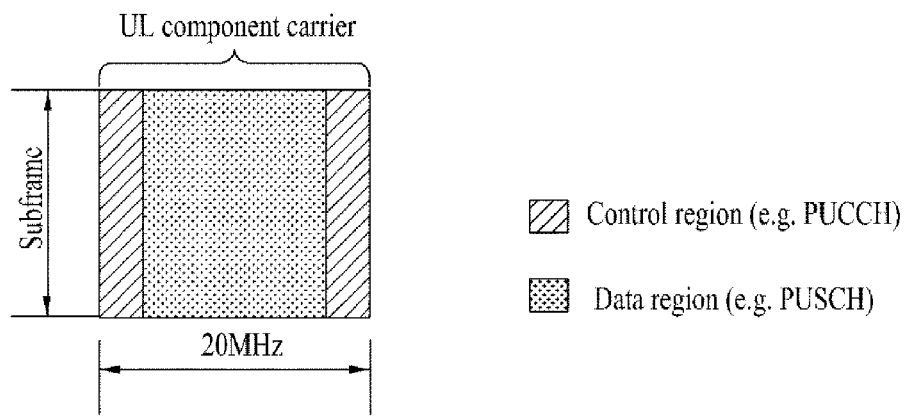
Single component carrier (e.g. LTE system)

PUCCH format 1a and 1b structure (normal CP case)

PUCCH format 1a and 1b structure (extended CP case)

Fig. 39

| Case | ACK/NACK responses for first CC | ACK/NACK responses for second CC | Resource: $n^{(1)}_{PUCCH,i}$ | Constellation: a0,a1 |
|---|---|---|---|---|
| 1 | A,A,A,A | A,A,A,A | $n^{(1)}_{PUCCH2}$ | 1,0 |
| 2 | A,A,A,A | A,A,A,N/D | $n^{(1)}_{PUCCH3}$ | 1,1 |
| 3 | A,A,A,A | A,A,N/D,any | $n^{(1)}_{PUCCH0}$ | 0,1 |
| 4 | A,A,A,A | A,D,D,D | $n^{(1)}_{PUCCH2}$ | 1,0 |
| ⋮ | | | | |
| 7 | A,A,A,N/D | A,A,A,A | $n^{(1)}_{PUCCH2}$ | 1,1 |
| ⋮ | | | | |
| 10 | A,A,A,N/D | A,D,D,D | $n^{(1)}_{PUCCH2}$ | 1,1 |
| ⋮ | | | | |
| 13 | A,A,N/D,any | A,A,A,A | $n^{(1)}_{PUCCH2}$ | 0,1 |
| ⋮ | | | | |
| 16 | A,A,N/D,any | A,D,D,D | $n^{(1)}_{PUCCH2}$ | 0,1 |
| ⋮ | | | | |
| 19 | A,D,D,D | A,A,A,A | $n^{(1)}_{PUCCH2}$ | 1,0 |
| 20 | A,D,D,D | A,A,A,N/D | $n^{(1)}_{PUCCH3}$ | 1,1 |
| 21 | A,D,D,D | A,A,N/D,any | $n^{(1)}_{PUCCH0}$ | 0,1 |
| 22 | A,D,D,D | A,D,D,D | $n^{(1)}_{PUCCH2}$ | 1,0 |
| ⋮ | | | | |

METHOD AND USER EQUIPMENT FOR TRANSMITTING UPLINK CONTROL INFORMATION, AND METHOD AND BASE STATION FOR RECEIVING UPLINK CONTROL INFORMATION

CROSS REFERENCE TO RELATED APPLICATIONS

This application is the National Phase of PCT/KR2011/008903 filed on Nov. 22, 2011, which claims priority under 35 U.S.C. §119(e) to U.S. Provisional Application Nos. 61/416,747 filed on Nov. 24, 2010, 61/422,663 filed on Dec. 14, 2010, 61/427,481 filed on Dec. 28, 2010, and under 35 U.S.C. §119(a) to Patent Application No. 10-2011-0029917 filed in the Republic of Korea on Mar. 31, 2011, all of which are hereby expressly incorporated by reference into the present application.

TECHNICAL FIELD

The present invention relates to a wireless communication system, and more particularly to a method and apparatus for transmitting uplink control information.

BACKGROUND ART

Wireless communication systems are widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi-Carrier Frequency Division Multiple Access (MC-FDMA) system, and the like.

DISCLOSURE OF INVENTION

Technical Problem

An object of the present invention is to provide a method and apparatus for effectively transmitting control information in a wireless communication system. Another object of the present invention is to provide a channel format and signaling processing to efficiently transmit control information, and an apparatus for the same. Another object of the present invention is to provide a method and apparatus for efficiently allocating resources used for transmitting control information.

It is to be understood that objects to be achieved by the present invention are not limited to the aforementioned objects and other objects which are not mentioned will be apparent to those of ordinary skill in the art to which the present invention pertains from the following description.

Solution to Problem

The object of the present invention can be achieved by providing a method for transmitting, by a user equipment (UE), uplink control information to a base station (BS) in a wireless communication system, the method comprising: detecting 4 first ACK (ACKnowledgement)/NACK (Negative ACK)/DTX (Discontinuous Transmission) responses [x(0), x(1), x(2), x(3)] for 4 downlink (DL) transmissions on a first carrier, where x(i), 0≤i≤3, is an ACK/NACK/DTX response for i-th DL transmission on the first carrier; detecting 4 second ACK/NACK/DTX responses [y(0), y(1), y(2), y(3)] for 4 DL transmissions on a second carrier, where y(i), 0≤i≤3, is an ACK/NACK/DTX response for i-th DL transmission on the second carrier; performing channel selection, by selecting one of a plurality of physical uplink control channel (PUCCH) resources and generating transmission bits, based on [x(0), x(1), x(2), x(3)] and [y(0), y(1), y(2), y(3)]; and transmitting the generated transmission bits on the selected PUCCH resource, wherein when [y(0), y(1), y(2), y(3)] is the same, the same transmission bits are generated for [x(0), x(1), x(2), x(3)]=[ACK, ACK, ACK, ACK] and for [x(0), x(1), x(2), x(3)]=[ACK, DTX, DTX, DTX].

In another aspect of the present invention, a user equipment (UE) for transmitting uplink (UL) control information to a base station (BS) in a wireless communication system includes a receiver, a transmitter, and a processor configured to control the receiver and the transmitter. The processor is configured to control the receiver to detect 4 first ACK (ACKnowledgement)/NACK (Negative ACK)/DTX (Discontinuous Transmission) responses [x(0), x(1), x(2), x(3)] for 4 downlink (DL) transmissions on a first carrier, where x(i), 0≤i≤3, is an ACK/NACK/DTX response for i-th DL transmission on the first carrier, and detect 4 second ACK/NACK/DTX responses [y(0), y(1), y(2), y(3)] for 4 DL transmissions on a second carrier, where y(i), 0≤i≤3, is an ACK/NACK/DTX response for i-th DL transmission on the second carrier. The processor is configured to perform channel selection by selecting one of a plurality of physical uplink control channel (PUCCH) resources and generating transmission bits, based on [x(0), x(1), x(2), x(3)] and [y(0), y(1), y(2), y(3)]. The processor is configured to control the transmitter to transmit the generated transmission bits on the selected PUCCH resource. When [y(0), y(1), y(2), y(3)] is the same, the same transmission bits are generated for [x(0), x(1), x(2), x(3)]=[ACK, ACK, ACK, ACK] and for [x(0), x(1), x(2), x(3)]=[ACK, DTX, DTX, DTX].

In another aspect of the present invention, a method for receiving, by a base station (BS), uplink (UL) control information from a user equipment (UE) in a wireless communication system, the method comprising: transmitting a first carrier and a second carrier to the user equipment (UE); receiving, from the user equipment (UE), transmission bits on one of a plurality of physical uplink control channel (PUCCH) resources; determining first ACK (ACKnowledgement)/NACK (Negative ACK)/DTX (Discontinuous Transmission) responses [x(0), x(1), x(2), x(3)] for the first carrier, where x(i), 0≤i≤3, is an ACK/NACK/DTX response for i-th DL transmission on the first carrier, and second ACK/NACK/DTX responses [y(0), y(1), y(2), y(3)] for the second carrier, where y(i), 0≤i≤3, is an ACK/NACK/DTX response for i-th DL transmission on the second carrier, based on the transmission bits and the PUCCH resource on which the transmission bits are received.

In another aspect of the present invention, a base station (BS) for receiving uplink (UL) control information from a user equipment (UE) in a wireless communication system includes a receiver, a transmitter, and a processor configured to control the receiver and the transmitter. the processor is configured to control the transmitter to transmit a first carrier and a second carrier to the user equipment (UE), and control the receiver to receive transmission bits on one of a plurality of physical uplink control channel (PUCCH) resources. The processor is configured to determine, based on the transmission bits and the PUCCH resource on which the transmission bits are received, first ACK (ACKnowledgement)/NACK (Negative ACK)/DTX (Discontinuous Transmission) responses [x(0), x(1), x(2), x(3)] for the first carrier, where x(i) is an ACK/NACK/DTX response for i-th DL transmission on the first carrier, and second ACK/NACK/DTX responses [y(0), y(1), y(2), y(3)] for the second carrier, where y(i) is an ACK/NACK/DTX response for i-th DL transmission on the second carrier.

In each aspect of the present invention, when the [y(0), y(1), y(2), y(3)] is the same, the same PUCCH resource is selected for [x(0), x(1), x(2), x(3)]=[ACK, ACK, ACK, ACK] and for [x(0), x(1), x(2), x(3)]=[ACK, DTX, DTX, DTX].

In each aspect of the present invention, the same transmission bits may be generated for cases shown in the following table:

TABLE

| Case | x(0), x(1), x(2), x(3) | y(0), y(1), y(2), y(3) |
|---|---|---|
| 1 | ACK, ACK, ACK, ACK | ACK, ACK, ACK, ACK |
| 2 | ACK, ACK, ACK, ACK | ACK, DTX, DTX, DTX |
| 3 | ACK, DTX, DTX, DTX | ACK, ACK, ACK, ACK |
| 4 | ACK, DTX, DTX, DTX | ACK, DTX, DTX, DTX |

In each aspect of the present invention, the same PUCCH resources may be selected for the cases 1 to 4.

In each aspect of the present invention, one of the first carrier and the second carrier may be a primary cell (PCell) and the other carrier may be a secondary cell (SCell).

In each aspect of the present invention, the user equipment (UE) may perform the channel selection according to a mapping table. The BS may determine the first ACK/NACK/DTX responses and the second ACK/NACK/DTX responses using the mapping table. The mapping table may include mapping relationship shown in the following table:

TABLE

| ACK/NACK/DTX responses for primary carrier | ACK/NACK/DTX responses for secondary carrier | PUCCH resource | a0, a1 |
|---|---|---|---|
| ACK, ACK, ACK, ACK | ACK, ACK, ACK, ACK | $n^{(1)}_{PUCCH2}$ | 1, 0 |
| ACK, ACK, ACK, ACK | ACK, ACK, ACK, NACK/DTX | $n^{(1)}_{PUCCH3}$ | 1, 1 |
| ACK, ACK, ACK, ACK | ACK, ACK, NACK/DTX, any | $n^{(1)}_{PUCCH0}$ | 0, 1 |
| ACK, ACK, ACK, ACK | ACK, DTX, DTX, DTX | $n^{(1)}_{PUCCH2}$ | 1, 0 |
| ACK, ACK, ACK, NACK/DTX | ACK, ACK, ACK, ACK | $n^{(1)}_{PUCCH2}$ | 1, 1 |
| ACK, ACK, ACK, NACK/DTX | ACK, DTX, DTX, DTX | $n^{(1)}_{PUCCH2}$ | 1, 1 |
| ACK, ACK, NACK/DTX, any | ACK, ACK, ACK, ACK | $n^{(1)}_{PUCCH2}$ | 0, 1 |
| ACK, ACK, NACK/DTX, any | ACK, DTX, DTX, DTX | $n^{(1)}_{PUCCH2}$ | 0, 1 |
| ACK, DTX, DTX, DTX | ACK, ACK, ACK, ACK | $n^{(1)}_{PUCCH2}$ | 1, 0 |
| ACK, DTX, DTX, DTX | ACK, ACK, ACK, NACK/DTX | $n^{(1)}_{PUCCH3}$ | 1, 1 |
| ACK, DTX, DTX, DTX | ACK, ACK, NACK/DTX, any | $n^{(1)}_{PUCCH0}$ | 0, 1 |
| ACK, DTX, DTX, DTX | ACK, DTX, DTX, DTX | $n^{(1)}_{PUCCH2}$ | 1, 0 | wherein $n^{(1)}_{PUCCHi}$ is a PUCCH resource i ($0 \leq i \leq 3$) from among the plurality of PUCCH resources, and a0, a1 indicates transmission bits or constellation.

The aforementioned technical solutions are only a part of the embodiments of the present invention, and various modifications to which technical features of the present invention are applied could be understood by those of ordinary skill in the art to which the present invention pertains, based on the following detailed description of the present invention.

Advantageous Effects of Invention

As is apparent from the above description, exemplary embodiments of the present invention have the following effects. In accordance with the embodiments of the present invention, control information can be effectively transmitted in a wireless system. In addition, the embodiments of the present invention can provide a channel format and a signal processing method to effectively transmit control information. In addition, resources for transmitting control information can be effectively assigned.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 shows examples for satisfying single carrier characteristics and mapping an input symbol to a subcarrier in a frequency domain;

FIG. 11 shows an example of a UL subframe structure for use in a wireless communication system;

FIG. 12 shows an example for deciding PUCCH resources for ACK/NACK;

FIG. 13 shows exemplary communication under a single carrier situation;

FIG. 39 illustrates some parts of Table 34.

MODE FOR THE INVENTION

Figure 1:
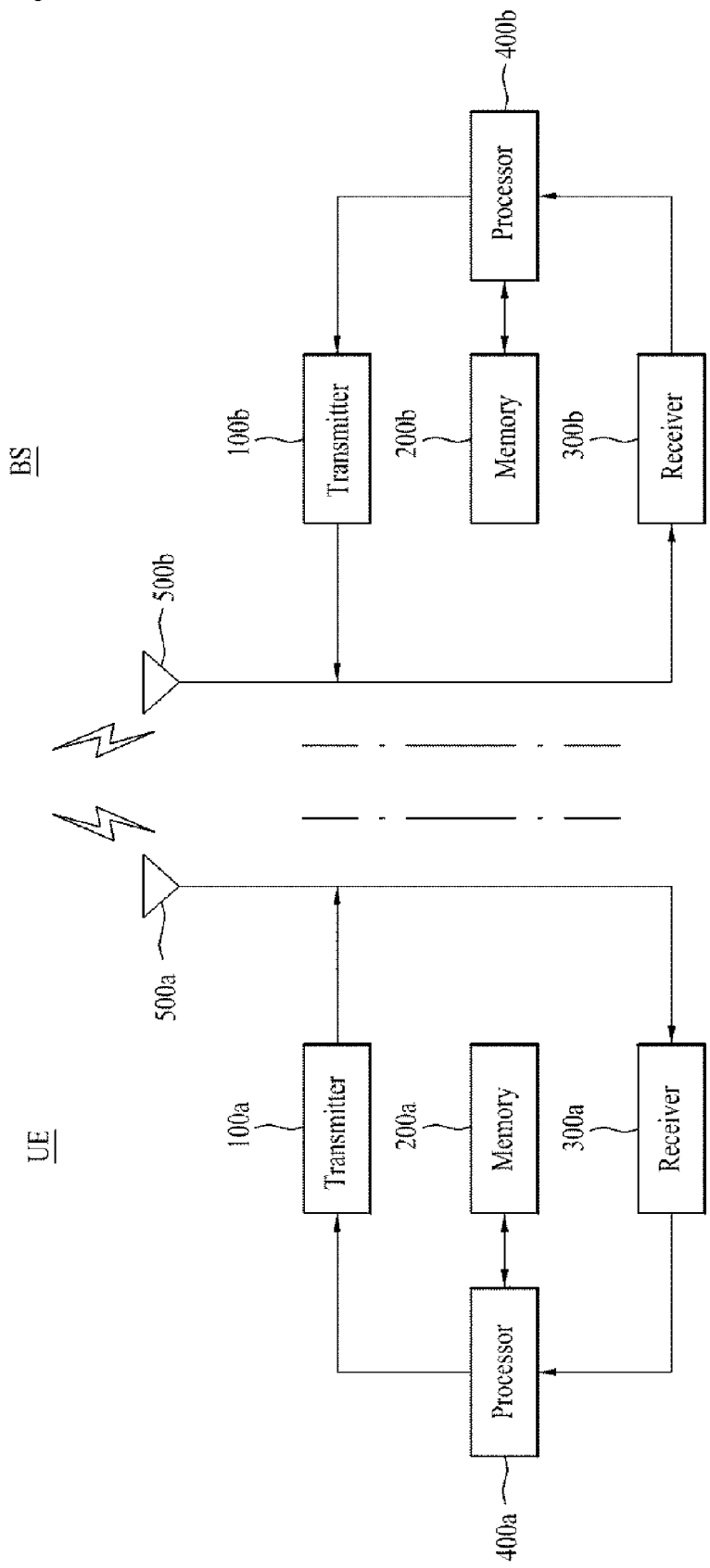
FIG. 1 is a block diagram of a UE and a BS for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatus and systems described herein can be used in various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, Evolved-UTRA (E-UTRA) etc. The UTRA is a part of a Universal Mobile Telecommunication System (UMTS). 3rd Generation Partnership Project (3GPP) Long Term Evolution (LTE) is a part of an Evolved-UMTS (E-UMTS) using the E-UTRA. The 3GPP LTE employs the OFDMA in downlink (DL) and employs the SC-FDMA in uplink (UL). LTE-Advance (LTE-A) is an evolution of the 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description can be applied to other mobile communication systems except unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a User Equipment (UE) denotes a mobile or fixed type user terminal. Examples of the UE include various equipments that transmit and receive user data and/or various kinds of control information to and from a base station. The UE may be referred to as, a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. Also, in the present invention, a Base Station (BS) means a fixed station that performs communication with a user equipment and/or another base station, and exchanges various kinds of data and control information with the user equipment and another base station. The base station may be referred to another terminology such as an EvolvedNodeB (eNB), a Base Transceiver System (BTS), and an Access Point (AP).

In the present invention, if a specific signal is allocated to a frame, subframe, slot, symbol, carrier, or subcarrier, it means that the specific signal is transmitted through the corresponding carrier or subcarrier during a period/timing of the corresponding frame, subframe, slot or symbol.

In the present invention, a rank or a transmission rank may indicate the number of layers multiplexed/allocated to one OFDM symbol or one data resource element (RE).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

On the other hand, in the present invention, ACK/NACK information mapping to a specific constellation point may be conceptually identical to ACK/NACK information mapping to a specific complex modulation symbol.

FIG. 1 is a block diagram of a UE and a BS for implementing the present invention.

The UE serves as a transmitter on the uplink and as a receiver on the downlink. In contrast, the BS may serve as a receiver on the uplink and as a transmitter on the downlink.

The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components on separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver or a Radio Frequency (RF) module in the UE or the BS.

The antennas 500a and 500b transmit signals generated from the transmitters 100a and 100b to the outside, or transfer radio signals received from the outside to the receivers 300a and 300b. The antennas 500a and 500b may be referred as antenna ports. Each antenna port may correspond to one physical antenna or may be configured into a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to derive a channel estimation for that antenna port, regardless of whether it represents a single radio channel from one physical antenna or a composite channel from a plurality of physical antenna elements together comprising the antenna port. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame variable control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be configured in hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected to the processors 400a and 400b and transmitted to the outside, and then transfer the modulated signals and/or data to the antennas 500a and 500b. For example, the transmitters 100a and 100b convert a transmission data stream to K layers by demultiplexing, channel coding, modulation, etc. The K layers are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

The memories 200a and 200b may store programs required for signal processing and controlling of the processors 400a and 400b and temporarily store input and output information. The memories 200a and 200b may store predefined codebooks with respect to each rank. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 2:
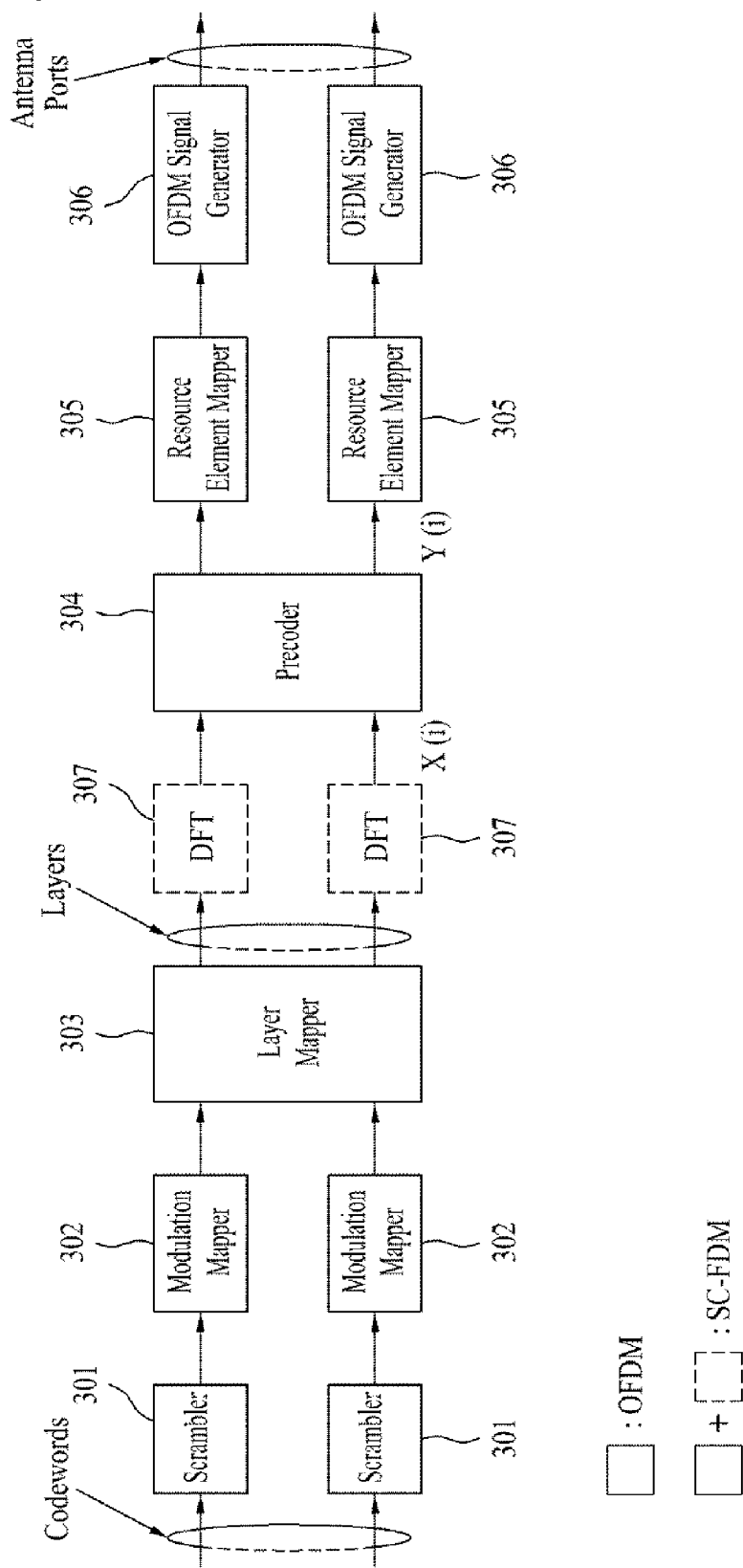
FIG. 2 is a block diagram of an exemplary transmitter in each of the UE and the BS.

FIG. 2 is a block diagram of an exemplary transmitter in each of the UE and the BS. Operations of the transmitters 100a and 100b will be described below in more detail with reference to FIG. 2.

Referring to FIG. 2, each of the transmitters 100a and 100b include scramblers 301, modulation mappers 302, a layer mapper 303, a precoder 304, RE mappers 305, Orthogonal Frequency Division Multiplexing (OFDM) signal generators 306.

The transmitters 100a and 100b may transmit more than one codeword. The scramblers 301 scramble the coded bits of each codeword, for transmission on a physical channel. A codeword may be referred to as a data stream and is equivalent to a data block from the MAC layer. The data block from the MAC layer is referred to as a transport block.

The modulation mappers 302 modulate the scrambled bits, thus producing complex modulation symbols. The modulation mappers 302 modulate the scrambled bits to complex modulation symbols representing positions on a signal constellation in a predetermined modulation scheme. The modulation scheme may be, but not limited to, any of m-Phase Shift Keying (m-PSK) and m-Quadrature Amplitude Modulation (m-QAM).

The layer mapper 303 maps the complex modulation symbols to one or several transmission layers.

The precoder 304 may precode the complex modulation symbols on each layer, for transmission through the antenna ports. More specifically, the precoder 304 generates antenna-specific symbols by processing the complex modulation symbols for multiple transmission antennas 500-1 to 500-N, in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t*M_t$ precoding matrix W and output the resulting product in the form of an $N_t*M_F$ matrix z.

The RE mappers 305 map/allocate the complex modulation symbols for the respective antenna ports to REs. The RE mappers 305 may allocate the complex modulation symbols for the respective antenna ports to appropriate subcarriers, and may multiplex them according to users.

The OFDM signal generators 306 modulate the complex modulation symbols for the respective antenna ports, that is, the antenna-specific symbols through OFDM or SC-FDM modulation, thereby producing a complex time-domain OFDM or SC-FDM symbol signal. The OFDM signal generators 306 may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-N, to a receiver after digital-to-analog conversion, frequency upconversion, etc. The OFDM signal generators 306 may include an IFFT module, a CP inserter, a Digital-to-Analog Converter (DAC), a frequency upconverter, etc.

On the other hand, if the transmitter 100a or 100b applies the SC-FDMA scheme to codeword transmission, the transmitter 100a or 100b may include a Discrete Fourier Transform (DFT) module 307 (or Fast Fourier Transform (FFT) module). The DFT module 307 performs DFT or FFT (hereinafter referred to as DFT/FFT) on the antenna specific symbol, and outputs the DFT/FFT symbol to the resource element mapper 305. In this case, Single Carrier FDMA (SC-FDMA), and a Peak-to-Average Power Ratio (PAPR) or Cubic Metric (CM) of a transmission signal may be reduced and transmitted. In accordance with the SC-FDMA, the transmission signal may be transmitted without overlapping with a non-linear distortion section of a power amplifier. Therefore, although the transmitter transmits signals at a power level lower than that of the conventional OFDM scheme, the receiver is able to receive signals that satisfy a predetermined strength or an error rate. That is, according to the SC-FDMA, power consumption of the transmitter can be reduced.

The conventional OFDM signal generator has a disadvantage in that signals of individual subcarriers are MCM (Multi Carrier modulation)-processed and simultaneously transmitted in parallel while passing through the IFFT, resulting in reduction in efficiency of the power amplifier. In contrast, the SC-FDMA may first perform DFT/FFT of information before mapping signals to subcarriers. PAPRs of the output signals of the DFT/FFT module 307 are increased due to the DFT/FFT effect. The DFT/FFT signals are mapped to subcarriers by the resource element mapper 305, are IFFT-processed, and are then converted into a time-domain signal. That is, the SC-FDMA transmitter may further perform the DFT or FFT operation before performing the OFDM signal generator processing, such that PAPR is increased at an IFFT input terminal such that a PAPR of the final transmission signal is reduced through the IFFT. The above-mentioned format is identical to a DFT module (or FFT module) 307 added to the front of the conventional OFDM signal generator, such that SC-FDMA may be called DFT-spreaded OFDM (DFT-s-OFDM).

The SC-FDMA must satisfy single carrier characteristics. FIG. 3 shows examples for satisfying single carrier characteristics and mapping an input symbol to a subcarrier in a frequency domain. In FIG. 3(a) or 3(b), if a DFT-processed symbol is assigned to a subcarrier, a transmission signal satisfying single carrier characteristics can be obtained. FIG. 3(a) shows a localized mapping method, and FIG. 3(b) shows a distributed mapping method.

Figure 4:
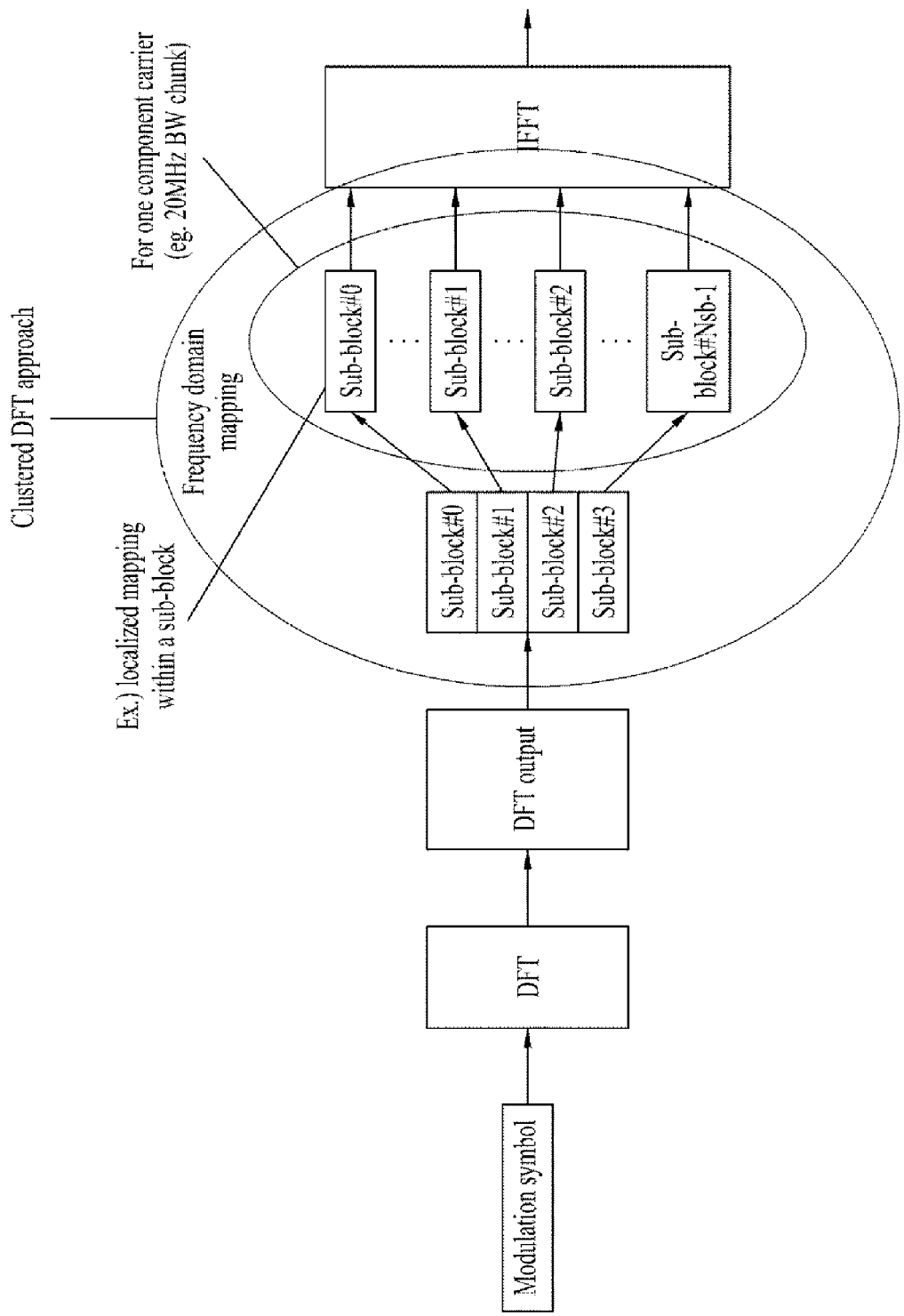
FIGS. 4 to 6 show examples for mapping an input symbol to a single carrier by a clustered DFT-s-OFDM.
Figure 5:
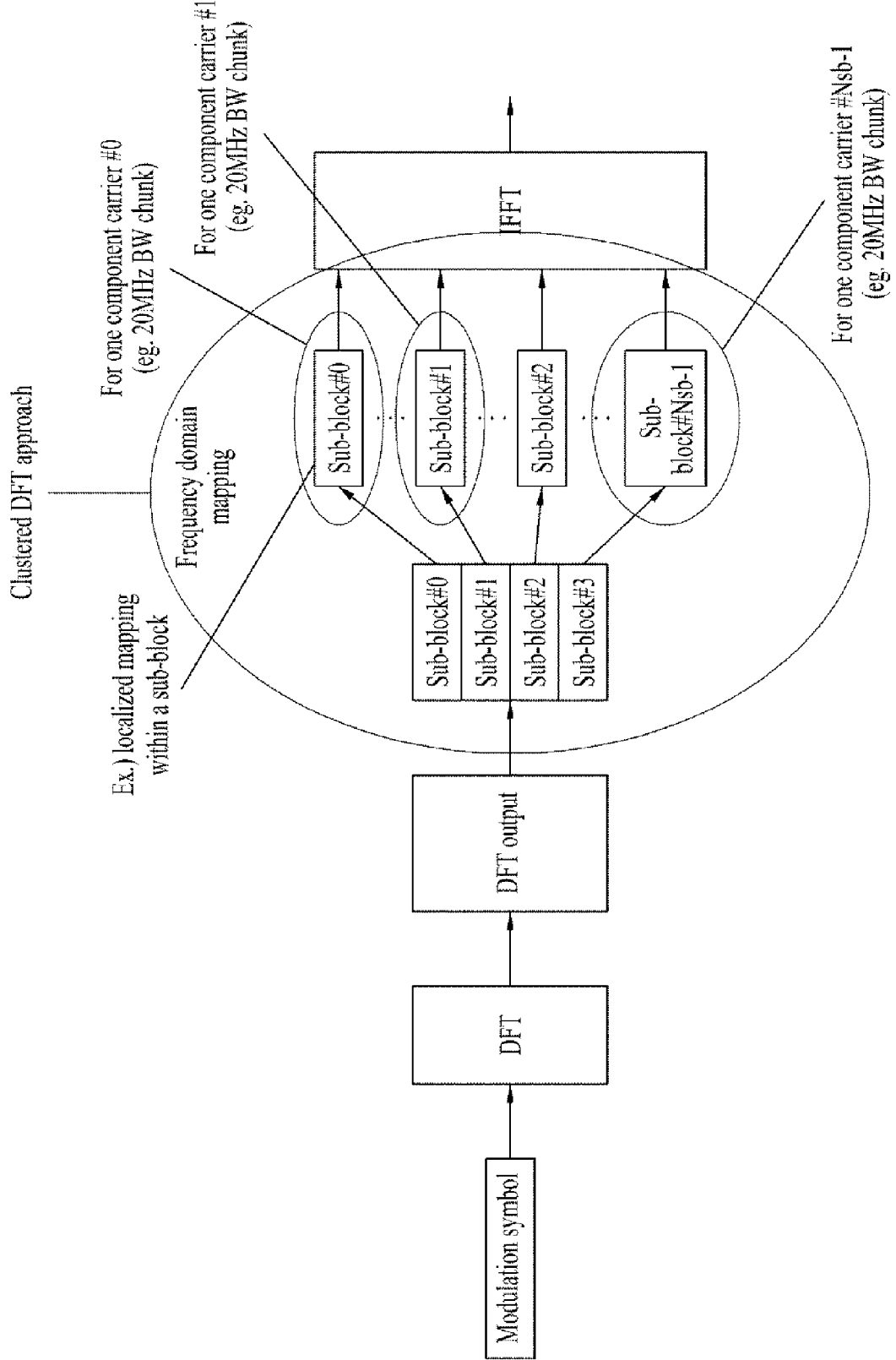
Figure 6:
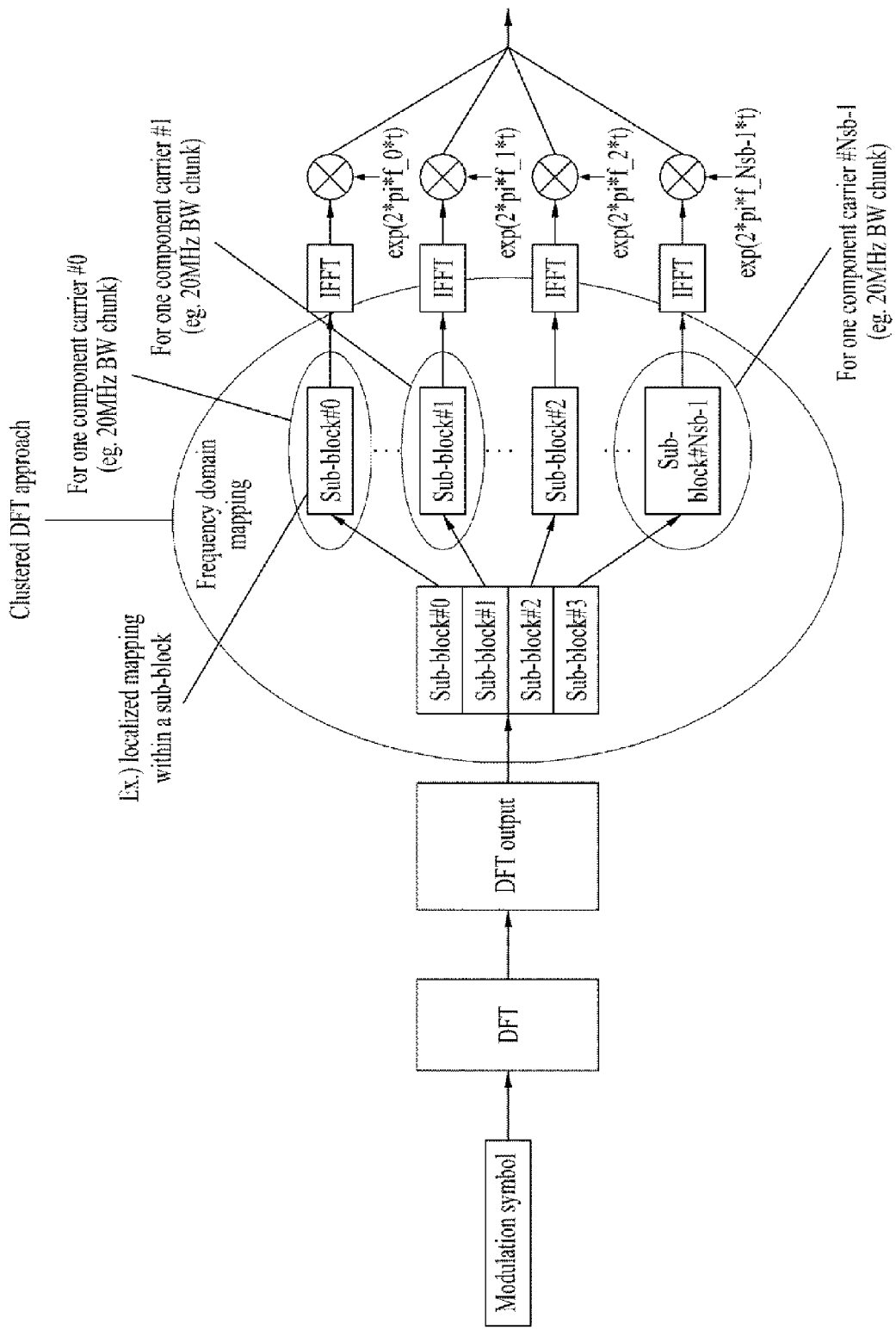

On the other hand, the clustered DFT-s-OFDM scheme may be adapted to the transmitter 100a or 100b. The clustered DFT-s-OFDM is considered to be a modification of the conventional SC-FDMA scheme. In more detail, a signal output from the DFT/FFT module 307 and the precoder 304 is divided into some sub-blocks, and the divided sub-blocks are discontinuously mapped to subcarriers. FIGS. 4 to 6 show examples for mapping an input symbol to a single carrier by a clustered DFT-s-OFDM. FIG. 4 shows the signal processing in which DFT-process output samples are mapped to one carrier in the clustered SC-FDMA. FIGS. 5 and 6 show the signal processing in which DFT process output samples are mapped to multicarriers in a clustered SC-FDMA.

FIG. 4 shows the example of intra-carrier cluster SC-FDMA application. FIGS. 5 and 6 show examples of the inter-carrier cluster SC-FDMA application. FIG. 5 shows the example in which a signal is created through a single IFFT block under the condition that component carriers are contiguously allocated to a frequency domain and the subcarrier spacing between contiguous component carriers is arranged. FIG. 6 shows another example in which a signal is created through several IFFT blocks under the condition that component carriers are non-contiguously allocated to a frequency domain.

Figure 7:
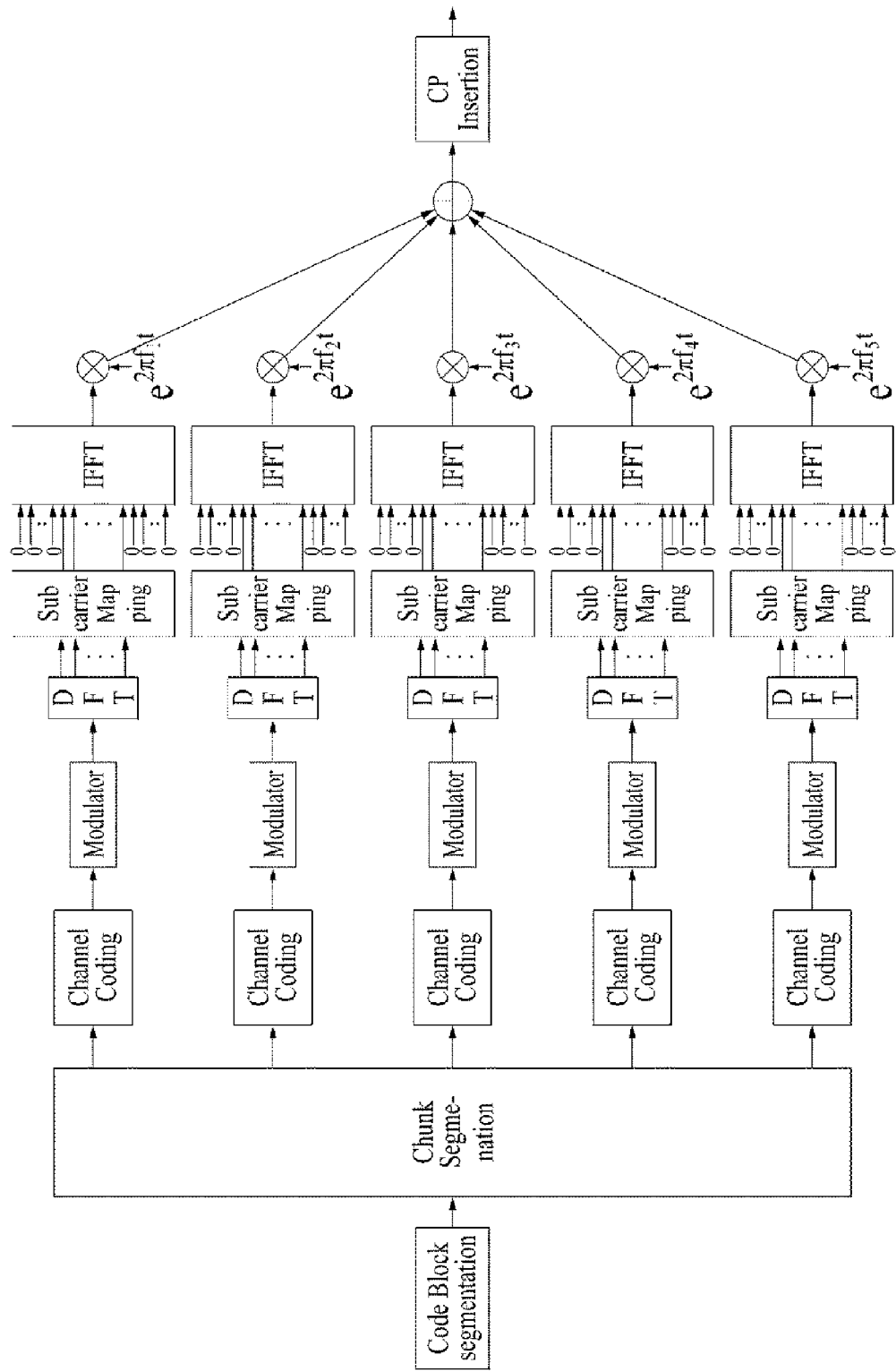
FIG. 7 shows the signal processing of a segmented SC-FDMA.

FIG. 7 shows exemplary segmented SC-FDMA signal processing.

The segmented SC-FDMA to which the same number of IFFTs as an arbitrary number of DFTs is applied may be considered to be an extended version of the conventional SC-FDMA DFT spread and the IFFT frequency subcarrier mapping structure because the relationship between DFT and IFFT is one-to-one basis. If necessary, the segmented SC-FDMA may also be represented by NxSC-FDMA or NxDFTs-OFDMA. For convenience of description and better understanding of the present invention, the segmented SC-FDMA, NxSC-FDMA and NxDFT-s-OFDMA may be generically as 'segment SC-FDMA'. Referring to FIG. 7, in order to reduce the single carrier characteristic condition, the segment SC-FDMA groups all the time domain modulation symbols into N groups, such that a DFT process is performed in units of a group.

Referring to FIG. 2, the receivers 300a and 300b operate in the reverse order to the operation of the transmitters 100a and 100b. The receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include $N_r$ reception antennas. A signal received through each reception antenna is down-converted to a baseband signal and then recovered to the original data stream transmitted by the transmitter 100a or 100b through multiplexing and MIMO demodulation. Each of the receivers 300a and 300b may include a signal recoverer for downconverting a received signal to a baseband signal, a multiplexer for multiplexing received signals, and a channel demodulator for demodulating the multiplexed signal stream to a codeword. The signal recoverer, the multiplexer, and the channel decoder may be configured into an integrated module for performing their functions or independent modules. To be more specific, the signal recoverer may include an Analog-to-Digital Converter (ADC) for converting an analog signal to a digital signal, a CP remover for removing a CP from the digital signal, an FFT module for generating a frequency-domain symbol by performing FFT on the CP-removed signal, and an RE demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

On the other hand, in the case where the receiver 300a or 300b receives signals according to the SC-FDMA scheme illustrated in FIGS. 3 to 7, the receiver 300a or 300b may further include an Inverse Discrete Fourier Transform (IDFT) module (also called an IFFT module). The IDFT/IFFT module performs IDFT/IFFT on an antenna-specific symbol recovered by the resource element mapper, and thus outputs the IDFT/IFFT symbol to the multiplexer.

While it has been described in FIGS. 1 to 7 that each of the transmitters 100a and 100b includes the scramblers 301, the modulation mappers 302, the layer mapper 303, the precoder 304, the RE mappers 305, and the OFDM signal generators 306, it may be further contemplated that the scramblers 301, the modulation mappers 302, the layer mapper 303, the precoder 304, the RE mappers 305, and the OFDM signal generators 306 are incorporated into each of the processors 400a and 400b of the transmitters 100a and 100b. Likewise, while it has been described in FIGS. 1 to 7 that each of the receivers 300a and 300b includes the signal recoverer, the multiplexer, and the channel demodulator, it may be further contemplated that the signal recoverer, the multiplexer, and the channel demodulator are incorporated into each of the processors 400a and 400b of the receivers 300a and 300b. For convenience of description and better understanding of the present invention, it is assumed that the scrambler 301, the modulation mapper 302, the layer mapper 303, the precoder 304, the resource element (RE) mapper 305, and the OFDM signal generator 306 (in case of the SC-FDMA scheme, the DFT module 307 may be further included) are included in the transmitter 100a or 100b separated from the processor 400a or 400b configured to control the operations of the above-mentioned constituent elements 302 to 306. In addition, it is assumed that a signal recoverer, a multiplexer, and a channel demodulator may be included in the receiver 300a or 300b separated from the processor 400a or 400b configured to control the operations of the signal recoverer, the multiplexer and the channel demodulator. However, in the case where the scrambler 301, the demodulation mapper 302, the layer mapper 303, the precoder 304, the RE mapper 305, and the OFDM signal generators 306 and 307 are contained in the processor 400a or 400b, and even in the case where the signal recoverer, the multiplexer, and the channel demodulator (in case of the SC-FDMA scheme, the IFFT module may be further included) are contained in the processor 400a or 400b, the embodiments of the present invention may also be applied.

Figure 8:
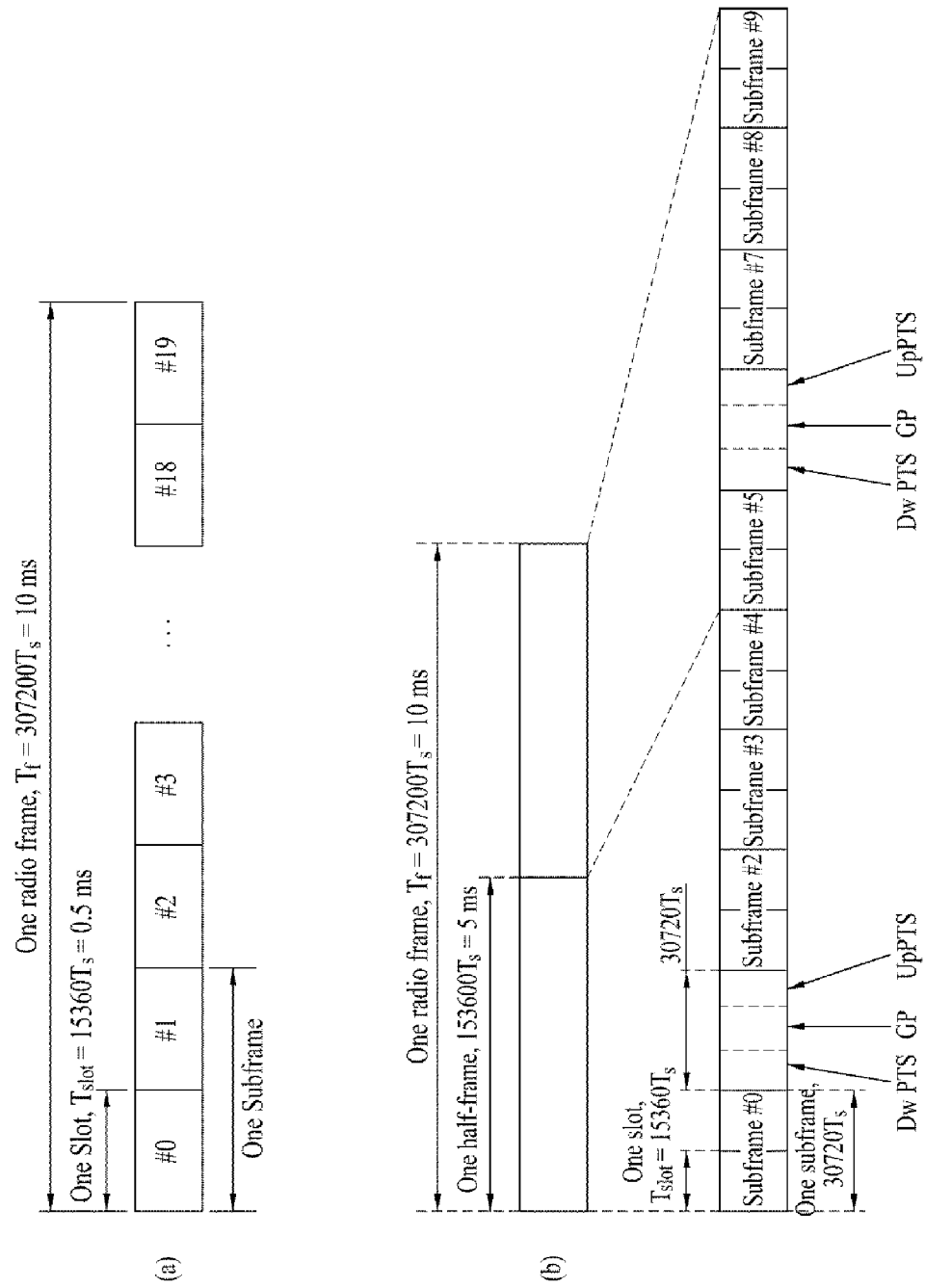
FIG. 8 shows examples of a radio frame structure used in a wireless communication system.

FIG. 8 illustrates an exemplary structure of a radio frame in a wireless communication system. Particularly, FIG. 8(a) illustrates a radio frame according to a Frame Structure type 1 (FS-1) of a 3GPP LTE/LTE-A system, and FIG. 8(b) illustrates a radio frame according to a Frame Structure type 2 (FS-2) of the 3GPP LTE/LTE-A system. The frame structure of FIG. 8(a) may be applied to a Frequency Division Duplexing (FDD) mode and a half-FDD (H-FDD) mode. The frame structure of FIG. 8(b) may be applied to a Time Division Duplexing (TDD) mode.

Referring to FIG. 8, a 3GPP LTE/LTE-A radio frame is 10 ms (307,200$T_s$) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. Each subframe is further divided into two slots, each of 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a time domain.

On the other hand, in the TDD mode, DL transmission and UL transmission are discriminated according to time, such that subframes contained in a frame may be classified into DL subframes and UL subframes. Table 1 shows an exemplary UL-DL construction in a TDD mode.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In Table 1, D is a DL subframe, U is a UL subframe, and S is a special subframe. The special subframe denoted by S may include three fields, i.e., Downlink Pilot TimeSlot (DwPTS), Guard Period (GP), and Uplink Pilot TimeSlot (UpPTS). DwPTS is a time period reserved for DL transmission, and UpPTS is a time period reserved for UL transmission.

Figure 9:
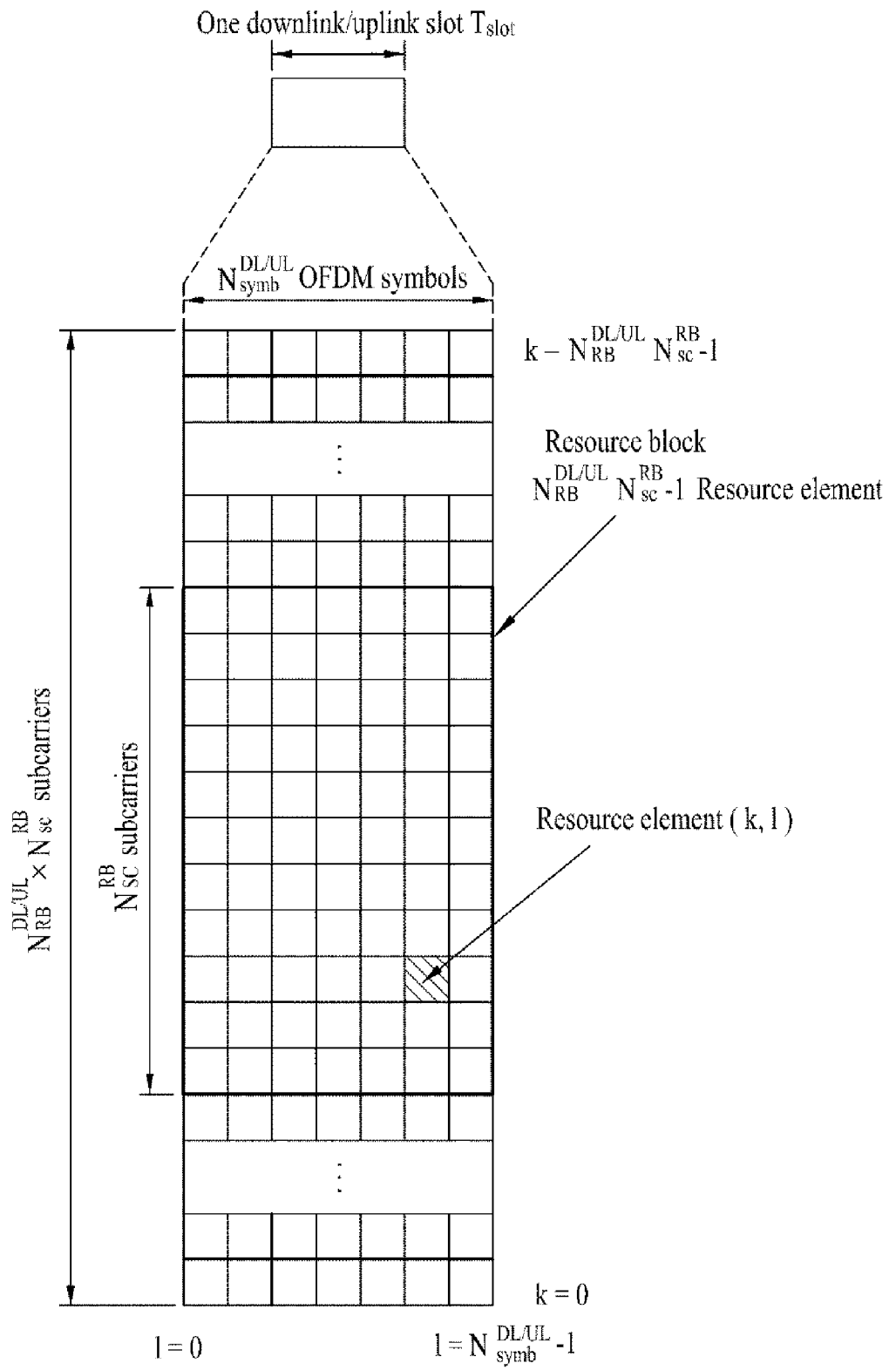
FIG. 9 shows an example of a DL/UL slot structure for use in a wireless communication system.

FIG. 9 illustrates an exemplary structure of a DownLink/UpLink (DL/UL) slot in the wireless communication system. Specifically, FIG. 9 illustrates the structure of a resource grid in the 3GPP LTE/LTE-A system. There is one resource grid per antenna port.

Referring to FIG. 9, a slot includes a plurality of OFDM symbols in the time domain by a plurality of Resource Blocks (RBs) in the frequency domain. An OFDM symbol may refer to one symbol duration. An RB includes a plurality of subcarriers in the frequency domain. An OFDM symbol may be called an OFDM symbol, an SC-FDM symbol, etc. according to a multiple access scheme. The number of OFDM symbols per slot may vary depending on a channel bandwidth and a CP length. For instance, one slot includes 7 OFDM symbols in case of a normal CP, whereas one slot includes 6 OFDM symbols in case of an extended CP. While a subframe is shown in FIG. 9 as having a slot with 7 OFDM symbols for illustrative purposes, embodiments of the present invention are also applicable to subframes with any other number of OFDM symbols. Each element in the resource grid for an antenna port is called Resource Element (RE). Each RE is formed by one OFDM symbol by one subcarrier. An RE is also referred to as a tone.

Referring to FIG. 9, a signal transmitted in each slot may be described by a resource grid including $N^{DL/UL}_{RB}N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ is dependent upon a DL transmission bandwidth, and $N^{UL}_{RB}$ is dependent upon a UL transmission bandwidth. Each OFDM symbol includes $N^{DL/UL}_{RB} N^{RB}_{sc}$ subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_0$) in an OFDM signal generation process. The carrier frequency may also be called a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB.

In other words, a Physical Resource Block (PRB) is defined as $N^{DL/UL}_{symb}$ consecutive OFDM symbols or SC-FDMA symbols in the time domain by $N^{RB}_{sc}$ consecutive subcarriers in the frequency domain. Therefore, one PRB includes $N^{DL/UL}_{symb}N^{RB}_{sc}$ REs.

Each RE in the resource grid per each antenna port may be uniquely identified by an index pair (k, 1) in a slot. k is a frequency-domain index ranging from 0 to $N^{DL/UL}_{RB}N^{RB}_{sc}-1$ and 1 is a time-domain index ranging from 0 to $N^{DL/UL}_{symb}-1$.

Figure 10:
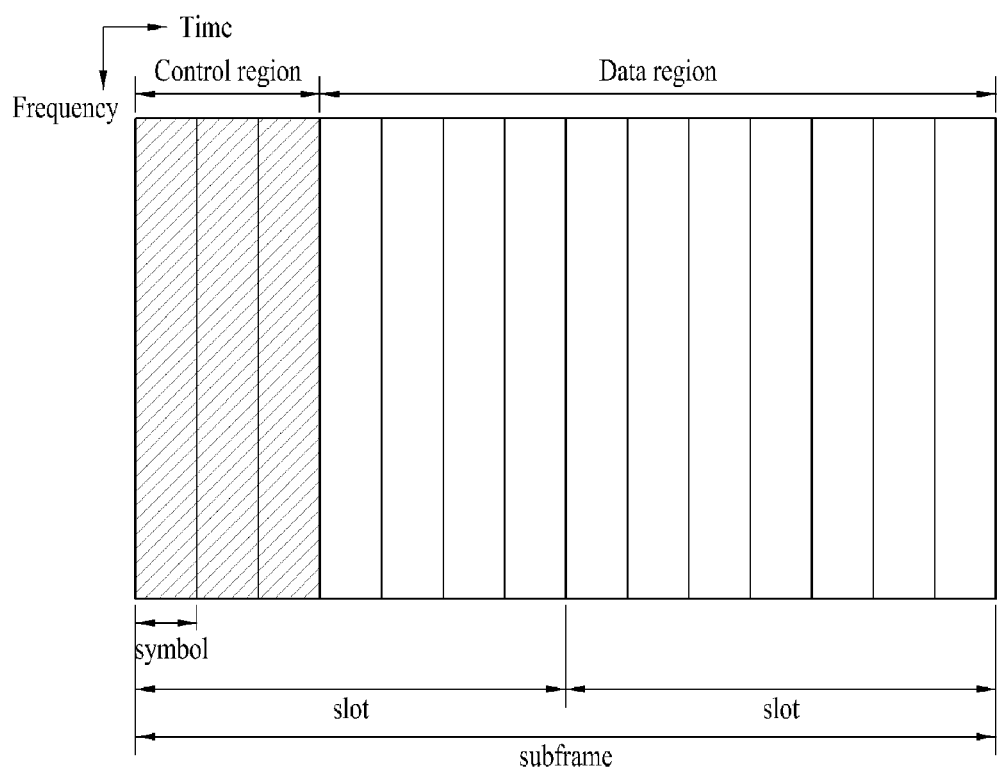
FIG. 10 shows an example of a DL subframe structure for use in a wireless communication system.

FIG. 10 illustrates an exemplary structure of a DL subframe in the wireless communication system.

Referring to FIG. 10, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH (Physical Control Format Indicator CHannel). A BS may transmit control information to a UE or UEs in the control region. To transmit control information, a PDCCH (Physical Downlink Control CHannel), a PCFICH, a PHICH (Physical Hybrid automatic retransmit request Indicator CHannel), etc. may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, etc. to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey data. PCH (Paging channel) and DL-SCH (Downlink-shared channel) may be transmitted on a PDSCH. A UE may decode control information received on a PDCCH and thus read data received on a PDSCH based on the decoded control information. For example, the PDCCH carries information indicating a UE or UE group to which the data of the PDSCH is destined and information indicating how the UE or UE group should receive and decode the PDSCH data. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Multiple PDCCHs may be transmitted in a control region. The UE monitors the multiple PDCCHs so as to detect its own PDCCH. The DCI carried by one PDCCH has different sizes and usages according to a PUCCH format. If necessary, the DCI size may also be changed according to a coding rate.

The DCI format may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked as a unique ID for each UE in such a manner that each UE can receive its own PDCCH. However, the UE does not know where its own PDCCH is transmitted, such that the UE performs blind detection (also called blind decoding) of all PDCCHs of the corresponding DCI format for each subframe until one PDCCH having a UE ID is received or detected.

FIG. 11 illustrates an exemplary structure of a UL subframe in the wireless communication system.

Referring to FIG. 11, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. In case that a UE adopts the SC-FDMA scheme for UL transmission, the LTE Release 9 or Release 8/9 system does not allow the UE to simultaneously transmit PUCCH and PUSCH, in order to maintain single carrier characteristics. The LTE-A Release 10 may indicate whether simultaneous transmission of PUCCH and PUSCH is supported through higher layer signaling.

The UCI carried by one PUCCH has different sizes and usages according to the PUCCH format, and the UCI size may be changed according to the coding rate. For example, the PUCCH format may be defined as follows.

TABLE 2

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK orSR + ACK/NACK | One codeword |
| 1b | QPSK | 2 | ACK/NACK orSR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 2-continued

| PUCCH format | Modulation scheme | Number of bits per subframe | Usage | Etc. |
|---|---|---|---|---|
| 3 | QPSK | 48 | ACK/NACK orSR + ACK/NACK orCQI/PMI/RI + ACK/NACK | |

In a UL subframe, subcarriers distant from a DC (Direct Current) subcarrier may be used as a control region. In other words, subcarriers located at both ends of a UL transmission bandwidth are assigned to UL control information transmission. DC subcarriers are reserved without being used in signal transmission, and are mapped to a carrier frequency ($f_0$) in a frequency upconversion process caused by the OFDM/SC-FDM signal generator 306.

A PUCCH for a UE is allocated to an RB pair in a subframe. The RBs of the RB pair occupy different subcarriers in two slots. This is called frequency hopping of an RB pair allocated to a PUCCH over a slot boundary. However, if the frequency hopping is not used, an RB pair occupies the same subcarriers. Irrespective of the frequency hopping, PUCCHs for one UE are assigned to an RB pair contained in one subframe. Therefore, each PUCCH is transmitted through one RB in each slot contained in one UL subframe that the same PUCCH is transmitted two times in one UL subframe.

Hereinafter, an RB pair used for each PUCCH transmission in one subframe is called a PUCCH region or PUCCH resource. For convenience of description, a PUCCH carrying ACK/NACK from among PUCCHs is called 'ACK/NACK PUCCH', a PUCCH carrying CQI/PMI/RI is called a Channel State Information (CSI) PUCCH, and a PUCCH carrying the SR is called an SR PUCCH.

The UE receives PUCCH resources for UCI transmission from the BS according to higher layer signaling or explicit or implicit scheme.

Uplink Control Information (UCI) such as ACK/NACK (ACKnowlegement/negative ACK), Channel Quality Indicator (CQI), Precoding Matrix Indicator (PMI), Rank Information (RI), Scheduling Request (SR), etc. may be transmitted in a control region of the UL subframe.

In a wireless communication system, the BS and the UE mutually transmit/receive data. If BS/UE transmits data to UE/BS, the UE/BS decodes the received data. If the data is successfully decoded, the UE/BS transmits ACK to the BS/UE. If the data decoding fails, the UE/BS transmits NACK to the BS/UE. Basically, in the 3GPP LTE system, the UE receives a data unit (e.g., PDSCH) from the BS, and transmits ACK/NACK for each data unit to the BS through implicit PUCCH resources decided by PDCCH resources carrying scheduling information of the data unit.

FIG. 12 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region through which a PDCCH is transmitted in each DL subframe is comprised of a plurality of Control Channel Elements (CCEs), and a PDCCH transmitted to the UE is comprised of one or more CCEs. Each CCE includes a plurality of Resource Element Groups (REGs) (e.g., 9 REGs). One REG may include neighbor or contiguous REs under the condition that a reference signal (RS) is excluded. The UE may transmit ACK/NACK through implicit PUCCH resources that are derived or calculated by a function of a specific CCE index (e.g., first or lowest CCE index) from among CCEs constructing a PDCCH received by the UE.

Referring to FIG. 12, each PUCCH resource index may correspond to a PUCCH resource for ACK/NACK. As can be seen from FIG. 12, if it is assumed that PDSCH scheduling information is transmitted to the UE through a PDCCH composed of 4~6-indexed CCEs (i.e., NOs. 4, 5, 6 CCEs), the UE transmits ACK/NACK to the BS through the 4-indexed PUCCH corresponding to a CCE having the lowest index (i.e., No. CCE 4) constructing the PDCCH. FIG. 12 shows the example in which a maximum of M' CCEs is present in a DL and a maximum of M PUCCHs is present in a UL. Although M' may be identical to M (M'=M), M' may be different from M as necessary, and CCE resource mapping may overlap with PUCCH resource mapping as necessary.

For example, PUCCH resource index may be obtained from the CCE index as shown in the following Math Figure 1.

MathFigure 1

$$n_{PUCCH}^{(1)} = n_{CCE} + N_{PUCCH}^{(1)}$$ [Math.1]

In Math Figure 1, $n^{(1)}_{PUCCH}$ is a PUCCH resource index for PUCCH format 1/1a/1b, $N^{(1)}_{PUCCH}$ is a signaling value received from a higher layer, and $n_{CCE}$ may be the smallest value from among CCE indexes used for PDCCH transmission.

FIG. 13 shows exemplary communication under a single carrier situation. The communication example shown in FIG. 13 may correspond to exemplary communication for the LTE system.

Referring to FIG. 13, a general FDD-type wireless communication system performs data transmission/reception through one DL band and one UL band corresponding to this DL band. The BS and the UE transmit/receive data and/or control information scheduled in units of a subframe. Data is transmitted/received through a data region configured in a UL/DL subframe, and control information is transmitted/received through a control region configured in a UL/DL subframe. For these operations, the UL/DL subframe may carry signals through various physical channels. Although FIG. 13 has disclosed only the FDD scheme for convenience of description, it should be noted that the scope or spirit of the present invention is not limited thereto, and can also be applied to the TDD scheme by dividing the radio frame of FIG. 8 according to an uplink (UL) and a downlink (DL) in a time domain.

Figure 14:
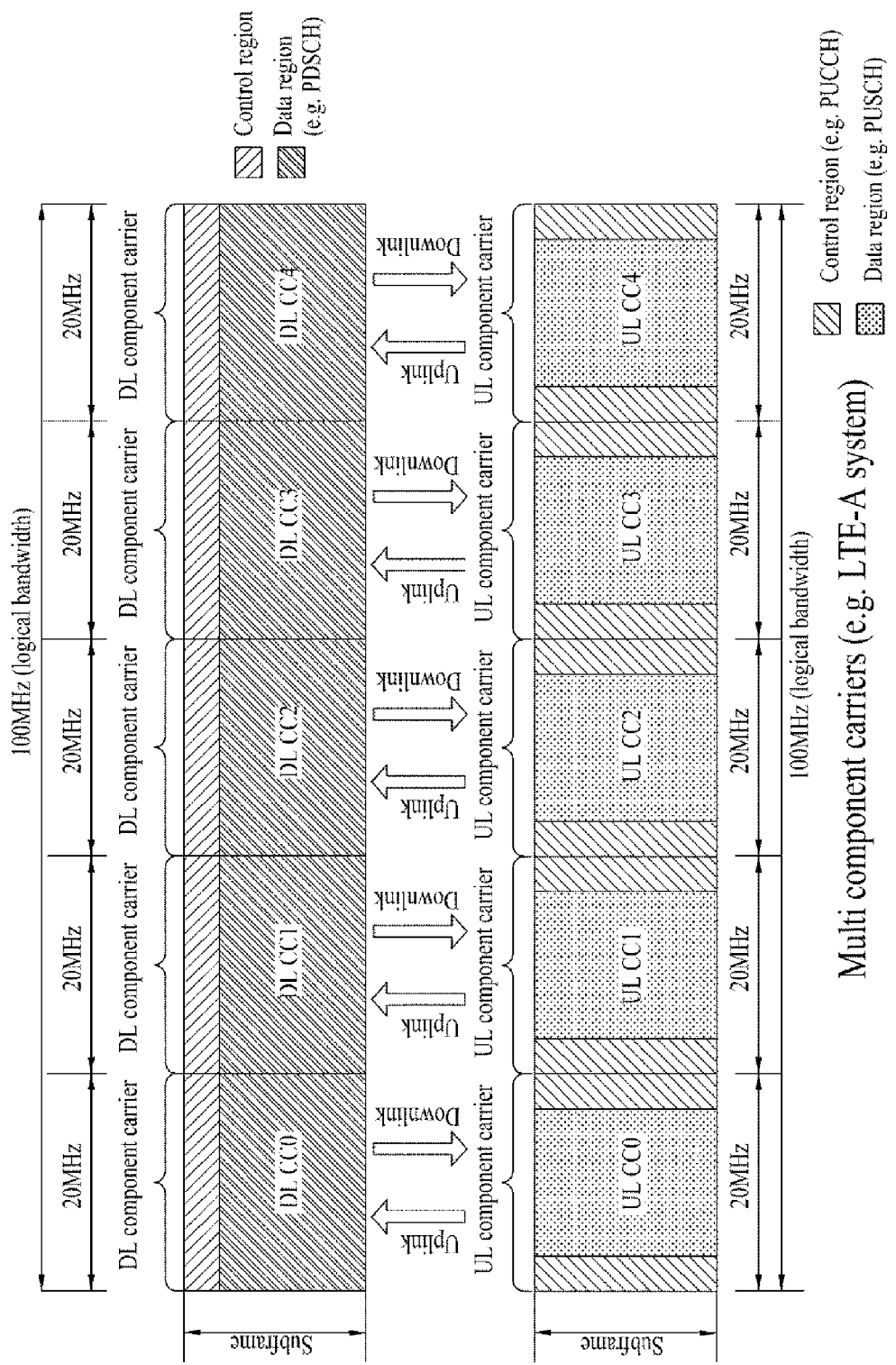
FIG. 14 shows exemplary communication under a multi-carrier situation.

FIG. 14 shows exemplary communication under a multi-carrier situation.

The LTE-A system uses carrier aggregation or bandwidth aggregation technology that uses a larger bandwidth by aggregating several UL/DL frequency blocks. The multicarrier system or the carrier aggregation (CA) system aggregates and uses a plurality of carriers each having a smaller band than a target band to support a broadband. When aggregating several carriers each having a smaller band than the target band, the band of aggregated carriers may be limited to a bandwidth used in a conventional system such that the bandwidth may achieve backward compatibility with the conventional system. For example, the conventional LTE system supports 1.4 MHz, 3 MHz, 5 MHz, 10 MHz, 15 MHz, and 20 MHz bandwidths. The LTE-A (LTE-Advanced) system evolved from the LTE system may support a bandwidth larger than the 20 MHz bandwidth using only bandwidths supported by the LTE system. Alternatively, a new bandwidth is defined irrespective of a bandwidth used in the conventional system, such that carrier aggregation can be supported by the new bandwidth. Multiple carriers (multicarriers), carrier aggregation and bandwidth aggregation may be used interchangeably as necessary. In addition, the carrier aggregation is a generic term of contiguous carrier aggregation and non-contiguous carrier aggregation. For reference, if only one component carrier (CC) is used for communication in the TDD scheme, or if one UL CC and one DL CC are used for communication in the FDD scheme, this means communication under a single carrier situation (non-CA). UL CC may also be referred to as UL resources, and DL CC may also be referred to as DL resources.

For example, as can be seen from FIG. 14, five 20 MHz CCs are aggregated in each of UL and DL such that a 100 MHz bandwidth can be supported. Individual CCs may be contiguous or non-contiguous to each other in a frequency domain. FIG. 14 shows the example in which a UL CC bandwidth is symmetrically identical to a DL CC bandwidth. However, a bandwidth of each CC may be independently determined. For example, the UL CC bandwidth may be comprised of "5 MHz(UL CC0)+20 MHz(UL CC1)+20 MHz (UL CC2)+20 MHz(UL CC3)+5 MHz(UL CC4)". In addition, asymmetrical carrier aggregation in which the number of UL CCs is different from the number of DL CCs may also be achieved. The asymmetrical carrier aggregation may be generated by the limitation of an available frequency band or may be achieved by network configuration. For example, although the BS manages X DL CCs, a frequency band capable of being received in a specific UE may be limited to Y DL CCs (where Y≤X). In this case, it is necessary for the UE to monitor DL signal/data transmitted through Y CCs. In addition, although the BS manages L UL CCs, a frequency band capable of being received in a specific UE may be limited to M UL CCs (where M≤L). In this case, a DL or UL CC limited to a specific UE may be referred to as a configured serving UL or DL CC in the specific UE. The BS may activate some or all of CCs managed by the BS, or may deactivate some CCs, such that a predetermined number of CCs may be assigned to the UE. The BS may change the activated/deactivated CCs, and the number of activated/deactivated CCs may be changed. On the other hand, the BS may configure Z DL CCs (where 1≤Z≤y≤X) as main DL CCs. Herein, the Z DL CCs must be primarily monitored and received cell-specifically or UE-specifically. In addition, the BS may configure N UL CCs (where 1≤N≤M≤L) as main UL CCs, the N UL CCs being primarily transmitted cell-specifically or UE-specifically. The main DL or UL CCs dedicated to a specific UE may be referred to as a configured serving UL or DL CC in the specific UE. Various parameters for carrier aggregation may be established cell-specifically, UE group-specifically, or UE-specifically.

Once the BS cell-specifically or UE-specifically assigns a CC available to the UE, unless CC allocation to the UE may be wholly reconfigured or the UE is handed over, at least one of the allocated CCs is not deactivated. Hereinafter, the CC unable to be deactivated unless CC allocation to the UE is wholly reconfigured is referred to as a Primary CC (PCC), and a CC capable of being freely activated/deactivated by the BS is referred to as a secondary CC (SCC). Single carrier communication uses one PCC for communication between the UE and the BS, and the SCC is not used in communication. On the other hand, PCC and SCC may be distinguished from each other on the basis of control information. For example, specific control information may be transmitted/received only through a specific CC. Such specific CC is referred to as a PCC, and the remaining CC(s) may be referred to as SCC(s). For example, control information transmitted on a PUCCH may correspond to such specific control information. In this way, if control information transmitted on a PUCCH is transmitted from the UE to the BS only through a PCC, a UL CC carrying the PUCCH of the UE may be referred to as a UL PCC and the remaining UL CC(s) may be referred to as UL SCC(s). For another example, if the UE-specific CC is used, the specific UE may receive a DL synchronization signal (SS) as the specific control information from the BS. In this case, a DL CC through which the specific UE receives the DL SS and with which the UE adjusts initial DL time synchronization (that is, a DL CC the UE uses to establish connection to the network of the BS) may be referred to as a DL PCC, and the remaining DL CC(s) may be referred to as DL SCC(s). In the LTE-A release-10 communication system, the multicarrier communication uses one PCC for each UE or uses 0 or 1 secondary SCC(s) for each UE. However, the above-mentioned description is defined according to the LTE-A standard, and several PCCs for each UE may be used in communication in the future. PCC may also be referred to as a primary CC, an anchor CC or a primary carrier. SCC may also be referred to as a secondary CC or a secondary carrier.

The LTE-A conceptually uses the concept 'cell' in order to manage radio resources. The cell is defined as a combination of DL resources and UL resources. That is, the cell is defined as a combination of DL CC and UL CC, and UL resources are not mandatory. Therefore, the cell may be comprised of only DL resources or may be comprised of DL resources and UL resources. However, the above-mentioned description is defined according to the current LTE-A standard, and the cell may be configured solely in UL resources as necessary. If carrier aggregation is supported, a linkage between DL resource (or DL CC) carrier frequency and UL resource (or UL CC) carrier frequency may be designated by system information. For example, a combination of DL CC and UL CC may be indicated by system information block type2 (SIB2) linkage. In this case, the carrier frequency may indicate the center frequency of each cell or CC. The cell operated on the primary frequency (or PCC) may be referred to as a primary cell (PCell), and the cell(s) operated at a secondary frequency (or SCC) may be referred to as a secondary cell(s) (SCells). The primary frequency (or PCC) may indicate a frequency (or CC) used when the initial connection establishment process is performed or when a connection re-establishment process is started. PCell may also indicate the cell indicated in a handover process. In this case, the secondary frequency (or SCC) may indicate a frequency (or CC) that may be configured after RRC connection establishment and may also be used to provide additional radio resources. PCell and SCell may be generically named as serving cells. Therefore, in the case of the UE that is in an RRC_CONNECTED state, does not establish or support carrier aggregation, there is only one serving cell composed of only PCell. In contrast, in the case of another UE that is in the RRC_CONNECTED state and establishes carrier aggregation, one or more serving cells may be present, one PCell and at least one SCell may form the entire serving cells. However, it should be noted that the serving cells may also include a plurality of PCells in the future. After the initial security activation process is started, the network may add one or more SCells to the initially configured PCell in a connection establishment process for the UE supporting carrier aggregation. However, although the UE supports carrier aggregation, the network may also configure only the PCell for the UE without adding any SCell. The PCell may be referred to as a primary cell, an anchor cell or a primary carrier, and the SCell may be referred to as a secondary cell or a secondary carrier.

In a multicarrier system, the BS may transmit several data units to the UE through given cell(s) (or CC(s)), and the UE may transmit ACK/NACK messages for the several data units in one subframe. The UE may be assigned one or more cells (or DL CC) for receiving a PDSCH carrying DL data. The cell(s) (or DL CC(s)) for the UE may be semi-statically configured through RRC signaling. In addition, cell(s) (or DL CC(s)) for the UE may be dynamically activated/deactivated through L1/L2 (MAC) signaling. Therefore, a maximum number of ACK/NACK bits to be transmitted by the UE may be changed according to the cell (or DL CC) available to the UE. That is, a maximum number of ACK/NACK bits to be transmitted by the UE may be configured/re-configured by RRC signaling, or may be changed according to the DL CC (or the configured serving cell(s)) activated by L1/L2 signaling.

Figure 15:
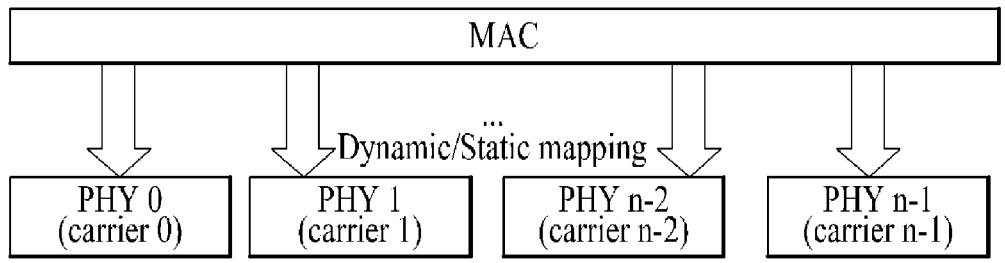
FIG. 15 is a conceptual diagram illustrating a method for enabling one MAC of a BS to manage multicarriers.
Figure 16:
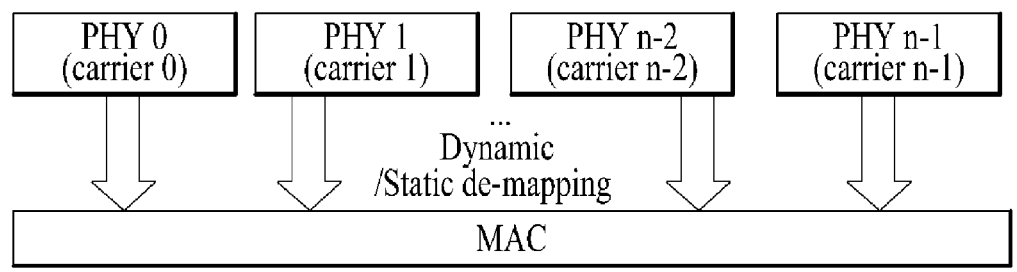
FIG. 16 is a conceptual diagram illustrating a method for enabling one MAC of a UE to manage multicarriers.

FIG. 15 is a conceptual diagram illustrating a method for enabling one MAC of a BS to manage multicarriers. FIG. 16 is a conceptual diagram illustrating a method for enabling one MAC of a UE to manage multicarriers.

Referring to FIGS. 15 and 16, one MAC manages and operates one or more frequency carriers, such that it performs transmission and reception of data. Frequency carriers managed by one MAC need not be contiguous to each other, such that they are more flexible in terms of resource management. In FIGS. 15 and 16, one PHY means one component carrier (CC) for convenience of description. One PHY may not always indicate an independent radio frequency (RF) device. Generally, although one independent RF device may indicate one PHY, the scope or spirit of the present invention is not limited thereto, and one RF device may include a plurality of PHYs.

Figure 17:
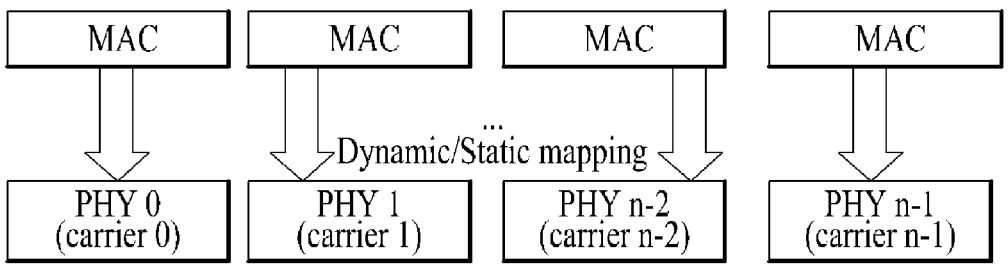
FIG. 17 is a conceptual diagram illustrating a method for enabling several MACs of a BS to manage multicarriers.
Figure 18:
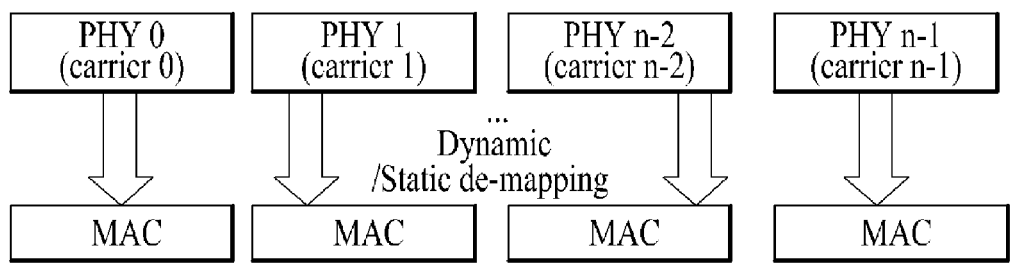
FIG. 18 is a conceptual diagram illustrating a method for enabling several MACs of a UE to manage multicarriers.
Figure 19:
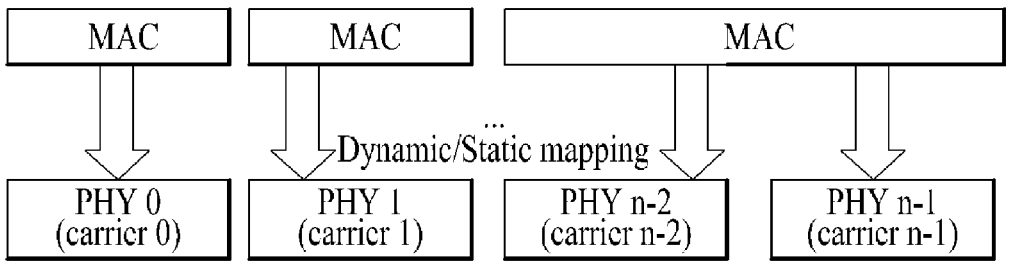
FIG. 19 is a conceptual diagram illustrating another method for enabling several MACs of a BS to manage multicarriers.
Figure 20:
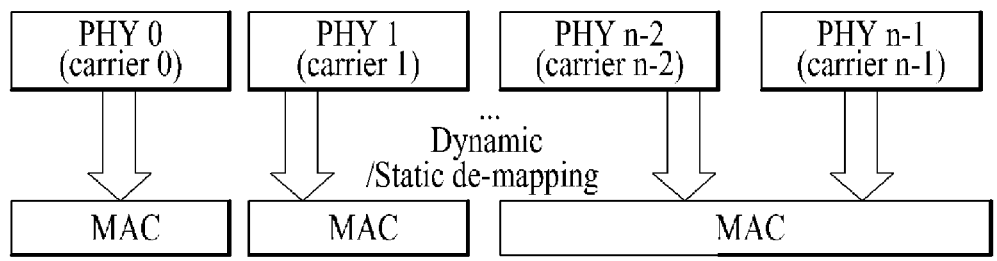
FIG. 20 is a conceptual diagram illustrating another method for enabling several MACs of a UE to manage multicarriers.

FIG. 17 is a conceptual diagram illustrating a method for enabling several MACs of a BS to manage multicarriers. FIG. 18 is a conceptual diagram illustrating a method for enabling several MACs of a UE to manage multicarriers. FIG. 19 is a conceptual diagram illustrating another method for enabling several MACs of a BS to manage multicarriers. FIG. 20 is a conceptual diagram illustrating another method for enabling several MACs of a UE to manage multicarriers.

Referring to not only the structures shown in FIGS. 15 and 16, but also the structures shown in FIGS. 17 to 20, a plurality of MACs but not one MAC may control a plurality of carriers. As can be seen from FIGS. 17 and 18, each carrier may be controlled by each MAC on a one to one basis. As can be seen from FIGS. 19 and 20, each of some carriers may be controlled by each MAC on a one to one basis, and the remaining one or more carriers may be controlled by one MAC.

The above-mentioned system manages a plurality of carriers (i.e., 1 to N carriers), and individual carriers may be contiguous or non-contiguous to each other. The above-mentioned system may be applied to UL transmission and DL transmission without distinction. The TDD system is configured to manage N carriers for DL and UL transmission in each carrier, and the FDD system is configured to use N carriers separately for UL transmission and DL transmission. The FDD system may also support asymmetrical carrier aggregation (CA) in which the number of carriers and/or the bandwidth of carriers aggregated in UL and DL are/is different.

In the case where the number of component carriers (CCs) aggregated in UL is identical to the number of CCs aggregated in DL, all CCs may be compatible with those of the conventional system. However, it should be noted that CCs that do not consider the compatibility are not always excluded.

For convenience of description, although it is assumed that the corresponding PDSCH is transmitted on DL CC #0 on the condition that a PDCCH is transmitted on DL CC #0, it is obvious to those skilled in the art that the cross-carrier scheduling can be applied such that the corresponding PDSCH can be transmitted through other DL CCs without departing from the spirit or scope of the invention.

Figure 21:
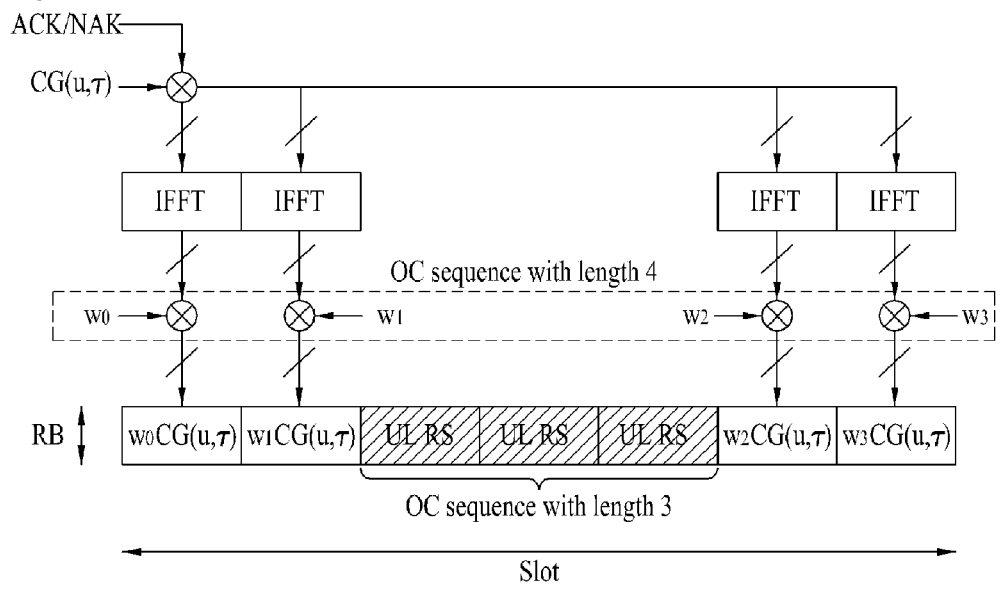
FIGS. 21 and 22 exemplarily show PUCCH format 1a and 1b slot level structures.
Figure 22:
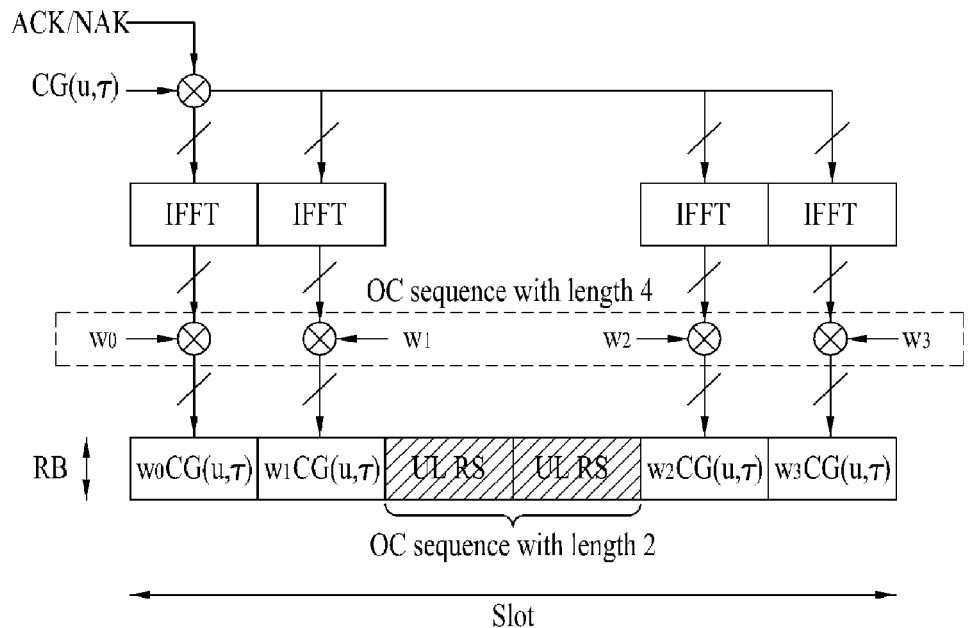

FIGS. 21 and 22 exemplarily show PUCCH format 1a and 1b slot level structures.

FIG. 21 shows the PUCCH format 1a and 1b structure in case of a normal CP. FIG. 21 shows the PUCCH format 1a and 1b structure in case of the extended CP. In the PUCCH format 1a and 1b structure, the same control information may be repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences (w0, w1, w2, w3) may be applied to either an arbitrary time domain (after FFT modulation) or an arbitrary frequency domain (before FFT modulation). The PUCCH format 1 slot level structure for Scheduling Request (SR) transmission may be identical to the PUCCH format 1a and 1b, but the PUCCH format 1 slot level structure and the PUCCH format 1a and 1b structure have different modulation methods.

For ACK/NACK feedback for SR transmission and semi-persistent scheduling (SPS), PUCCH resources composed of CS, CC and PRB may be assigned to the UE through RRC signaling. As previously illustrated in FIG. 12, not only for dynamic ACK/NACK (or ACK/NACK for non-persistent scheduling) feedback but also for ACK/NACK feedback for a PDCCH indicating SPS release, PUCCH resources may be implicitly assigned to the UE using the lowest or smallest CCE index of either a PDCCH corresponding to the PDSCH or a PDCCH indicating the SPS release.

Figure 23:
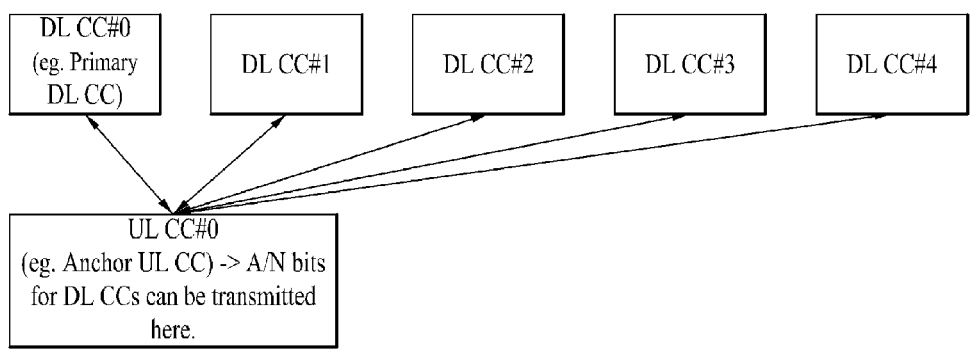
FIG. 23 shows an exemplary scenario for transmitting uplink control information (UCI) in a wireless communication system supporting carrier aggregation.

FIG. 23 shows an exemplary scenario for transmitting uplink control information (UCI) in a wireless communication system supporting carrier aggregation. For convenience of description, the example of FIG. 23 assumes that the UCI is ACK/NACK (A/N). However, the above-mentioned description is disclosed only for illustrative purposes, and the UCI may include channel state information (e.g., CQI, PMI, RI) and control information such as scheduling request (SR) information without any limitation.

FIG. 23 shows an asymmetric carrier aggregation in which 5 DL CCs are linked to one UL CC. The illustrated asymmetric carrier aggregation may be established at UCI transmission viewpoint. That is, DL CC-UL CC linkage for UCI and DL CC-UL CC linkage for data may be differently established. For convenience of description, assuming that each DL CC may carry a maximum of two codeword blocks (or two transport blocks) and the number of ACK/NACK responses for each CC is dependent upon a maximum number of established codewords per CC (for example, if a maximum number of codewords established by the BS at a specific CC is set to 2, although a specific PDCCH uses only one codeword in the above-mentioned CC, the number of associated ACK/NACK responses is set to a maximum number (i.e., 2) of codewords per CC), at least two UL ACK/NACK bits are needed for each DL CC. In this case, in order to transmit ACK/NACK for data received through 5 DL CCs through one UL CC, ACK/NACK comprised of at least 10 bits is needed. In order to separately discriminate a DTX (discontinuous transmission) state for each DL CC, at least 12 bits ($=5^5=3125=11.61$ bits) for ACK/NACK transmission are needed. The conventional PUCCH format 1a/1b can transmit ACK/NACK to the range of a maximum of 2 bits, such that the conventional PUCCH cannot carry the extended ACK/NACK information. For convenience of description, although the amount of UCI information is increased due to the carrier aggregation, this situation may be generated due to the increased number of antennas and the presence in a backhaul subframe in the TDD or relay system. Similar to ACK/NACK, even when control information associated with several DL CCs is transmitted through one UL CC, the amount of control information to be transmitted on one CC is increased. For example, in case of transmitting CQI/PMI/RI for several DL CCs, UCI payload may be increased.

In FIG. 23, the UL anchor CC (UL PCC or UL Primary CC) is a CC through which PUCCH or UCI is transmitted, and the UL anchor CC may be cell-specifically or UE-specifically determined. In addition, the DTX state may be explicitly fed back, i.e, fed back separately from the NACK state, and may also be fed back in such a manner that the DTX and the NACK share the same state.

The method for effectively transmitting the increased UL control information (UCI) will hereinafter be described with reference to the accompanying drawings. In more detail, the following description proposes the new PUCCH format/signal processing/resource allocation method capable of transmitting the increased UL control information (UCI). For convenience of description, the new PUCCH format proposed by the present invention is referred to as CA (Carrier Aggregation) PUCCH format or as a PUCCH format 3 because PUCCH formats up to the PUCCH format 2 is defined in the conventional LTE Release 8/9. The technical idea of the PUCCH format proposed in the present invention can be easily applied to an arbitrary physical channel (e.g., PUSCH) capable of carrying UL control information (UCI) using the same or similar scheme. For example, the embodiment of the present invention can be applied to a periodical PUSCH structure for periodically transmitting control information or to an aperiodic PUSCH structure for aperiodically transmitting control information.

The following drawings and embodiments basically show an exemplary case in which the UCI/RS symbol structure of the PUCCH format 1/1a/1b (normal CP) of the conventional LTE is used as a UCI/RS symbol structure of the subframe/slot level applied to the PUCCH format 3. However, the subframe/slot level UCI/RS symbol structure prescribed in the PUCCH format 3 is disclosed only for illustrative purposes for convenience of description, and the scope or spirit of the present invention is not limited only to a specific structure. In the PUCCH format 3, the number of UCI/RS symbols, the positions of the UCI/RS symbols, etc. may be freely modified according to the system design. For example, the PUCC format 3 according to the embodiment of the present invention may be defined using RS symbol structures of the PUCCH format 2/2a/2b of the conventional LTE.

The PUCCH format 3 according to the embodiment of the present invention may be used to carry arbitrary categorized/sized uplink control information (UCI). For example, the PUCCH format 3 according to the embodiment of the present invention may carry a variety of information, for example, HARQ ACK/NACK, CQI, PMI, RI, SR, etc., and these information may have arbitrary-sized payload. For convenience of description, the present embodiment is focused upon the exemplary case in which the PUCCH format 3 carries the ACK/NACK information, and a detailed description thereof will be described later.

FIGS. 24 to 27 exemplarily show a PUCCH format 3 and associated signal processing according to the embodiments of the present invention. Particularly, FIGS. 24 to 27 exemplarily show the DFT-based PUCCH format structure. According to the DFT-based PUCCH structure, DFT precoding is performed in PUCCH and a time domain orthogonal cover (OC) is applied to the PUCCH at SC-FDMA level before the PUCCH is transmitted. The DFT-based PUCCH format is generically named as a PUCCH format 3.

Figure 24:
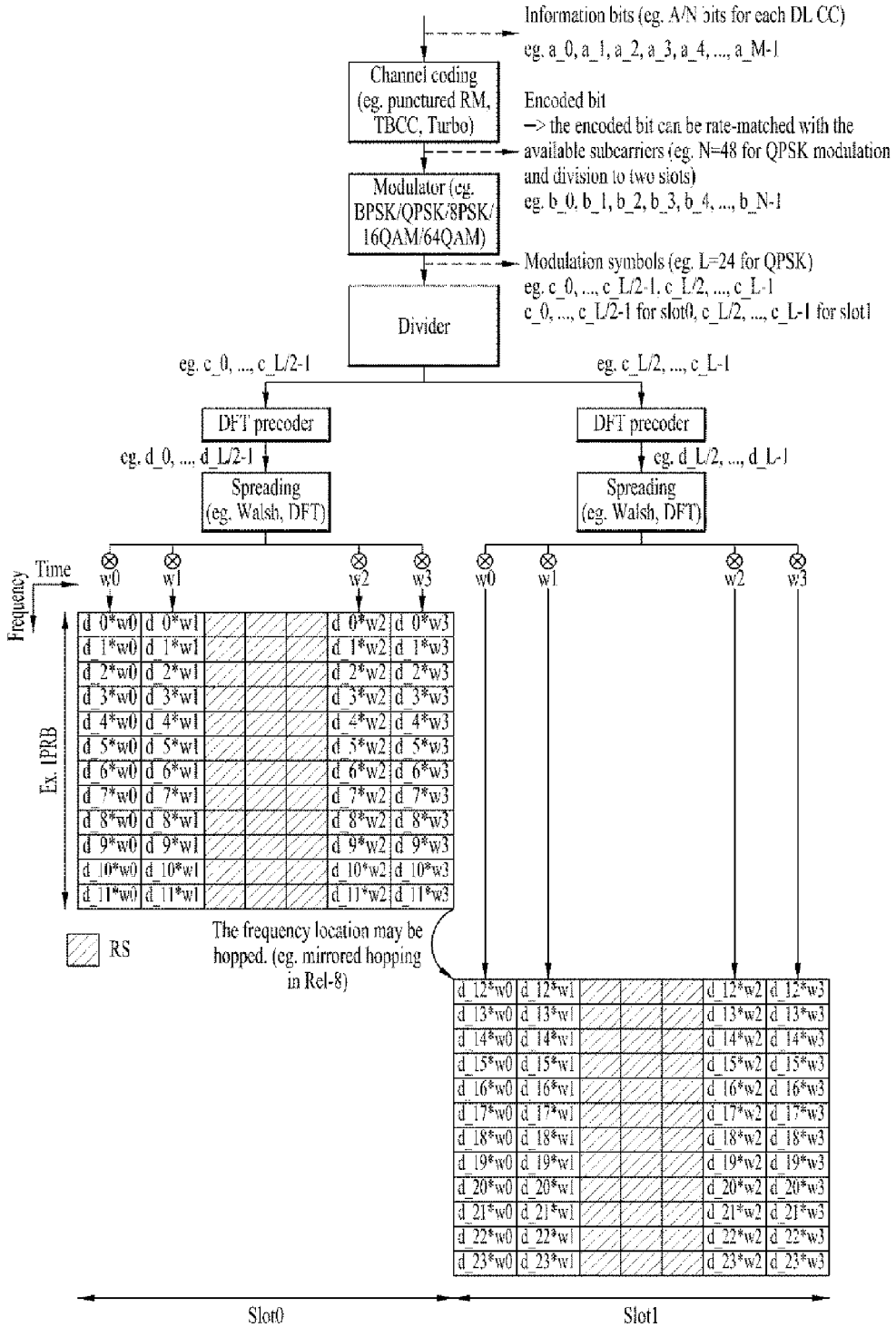
FIGS. 24 to 27 exemplarily show a PUCCH format 3 structure and associated signal processing according to the embodiments of the present invention.

FIG. 24 exemplarily shows the PUCCH format 3 structure using the orthogonal code (OC) of SF=4. Referring to FIG. 24, the channel coding block performs channel coding of the information bits ($a\_0, a\_1, \ldots, a\_M-1$) (e.g., multiple ACK/NACK bits), thereby generating the encoded bits (coded bit or coding bit) (or codeword) ($b\_0, b\_1, \ldots, b\_N-1$). M is the size of information bit, and N is the size of coding bit. The information bit may include UCI, for example, multiple ACK/NACK data for multiple data units (or PDSCHs) received through multiple DL CCs. In this case, the information bit ($a\_0, a\_1, \ldots, a\_M-1$) is joint-coded irrespective of categories/numbers/sizes of UCIs constructing the information bit. For example, if the information bit includes multiple ACK/NACK data of several DL CCs, the channel coding is not performed per DL CC or per ACK/NACK bit, but performed for the entire bit information, such that a single codeword is generated. The channel coding is not limited thereto, and includes simple repetition, simplex coding, Reed Muller (RM) coding, punctured RM coding, Tail-biting convolutional coding (TBCC), low-density parity-check (LDPC) or turbo-coding. Although not shown in the drawings, the coding bit may be rate-matched in consideration of a modulation order and the amount of resources. The rate matching function may be included in some parts of the channel coding block or may be performed through a separate functional block. For example, the channel coding block may perform the (32,0) RM coding for several control information to obtain a single codeword, and cyclic buffer rate-matching for the obtained codeword may be performed.

The modulator modulates the coding bit ($b\_0, b\_1, \ldots, b\_N-1$) so as to generate the modulation symbol ($c\_0, c\_1, \ldots, c\_L-1$). L is the size of a modulation symbol. The modulation method may be performed by modifying the size and phase of a transmission (Tx) signal. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols ($c\_0, c\_1, \ldots, c\_L-1$) to individual slots. The order/pattern/scheme for distributing the modulation symbols to individual slots may not be specially limited. For example, the divider may sequentially distribute the modulation symbols to individual slots (i.e., localized scheme). In this case, as shown in the drawings, the modulation symbols (c_0, c_1, ..., c_L/2–1) are distributed to Slot 0, the modulation symbols (c_L/2, c_L/2+1, ..., c_L–1) may be distributed to Slot 1. In addition, the modulation symbols may be interleaved (or permuted) while being distributed to individual slots. For example, the even-th modulation symbols may be distributed to Slot 0, and the odd-th modulation symbols may be distributed to Slot 1. If necessary, the modulation process and the distribution process may be replaced with each other in order.

The DFT precoder performs DFT precoding (e.g., 12-point DFT) for the modulation symbols distributed to individual slots so as to generate a single carrier waveform. Referring to FIG. 24, the modulation symbols (c_0, c_1, ..., c_L/2–1) distributed to Slot 0 may be DFT-precoded to DFT symbols (d_0, d_1, ..., d_L/2–1), ad the modulation symbols (c_L/2, c_L/2+1, ..., c_L–1) distributed to Slot 1 may be DFT-precoded to DFT symbols (d_L/2, d_L/2+1, ..., d_L–1). The DFT precoding may be replaced with another linear operation (e.g., Walsh precoding).

The spreading block performs spreading of the DFT-processed signal at the SC-FDMA symbol level. The time domain spreading at the SC-FDMA symbol level may be performed using the spreading code (sequence). The spreading code may include a Quasi-orthogonal code and an orthogonal code. The Quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a Quasi-orthogonal code. A maximum value of the spreading code size (or the spreading factor (SF)) is limited by the number of SC-FDMA symbols used for control information transmission. For example, if four SC-FDMA symbols are used to transmit control information in one slot, orthogonal codes (w0, w1, w2, w3) each having the length of 4 may be used in each slot. SF means the spreading degree of control information, and may be relevant to the UE multiplexing order or antenna multiplexing order. SF may be changed according to system requirements, for example, in the order of 1 2 3 4. The SF may be pre-defined between the BS and the UE, or may be notified to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

Detailed description of individual process on the assumption that ACK/NACK for 5 DL CCs is transmitted will hereinafter be described. If each DL CC transmits two PDSCHs, associated ACK/NACK data includes a DTX state, and the ACK/NACK data may be composed of 12 bits. Assuming that QPSK modulation and 'SF=4' time spreading are used, the coding block size (after the rate matching) may be composed of 48 bits. The coding bit may be modulated into 24 QPSK symbols, and 12 QPSK symbols are distributed to each slot. In each slot, 12 QPSK symbol may be converted into 12 DFT symbols through the 12-point DFT operation. 12 DFT symbols in each slot may be spread and mapped to four SC-FDMA symbols using the SF=4 spreading code in a time domain. Since 12 bits are transmitted through [2 bits*12 subcarriers*8 SC-FDMA symbols], the coding rate is set to 0.0625(=12/192). In case of SF=4, a maximum of four UEs may be multiplexed to one PRB.

Figure 25:
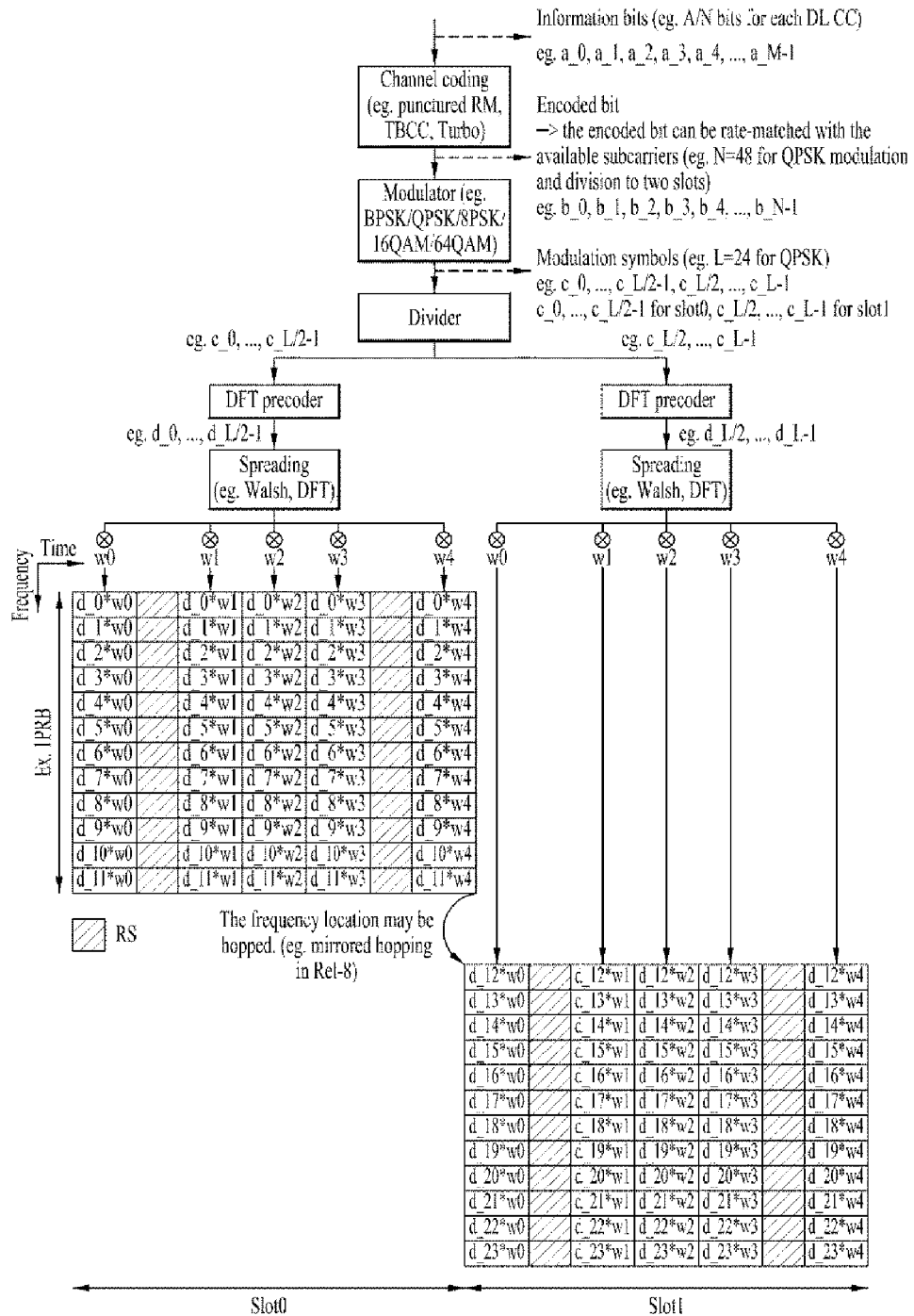

FIG. 25 exemplarily shows the PUCCH format 3 structure using the orthogonal code (OC) of SF=5.

The basic signal processing of FIG. 25 is identical to that of FIG. 24. Compared to FIG. 24, the number/position of UCI SC-FDMA symbols and the number/position of RS SC-FDMA symbols shown in FIG. 25 are different from those of FIG. 24. In this case, the spreading block may also be pre-applied to the previous stage of the DFT precoder as necessary.

In FIG. 25, the RS may succeed to the LTE system structure. For example, cyclic shift (CS) may be applied to a basic sequence. Since the data part includes SF=5, the multiplexing capacity becomes 5. However, the multiplexing capacity of the RS part is determined according to a cyclic shift (CS) interval ($\Delta_{shift}^{PUCCH}$). For example, the multiplexing capacity is given as $12/\Delta_{shift}^{PUCCH}$. In case of $\Delta_{shift}^{PUCCH}=1$, the multiplexing capacity is set to 12. In case of $\Delta_{shift}^{PUCCH}=2$, the multiplexing capacity is set to 6. In case of $\Delta_{shift}^{PUCCH}=3$, the multiplexing capacity is set to 4. In FIG. 25, while the multiplexing capacity of the data part is set to 5 because of SF=5, the RS multiplexing capacity is set to 4 in case of $\Delta_{shift}^{PUCCH}$, such that the resultant multiplexing capacity may be limited to 4 corresponding to the smaller one of two capacity values 5 and 4.

Figure 26:
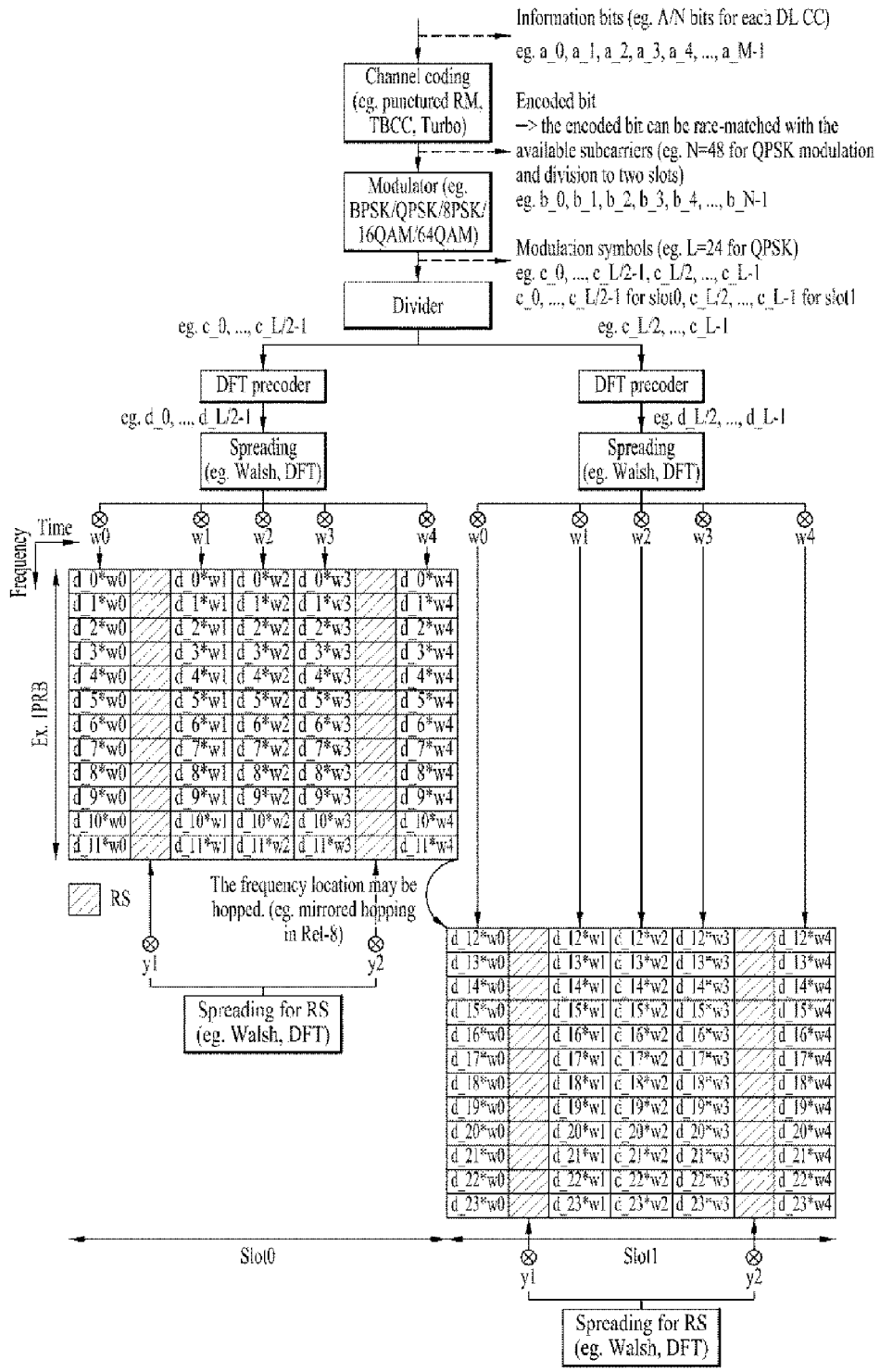

FIG. 26 exemplarily shows the PUCCH format 3 structure in which the multiplexing capacity is increased at a slot level.

The SC-FDMA symbol level spreading illustrated in FIGS. 24 and 25 is applied to RS, resulting in increase in the entire multiplexing capacity. Referring to FIG. 26, if a Walsh cover (or DFT code cover) is applied in the slot, the multiplexing capacity is doubled. Therefore, even in the case of $\Delta_{shift}^{PUCCH}$, the multiplexing capacity is set to 8, such that the multiplexing capacity of the data section is not decreased. In FIG. 26, [y1 y2]=[1 1] or [y1 y2]=[1 –1], or linear conversion format (e.g., [j j] [j –j], [1 j] [1 –j], or the like) may also be used as an orthogonal cover code for RS.

Figure 27:
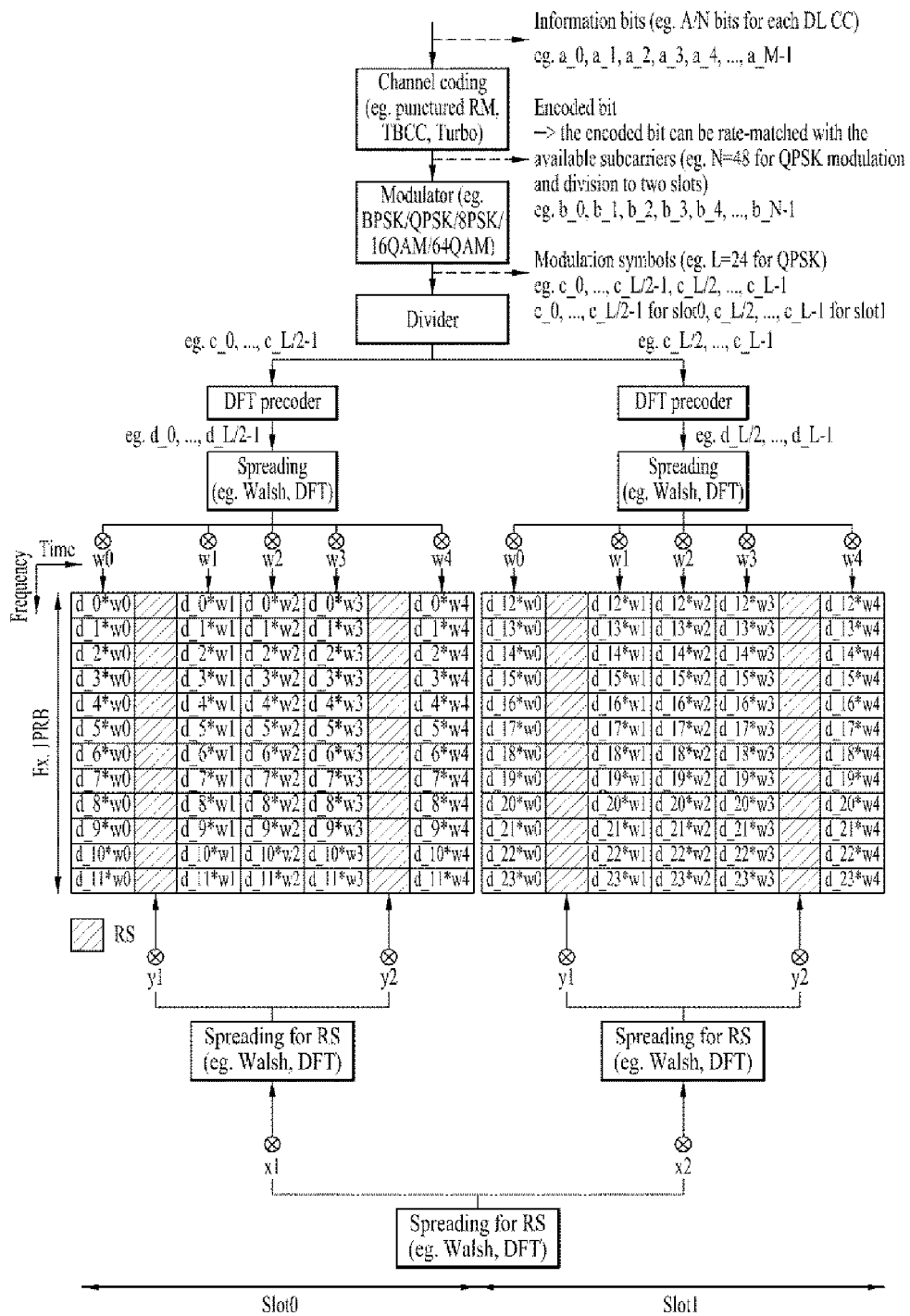

FIG. 27 exemplarily shows a PUCCH format 3 structure in which the multiplexing capacity can be increased at a subframe level.

If the frequency hopping is not applied to the slot level, the Walsh cover is applied in slot units, and the multiplexing capacity may be re-increased two times. In this case, as previously stated above, [x1 x2]=[1 1] or [1 –1] may be used as the orthogonal cover code, and its modification format may also be used as necessary.

For reference, the PUCCH format 3 processing may be free of the orders shown in FIGS. 24 to 27.

Multiple carriers in carrier aggregation may be classified into PCell and SCell(s). The UE may accumulate responses to one or more PDCCHs and/or PDSCH having no PDCCH received on a DL PCell and/or DL SCell(s), and may transmit the accumulated responses on a PUCCH using a UL PCell. In this way, subframe(s) and/or CC(s) carrying a plurality of PDCCHs of which corresponding responses are transmitted through one UL PUCCH may be referred to as a bundling window. Although the time domain or the CC domain bundling described in the present embodiment may indicate the logical AND operation, it may also be performed through another method such as the logical OR operation, etc. That is, the time domain or the CC domain bundling may be a generic term of a variety of methods for representing a plurality of ACK/NACK parts covering several subframes or several CCs in the ACK/NACK response using a single PUCCH format. That is, X-bit ACK/NACK information may generically represent an arbitrary method for expressing X-bit ACK/NACK information using Y-bits (where X≥Y).

In the CA TDD, multiple ACK/NACK responses for each CC may be transmitted by channel selection using the PUCCH format 1a/1b or by another channel selection using PUCCH format 3 or by PUCCH format 3. Implicit mapping or explicit mapping may be applied to the PUCCH resource index for the above-mentioned PUCCH formats, or a combination of the implicit mapping and the explicit mapping may also be applied thereto as necessary. For example, the implicit mapping may be used as a method for deriving a PUCCH resource index on the basis of the lowest CCE index of the corresponding PDCCH. For example, the explicit mapping may be used as a method for indicating or deriving the corresponding PUCCH resource index from among predetermined sets according to the RRC structure by the ACK/NACK Resource Indicator (ARI) value contained in the corresponding PDCCH.

Cases in which ACK/NACK feedback for DL is needed in a subframe n can be largely classified into the following three cases (Case 1, Case 2, Case 3).

Case 1: ACK/NACK feedback is needed for PDSCH(s) indicated by PDCCH(s) detected at the subframe(s) n−k. In this case, K is denoted by (k∈K), K is changed according to the subframe index (n) and UL-DL structure, and is comprised of M elements $\{k_0, k_1, \ldots k_{M-1}\}$. Table 3 shows K composed of M elements $\{k_0, k_1, \ldots k_{M-1}\}$ (i.e., K: $\{k_0, k_1, \ldots k_{M-1}\}$). Case 1 relates to PDSCH(s), each of which requires general ACK/NACK feedback. In the following description, Case 1 is referred to as 'ACK/NACK for PDSCH with PDCCH'.

Case 2: ACK/NACK feedback is needed for PDCCH(s) indicating DL SPS (Semi-Persistent Scheduling) release in subframe(s) (n−k). In this case, K is denoted by (k∈K), and K is identical to that of Case 1. The ACK/NACK of Case 2 may indicate ACK/NACK feedback for PDCCH(s) for SPS release. In contrast, although ACK/NACK feedback for DL SPS release is performed, ACK/NACK feedback for PDCCH(s) indicating SPS activation is not performed. In the following description, Case 2 is referred to as 'ACK/NACK for DL SPS release'.

Case 3: ACK/NACK feedback is needed for transmission of PDSCH(s) having no PDCCH(s) detected at the subframe(s) n−k. In this case, K is denoted by (k∈K), and K is identical to that of Case 1. Case 3 relates to PDSCH(s) without PDCCH(s), and may indicate ACK/NACK feedback for SPS PDSCH(s). In the following description, Case 3 is referred to as 'ACK/NACK for DL SPS'.

In the following description, the above-mentioned PDSCHs and PDCCHs, each of which requires the ACK/NACK feedback, may be generically named as DL allocation or DL transmission. That is, the PDSCH with PDCCH (i.e., PDSCH with corresponding PDCCH), the PDCCH for DL SPS release, and the PDSCH without PDCCH (i.e., PDSCH without corresponding PDCCH) may be generically named as DL allocation or DL transmission.

TABLE 3

Downlink association set index K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of the FDD, M is always set to 1, and K is denoted by $(\{k_0\}=\{4\})$.

Figure 28:
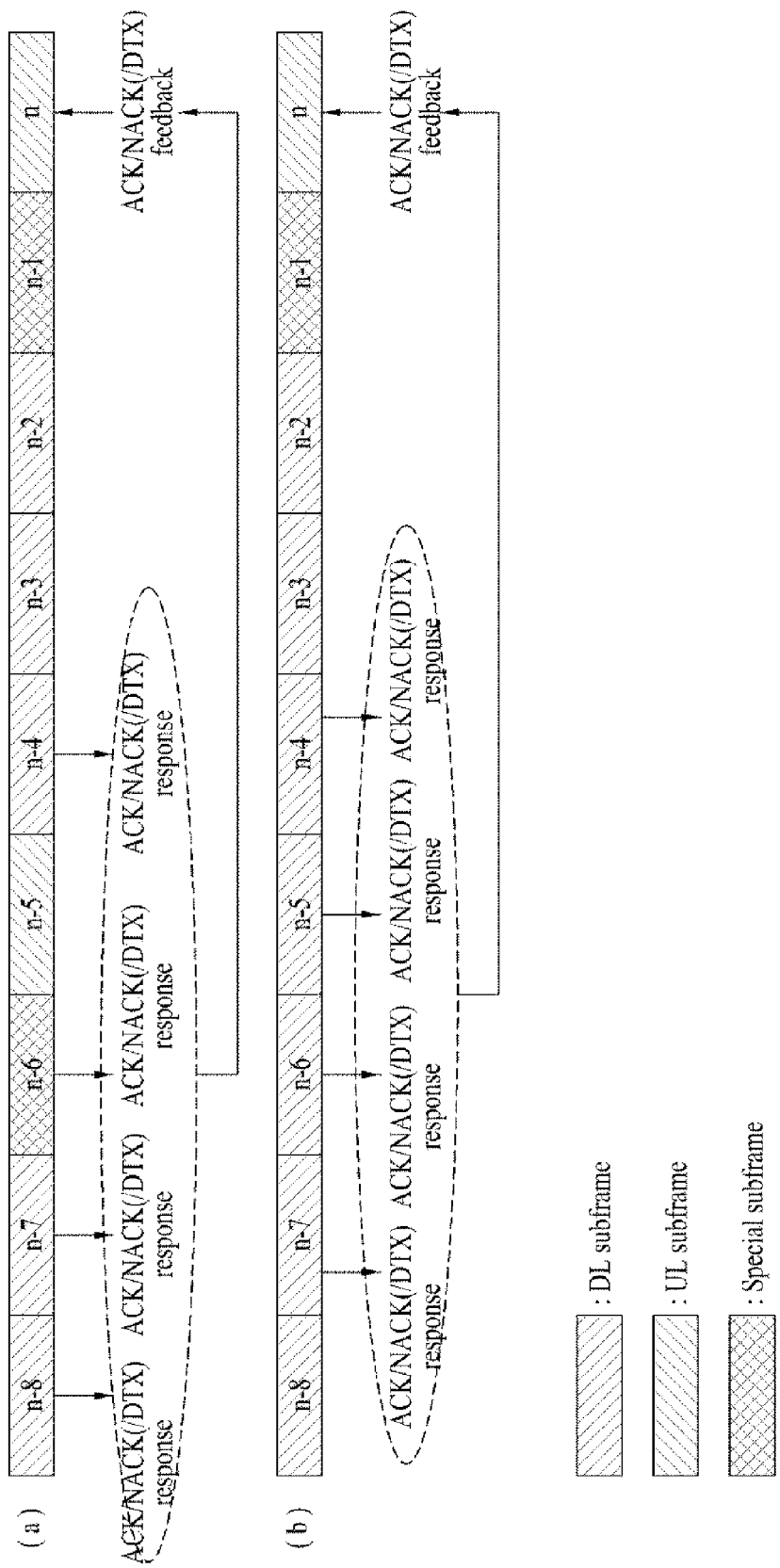
FIG. 28 shows an exemplary TDD UL-DL structure.

FIG. 28 shows an exemplary TDD UL-DL structure. Specifically, FIG. 28 shows a 4DL:1UL structure in which one UL ACK/NACK feedback is performed for 4 DL transmissions.

In case of the TDD UL-DL structure 2, as can be seen from FIG. 28(a), ACK/NACK (/DTX) responses for DL transmission at the subframes n−8, n−7, n−4 and n−6 may be transmitted as one ACK/NACK feedback to the BS at the subframe n of which subframe number is 2.

In case of the TDD UL-DL structure 4, as can be seen from FIG. 28(b), ACK/NACK(/DTX) responses for DL transmission at the subframes n−6, n−5, n−4 and n−7 may be transmitted as one ACK/NACK feedback to the BS at the subframe n of which subframe number is 3.

For convenience of description, the embodiments of the present invention will hereinafter be described on the following assumption. However, the scope or spirit of the present embodiments is not limited only to the following assumptions (1) to (7), and the present embodiments can also be applied to other examples as necessary.

(1) One PCell and one or more SCells may be present.
(2) PDSCH with corresponding PDCCH may be present in PCell and SCell(s).
(3) PDCCH indicating SPS release may be present only in PCell.
(4) PDSCH without PDCCH (=SPS PDSCH) may be present only in PCell.
(5) Cross-scheduling by PCell for SCell(s) is supported.
(6) Cross-scheduling by SCell(s) for PCell is not supported.
(7) Cross-scheduling by SCell(s) for other SCell(s) can be supported.

The present invention provides a variety of embodiments for transmitting ACK/NACK information for SPS without PDCCH (hereinafter referred to as SPS PDSCH) and/or at least one PDCCH in the CA TDD environment.

In the meantime, a DTX status may occur in a UE of a multi-carrier system. For example, provided that N component carriers (CCs) are configured and a base station (BS) performs data scheduling on only N' CCs smaller in number than N CCs, (N−N') CCs may be a DTX status. In another example, provided that a UE fails to detect a specific CC after allocated the specific CC for a downlink (DL), the specific CC may be a DTX status. If the BS recognizes a DTX status of the UE, this recognition may unavoidably affect performance of Incremental Redundancy (IR)-based HARQ. For example, if DTX occurs, the UE cannot be aware of PDCCH transmission such that it cannot store the decoded soft bit resultant value of a PDSCH in a soft buffer. Therefore, if DTX occurs, the BS may not change redundancy version (RV) during HARQ retransmission or has to transmit as many systematic bits as possible. However, if the BS does not recognize a DTX status of a UE and so performs retransmission using other RV values, RV is unavoidably changed and systematic bits are damaged during retransmission, resulting in deterioration in system throughput. For the above-mentioned reasons, the DTX status is preferably discriminated via ACK/NACK transmission.

In the embodiments of the present invention, a method for discriminating a DTX status via ACK/NACK transmission can be broadly classified into the following two methods 1) and 2).

Method 1) DTX status is separately defined and the corresponding information is then transmitted.

In Method 1, provided that ACK/NACK for $U_{DAI}(=1)$ PDCCH transmissions and ACK/NACK for $N_{SPS}(=0)$ SPS PDSCH transmission are simultaneously needed, and one or more DTX states occur in the bundling window, ACK/NACK responses for individual cases are transmitted as a different response discriminated from (bundled) NACK. In addition, if ACK/NACK for $U_{DAI}(=1)$ PDCCH transmissions and ACK/ANCK for $N_{SPS}(=0)$ SPS PDSCH transmission are simultaneously required, and if a DTX status occurs at earliest time from among times for which ACK/NACK feedback is required or at the foremost subframe from among subframes for which ACK/NACK feedback is required, an ACK/NACK response can be transmitted as a different response discriminated from (bundled) NACK. In this case, $U_{DAI}$ denotes as the total number of PDCCH with assigned PDSCH transmission(s) and PDCCH indicating DL SPS release detected by a UE within subframe(s) n–k (k?K). $N_{SPS}$ denotes the number of PDSCH transmission(s) without a corresponding PDCCH within subframe(s) n–k (k?K). In this case, DTX occurrence means that the UE fails to detect one or more PDCCHs from among PDCCHs allocated by the BS. In this case, the UE can determine a DTX status using a DAI transmitted on a PDCCH. Table 4 shows exemplary DAI values.

TABLE 4

Value of Downlink Assignment Index

| DAIMSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

표 4 에서, 특정 서브프레임에서 검출된 $V_{DAI}^{UL}$ 값은 서브프레임 (들) n–k (k∈K) 상기 특정 서브프레임까지에서 할당 전송을 갖는 PDCCH 및 PDCCH 중 DL SPS 해제를 나타내는 PDCCH 의 누적 (accumulative) 개수를 의미하며, 서브프레임마다 업데이트된다., 해당 UE 를 위한 PDSCH In Table 4, $V_{DAI}^{UL}$ detected at a specific subframe indicates the accumulative number of accumulated PDCCH(s) with assigned PDSCH transmission(s) and PDCCH indicating downlink SPS release up to the present subframe within subframe(s) n–k (k?K) and is updated per subframe. If PDSCH for the corresponding UE is not transmitted and PDCCH for DL SPS release is not present, $V_{DAI}^{UL}$ for the corresponding UE is set to 4.

For example, since DAI is updated from subframe to subframe, when the UE receives one PDCCH having DAI=01, then the UE can recognize that PDCCH having DAI=00 was missed.

Method 2) In case of a DTX status, the corresponding information is not transmitted.

In Method 2, in the case in which ACK/NACK for one or more PDCCHs and ACK/NACK for SPS without PDCCH are simultaneously needed, and one or more DTX states occur in the bundling window, an ACK/NACK response for the above-mentioned case is not transmitted such that the ACK/NACK response can be distinguished from the (bundled) NACK. In addition, if ACK/NACKs for one or more PDCCHs and ACK/NACK for SPS without PDCCH are simultaneously needed, and if a DTX status occurs at earliest time from among times for which ACK/NACK feedback is required or at the foremost subframe from among subframes for which ACK/NACK feedback is required, an ACK/NACK response for the above-mentioned case is not transmitted such that the ACK/NACK response can be distinguished from the (bundled) NACK.

Although Method 1 and Method 2 may be used even when bundling ACK/NACK is performed in FDD, for convenience of description, the present embodiments will hereinafter be described with reference to an exemplary case in which bundling of ACK/NACK is performed in TDD. In addition, although the ACK/NACK bundling may be used in PUCCH Format 3, the present embodiment will hereinafter be described with reference to the case of using channel selection for convenience of description and better understanding of the present invention. The present embodiments will hereinafter be described with reference to the case of applying a 4DL:1UL TDD structure for one ACK/NACK feedback to time domain bundling. In this case, DAI for each CC independently indicates the number of accumulative PDCCHs for each CC. For convenience of description and better understanding of the present invention, it is assumed that 2-bit ACK/NACK information for each CC is transmitted. In addition, it is assumed that only one of PDCCH and SPS PDSCH can be transmitted for a UE per CC in one DL subframe. If multiple codewords (MCW) are transmitted for a UE in one subframe, it is assumed that the ACK/NACK response for the corresponding subframe (i.e., the ACK/NACK response for each PDCCH or SPS PDSCH) is composed of 1 bit using spatial bundling acting as bundling between codewords. Spatial bundling may be carried out by a predefined logical operation (e.g., a logical AND operation) of ACK/NACK responses for individual codewords. In the following description, one ACK/NACK response indicates one PDSCH or ACK/NACK information for each PDSCH. If MCW transmission is applied, one ACK/NACK response indicates ACK/NACK generated by spatial bundling. If multiple DL subframes are configured in one CC, multiple ACK/NACK responses matched to the multiple DL subframes on a one to one basis can be generated, and the multiple ACK/NACK responses are bundled in a time domain so that the bundled result can be denoted by one piece of ACK/NACK information for each CC. When further considering a DTX state for each CC, an ACK/NACK/DTX response for each DL transmission will be detected. For convenience of description and better understanding of the present invention, not only the ACK/NACK response but also the ACK/NACK/DTX response will hereinafter be referred to as "ACK/NACK response", and not only the ACK/NACK information but also the ACK/NACK/DTX information will hereinafter be referred to as "ACK/NACK information".

Figure 29:
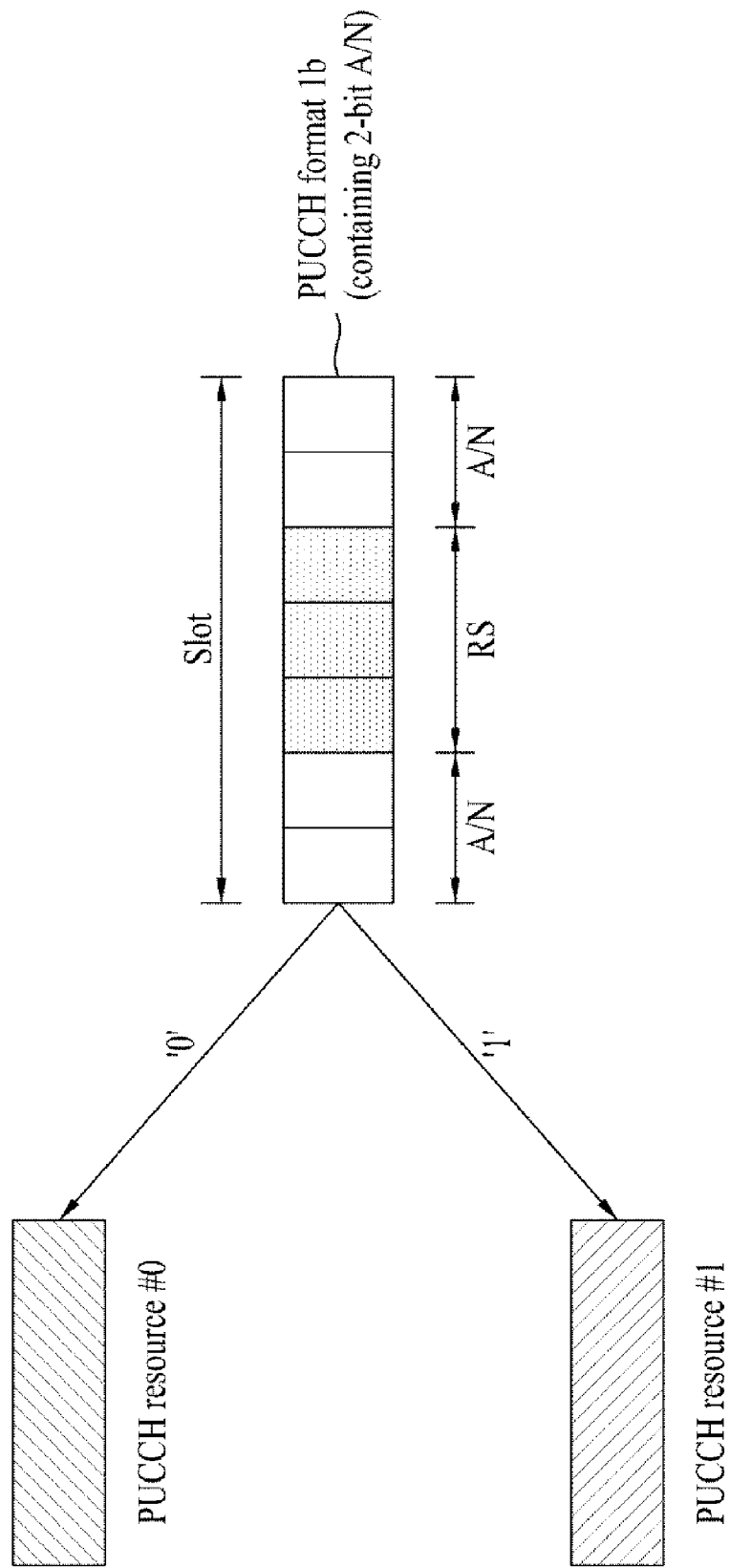
FIG. 29 exemplarily shows ACK/NACK transmission based on channel selection.

FIG. 29 shows exemplary ACK/NACK transmission based on channel selection.

Referring to FIG. 29, in case of PUCCH format 1b for ACK/NACK information of 2 bits, two PUCCH resources (PUCCH resources #0 and #1) may be configured. When transmitting ACK/NACK information of 3 bits, 2 bits from among 3 bits of ACK/NACK information may be represented through PUCCH format 1b, and the remaining one bit may be represented by which resource is selected from among two PUCCH resources. For example, it may be assumed that transmitting UCI using PUCCH resource #0 indicates a value of 0, and transmitting UCI using PUCCH resource #1 indicates a value of 1. Therefore, one bit (0 or 1) can be represented by selecting one of the two PUCCH resources, such that not only 2 bits of ACK/NACK information expressed through PUCCH format 1b but also an additional one bit of ACK/NACK information can be represented. In other words, n bits explicitly carried by one PUCCH resource can represent a maximum of $2^n$ ACK/NACK states. In contrast, when x (m≥1≥x) PUCCH resources from among m (m>1) PUCCH resources for channel selection are selected to transmit ACK/NACK information, the number of expressible ACK/NACK states is increased to a maximum of $(2^n)*({}_mC_x)$. For example, as can be seen from FIG. 29, a maximum of 4 ACK/NACK states $((2^n*({}_2C_1)=4)$ can be represented by applying 2-bit PUCCH format 1b with channel selection for ACK/NACK transmission.

Although channel selection can be applied irrespective of the number of CCs, the present embodiments will hereinafter be described with reference to the case in which ACK/NACK information of two CCs is transmitted using channel selection based on PUCCH format 1b for convenience of description and better understanding of the present invention.

FIGS. 30 to 37 illustrate various embodiments for transmitting ACK/NACK information representing even the DTX status. Although SPS PDSCH without PDCCH is not shown in FIGS. 30 to 37, the present embodiments can be applied not only to the SPS PDSCH without PDCCH, but also to every DL transmission requiring ACK/NACK feedback. In FIGS. 30 to 37, it is assumed that a UE receives a PDCCH with DAI=00 in an ACK status on a component carrier CC0 and then misses the next PDCCH with DAI=01. It is assumed that, on CC1, the UE misses a PDCCH with DAI=00, receives a PDCCH with DAI=01 in an ACK status, and receives a PDCCH with DAI=10 in a NACK status. Although FIGS. 30 to 37 exemplarily show two DL CCs, the present embodiments can also be applied to other numbers of DL CCs.

Referring to FIGS. 30 to 37, the UE can detect the presence or absence of a missed PDCCH using a DAI contained in the PDCCH. The UE may generate the bundled ACK/NACK information as ACK/NACK information for the detected PDCCH and/or the missed PDCCH. For example, the UE may generate the bundled NACK to be transmitted for PDCCH(s) and/or SPS PDSCH(s) received on CC1. Since the UE firstly receives a PDCCH with DAI=01 on CC1, it can recognize that a PDCCH with DAI=01 or less (i.e., a PDCCH with DAI=00) was missed. However, if the last PDCCH(s) are missed in a time domain, the UE is unable to recognize whether the last PDCCH was missed or not. That is, if the last PDCCH has been missed on a CC, it is impossible for the UE to recognize the correct ACK/NACK state of the CC. In order to solve the aforementioned problem, the UE of the present invention represents the ACK/NACK state of the corresponding CC by 2-bit ACK/NACK information bits 'b0b1' according to any one of the mapping embodiments 1 to 13, such that it can transmit the resultant ACK/NACK information bits on a PUCCH. The ACK/NACK information bits may be transmitted by channel selection using PUCCH formats 1a/1b, may be transmitted by PUCCH format 3, or may be transmitted by channel selection using PUCCH format 3.

The present embodiments for representing the missing PDSCH with PDCCH, the missing PDCCH for SPS release, or the missing PDSCH (SPS PDSCH) without PDCCH (i.e., the missing DL transmission) using ACK/NACK information transmission will hereinafter be described in detail. For reference, the following mapping embodiments exemplarily show mapping between the ACK/NACK state and information bits. Although the mapping relationship between the ACK/NACK state and the information bits is different, if a method for processing the missed PDCCH or the missed SPS PDSCH is the same, this situation may indicate the same mapping embodiments.

[ACK/NACK with DAI]

In the mapping embodiments 1 to 3, if the bundled ACK/NACK is set to ACK, ACK/NACK information for the corresponding CC may further represent not only pure ACK/NACK information but also a DAI value contained in the last detected PDCCH, such that each ACK/NACK state is mapped to information bits.

Mapping Embodiment 1

Table 5 exemplarily shows the mapping of multiple ACK/NACK responses to (b0,b1) according to the mapping embodiment 1.

TABLE 5

| For multiple ($U_{DAI}$ + $N_{SPS}$) ACK/NACK responses | b0, b1 |
| --- | --- |
| (Bundled) NACK with any DAI | 00 |
| (Bundled) ACK with DAI = 00 or 11 | 01 |
| (Bundled) ACK with DAI = 01 | 10 |
| (Bundled) ACK with DAI = 10 | 11 |

In the mapping embodiment 1, if the bundled ACK/NACK for a CC is set to ACK, different ACK/NACK information is generated according to the last DAI value received in the ACK status. Referring to FIG. 5, if a DAI of the last PDCCH of the ACK status is set to 00(=0) or 11(=3), 2-bit ACK/NACK for the corresponding CC becomes 01. If a DAI of the last PDCCH of the ACK status is set to 01, 2-bit ACK/NACK for the corresponding CC becomes 10. If a DAI of the last PDCCH of the ACK status is set to 10, 2-bit ACK/NACK for the corresponding CC becomes 11. In accordance with the mapping embodiment 1, since a DAI initially received by the UE is transmitted along with ACK/NACK information to the BS, the BS can recognize that PDCCH(s) and/or SPS PDSCH(s) transmitted prior to transmission of a specific PDCCH carrying the last ACK DAI in the corresponding CC have been missed by the UE. In addition, the BS can recognize that a PDCCH carrying the last ACK DAI and PDCCHs prior to this PDCCH have been successfully received by the UE.

Figure 30:
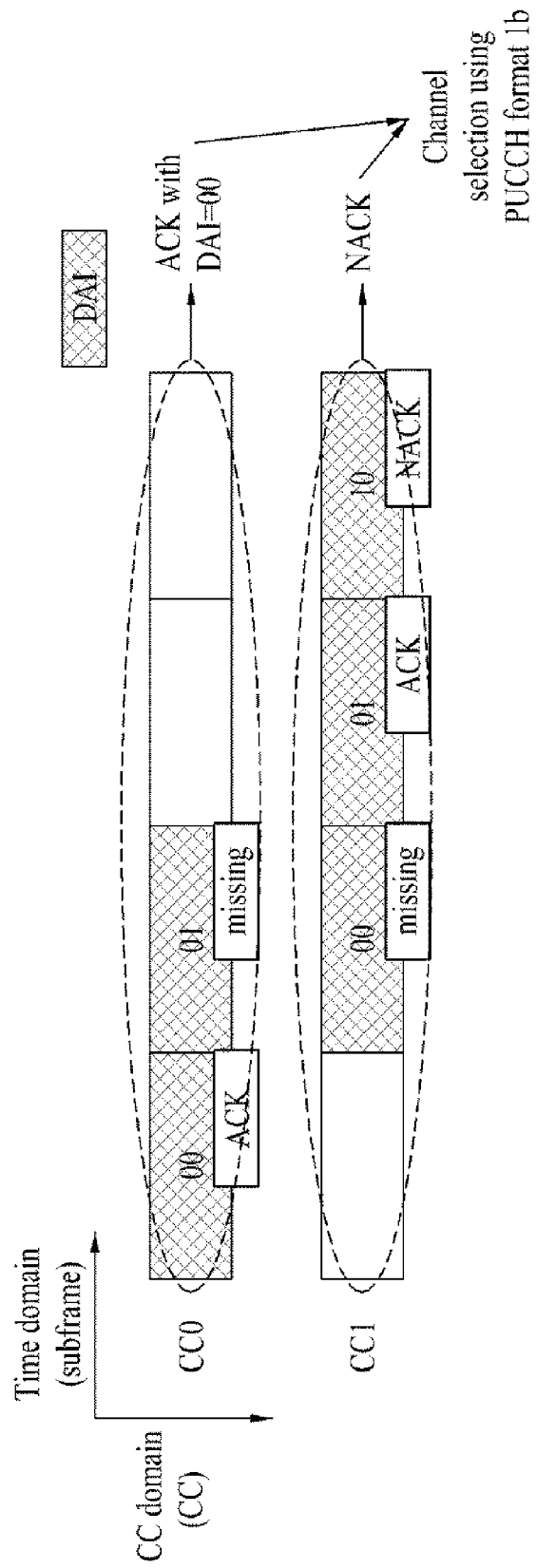
FIGS. 30 to 37 illustrate embodiments for transmitting ACK/NACK information further representing a discontinuous transmission (DTX) state.

Referring to Table 5 and FIG. 30, a PDCCH with DAI=00 is successfully received on CC0 and the bundled ACK/NACK for CC0 is ACK, the UE can generate 2 bit ACK/NACK information '01' for the CC0. Since the bundled ACK/NACK for CC1 is NACK, the UE can generate 2-bit ACK/NACK information '00' for the CC1.

Mapping Embodiment 2

Table 6 exemplarily shows the mapping of multiple ACK/NACK response to (b0,b1) according to the mapping embodiment 2.

TABLE 6

| For multiple ($U_{DAI}$ + $N_{SPS}$) ACK/NACK responses | b0, b1 |
| --- | --- |
| UE detects at least one DL assignment is missed or no DL assignment is received | DTX (or N/A) |
| (Bundled) NACK with any DAI | 00 |
| (Bundled) ACK with DAI = 00 or 11 | 01 |
| (Bundled) ACK with DAI = 01 | 10 |
| (Bundled) ACK with DAI = 10 | 11 |

If a PDCCH other than the last PDCCH has been missed, the UE can detect that the PDCCH has been missed. In this case, according to the mapping embodiment 1, the UE may include information indicating the presence of missed DL transmission in ACK/NACK information of the corresponding CC, and transmits the resultant ACK/NACK information to the BS. That is, the mapping embodiment 1 may indicate not only the absence of PDCCH and SPS PDSCH which are determined as NACK PDCCH in the corresponding CC, but also indicate the presence or absence of the missed PDCCH. Differently from the mapping embodiment 1, the mapping embodiment 2 may transmit information regarding the presence or absence of the missed PDCCH in a different way from general ACK/NACK information, or may transmit no response as necessary.

Figure 31:
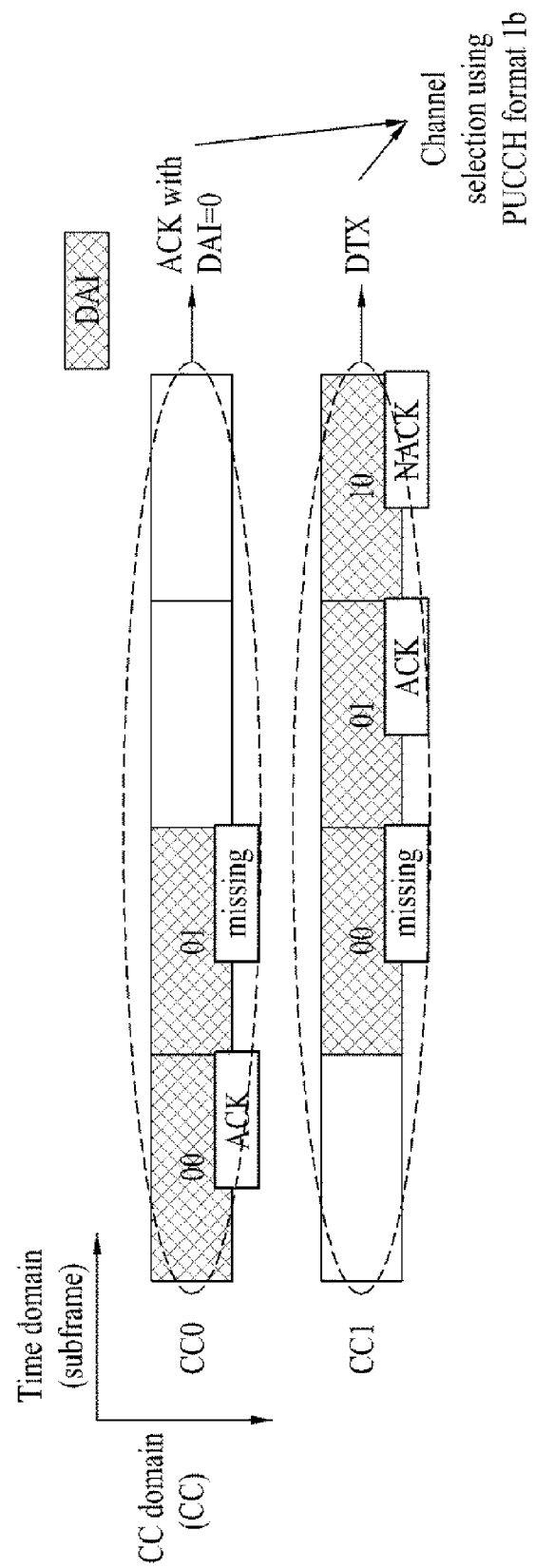

Referring to Table 6 and FIG. 31, although the UE detects only a PDCCH with DAI=00 on CC0 in an ACK status, the UE cannot detect that a PDCCH with DAI=01 is missed since the PDCCH with DAI=01 is missed. As a result, the UE can generate 2-bit ACK/NACK information '01' for CC0. Since the UE initially detects a PDCCH of DAI=01 on CC1, the can recognize that the PDCCH of DAI=00 has been missed.

In accordance with the mapping embodiment 2, if the UE detects that aPDCCH is missed, the ACK/NACK response for the corresponding CC is configured as information bits indicating a DTX status and is then transmitted to the BS. The DTX status may be mapped to the same information bits as information bits indicating a different ACK/NACK state. In accordance with the mapping embodiment 2, if the UE detects that a PDCCH is missed, the ACK/NACK response for the corresponding CC may not be transmitted to the BS as necessary. In this case, no transmission of the ACK/NACK information regarding the CC may indicate the presence of a PDCCH missed in the CC.

Referring to Table 6, the UE checks the missing of at least one DL transmission or a DTX status of DL transmission. If the ACK/NACK state for a specific CC corresponds to the checked state, transmission or non-transmission of ACK/NACK information is carried out according to the DTX status definition. If the ACK/NACK state for the specific CC does not correspond to the checked state, a different ACK/NACK state is selected.

Mapping Embodiment 3

Table 7 exemplarily shows the mapping of multiple ACK/NACK responses to (b0,b1) according to the mapping embodiment 3.

TABLE 7

| For multiple ($U_{DAI}$ + $N_{SPS}$) ACK/NACK responses | b0, b1 |
| --- | --- |
| UE detects the first DL assignment is missed or no DL assignment is received | DTX (or N/A) |
| (Bundled) NACK with any DAI | 00 |
| (Bundled) ACK with DAI = 00 or 11 | 01 |
| (Bundled) ACK with DAI = 01 | 10 |
| (Bundled) ACK with DAI = 10 | 11 |

The mapping embodiment 2 may indicate missing of at least one DL transmission or no reception of DL transmission using either non-transmission of ACK/NACK information of the corresponding CC or the mapping of the ACK/NACK information to information bits indicating a DTX status. In other words, the mapping embodiment 2 may indicate the case in which at least one of PDCCH and SPS PDSCH (i.e., at least one DL transmission) has been missed in the corresponding CC, separately from other cases. In contrast, the mapping embodiment 3 may indicate the case in which first DL transmission (e.g., PDCCH of DAI=00) from among ACK/NACK responses of individual subframes has been missed and the other case in which no DL transmission is received, differently from other cases.

Referring to Table 7 and FIG. 31, after a UE firstly detects a PDCCH of DAI=00 on CC0, the UE does not receive any DL transmission. As a result, the UE generates 2-bit ACK/NACK information '01' for CC0. The UE can detect that the PDCCH of DAI=00 is missed because the PDCCH of DAI=00 is firstly detected on CC1. The UE according to the mapping embodiment 3 may transmit ACK/NACK information regarding CC1 from which the first PDCCH has been missed to the BS, where the transmitted CC1 ACK/NACK information may be configured as information bits corresponding to the DTX status. Alternatively, the UE according to the mapping embodiment 3 may not transmit the ACK/NACK information regarding the CC1 from which a first PDCCH has been missed to the BS. In this case, non-transmission of the ACK/NACK information regarding the CC1 may indicate the missing of first DL transmission of the CC1.

Referring to Table 7, the UE checks the missing of first DL transmission or a DTX status of DL transmission. If the ACK/NACK state of the specific CC corresponds to the checked result, transmission or non-transmission of ACK/NACK information is performed according to the DTX status definition. Otherwise, a different ACK/NACK state is selected.

[ACK/NACK with ACK-Counter]

The mapping embodiments 1 to 3 represent that information bits indicate (bundled) ACK or (bundled) NACK of the corresponding CC, and also represent a DAI value of a PDCCH for the last ACK response from among ACK responses constructing the bundled ACK. In contrast, according to the mapping embodiments 4 to 6, if the bundled ACK/NACK is set to ACK, the ACK/NACK information for the corresponding CC may further indicate not only pure ACK/NACK information but also ACK-counter information. Each ACK/NACK state is mapped to information bits. In this case, the ACK-counter may indicate the number of ACK responses.

Mapping Embodiment 4

Table 8 exemplarily shows the mapping of multiple ACK/NACK responses to (b0,b1) according to the mapping embodiment 4.

TABLE 8

| For multiple ($U_{DAI}$ + $N_{SPS}$) ACK/NACK responses | b0, b1 |
| --- | --- |
| (Bundled) NACK with any ACK-counter | 00 |
| (Bundled) ACK with ACK-counter = 1 or 4 | 01 |
| (Bundled) ACK with ACK-counter = 2 | 10 |
| (Bundled) ACK with ACK-counter = 3 | 11 |

Although the missing of DL transmission on a CC is detected by the UE, the missing of DL transmission on the CC is not separately distinguished from ACK/NACK information of the CC, such that the mapping embodiment 4 is similar to the mapping embodiment 1. Although ACK/NACK information of the mapping embodiment 1 indicates the last DAI value detected as the ACK status in the corresponding CC, ACK/NACK information according to the mapping embodiment 4 may indicate the number of ACK responses participating in (bundled) ACK generation of the corresponding CC. Provided that for each CC one subframe results in one ACK/NACK response, the number of ACK responses participating in generating ACK information of four DL subframes is set to any one of 1 to 4.

Figure 32:
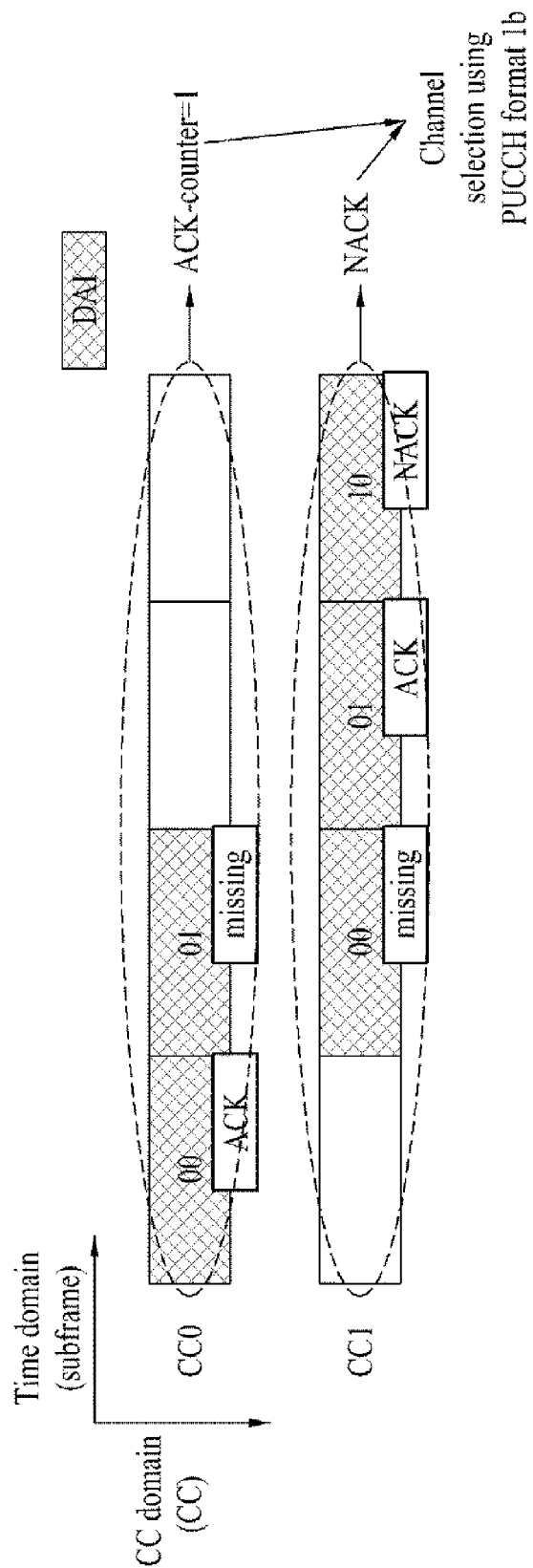

Referring to Table 8 and FIG. 32, since one PDCCH is successfully received on CC0, the UE may generate 2-bit ACK/NACK information '01' indicating that the number of ACK DL transmissions on the CC0 is set to 1. Since the bundled ACK/NACK for CC1 is set to NACK, the UE may generate 2-bit ACK/NACK information '00' for the CC1 irrespective of the number of ACKs.

Mapping Embodiment 5

Table 9 exemplarily shows the mapping of multiple ACK/NACK responses to (b0,b1) according to the mapping embodiment 5.

TABLE 9

| For multiple ($U_{DAI}$ + $N_{SPS}$) ACK/NACK responses | b0, b1 |
| --- | --- |
| UE detects at least one DL assignment is missed or no DL assignment is received | DTX (or N/A) |
| (Bundled) NACK with any ACK-counter | 00 |
| (Bundled) ACK with ACK-counter = 1 or 4 | 01 |
| (Bundled) ACK with ACK-counter = 2 | 10 |
| (Bundled) ACK with ACK-counter = 3 | 11 |

If a PDCCH other than the last PDCCH has been missed, the UE can detect the missing of the PDCCH. In this case, according to the mapping embodiment 4 (or the mapping embodiment 1), the UE includes specific information indicating the presence of the missed PDCCH in ACK/NACK information of the corresponding CC, and transmits the resultant ACK/NACK information to the BS. According to the mapping embodiment 4, not only information indicating the absence of a NACK PDCCH and SPS PDSCH in the corresponding CC but also ACK-counter can be represented by ACK information of the corresponding CC. Differently from the mapping embodiment 4, ACK/NACK information of a CC including the missed DL transmission according to the mapping embodiment 5 may be separately defined to represent a DTX status, or non-transmission of the ACK/NACK information may also be used to represent a DTX status.

Figure 33:
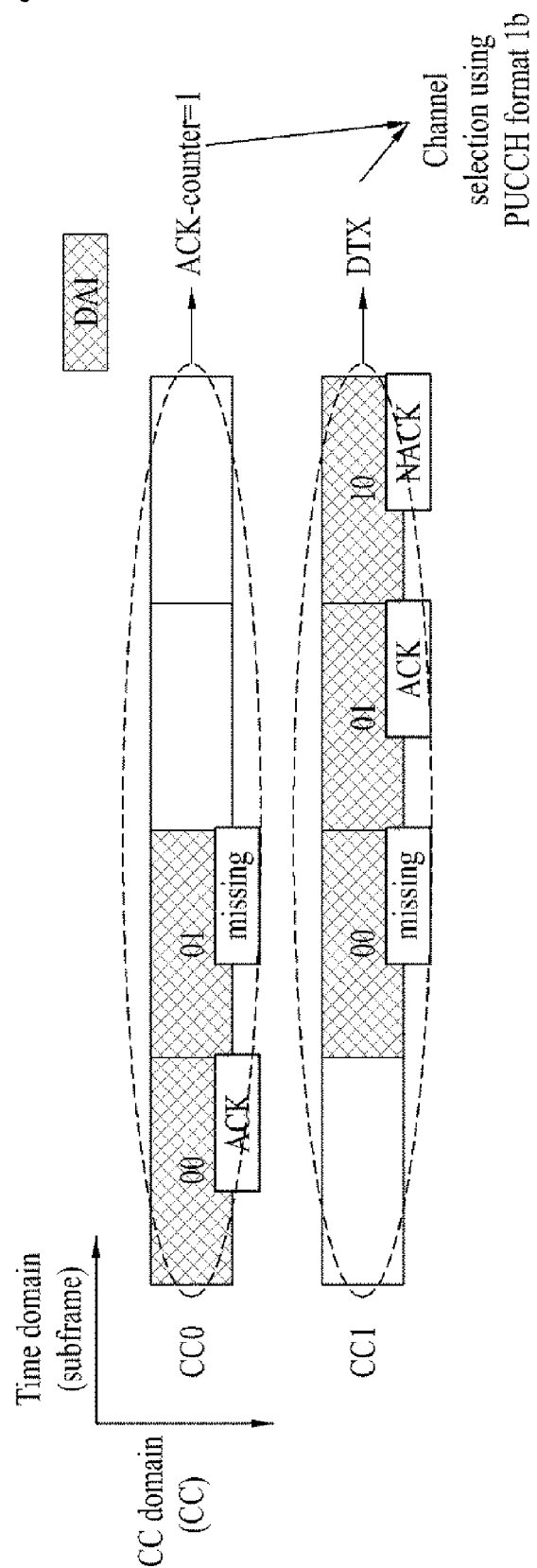

Referring to Table 9 and FIG. 33, although the UE detects only a PDCCH of DAI=00 on CC0 as an ACK, the UE is unable to detect the missing of a PDCCH with DAI=01 because the PDCCH with DAI=01 is missed. As a result, the UE generates 2-bit ACK/NACK information '01' for CC0. Since the UE firstly detects a PDCCH of DAI=01 on CC1, it can detect the missing of PDCCH with DAI=01. For CC1, information bits corresponding to 'DTX' instead of '00' are generated. Information bits corresponding to the DTX status may be set to any one of 00, 01, 10, and 11. That is, the DTX status may be transmitted as information bits overlapping other ACK/NACK states. In addition, according to the mapping embodiment 5, if the UE detects the missing of PDCCH, the ACK/NACK response of the corresponding CC may not be transmitted to the BS at all. In this case, non-transmission of ACK/NACK information related to a CC may indicate the presence of a PDCCH missed in the CC.

Referring to Table 9, the UE checks whether a current status is a DTX (or N/A) status. If an ACK/NACK state of the specific CC corresponds to the DTX (or N/A) status, the UE performs ACK/NACK transmission or non-transmission according to DTX (or N/A) definition. Otherwise, the UE selects a different ACK/NACK state.

Mapping Embodiment 6

Table 10 exemplarily shows the mapping of multiple ACK/NACK responses to (b0,b1) according to the mapping embodiment 6.

TABLE 10

| For multiple ($U_{DAI}$ + $N_{SPS}$) ACK/NACK responses | b0, b1 |
| --- | --- |
| UE detects the first DL assignment is missed or no DL assignment is received | DTX (or N/A) |
| (Bundled) NACK with any ACK-counter | 00 |
| (Bundled) ACK with ACK-counter = 1 or 4 | 01 |
| (Bundled) ACK with ACK-counter = 2 | 10 |
| (Bundled) ACK with ACK-counter = 3 | 11 |

The mapping embodiment 5 does not transmit ACK/NACK information of the corresponding CC or maps the ACK/NACK information to information bits indicating a DTX status and transmits the mapped result, in order to represent the missing status of at least one DL transmission or non-reception status of DL transmission. That is, the mapping embodiment 5 represents the case in which at least one of PDCCH and SPS PDSCH (i.e., at least one DL transmission) has been missed in the corresponding CC, differently from other cases. Differently from the mapping embodiment 5, the mapping embodiment 6 differentiates, from other cases, the case in which first DL transmission (for example, a PDCCH of DAI=00) from among ACK/NACK responses of individual subframes has been missed or the case in which no DL transmission is received.

Referring to Table 10 and FIG. 33, the UE firstly detects a PDCCH of DAI=00 on CC0 and does not receive any DL transmission after the first detection of the PDCCH. As a result, the UE generates 2-bit ACK/NACK information '01'. The UE firstly detects a PDCCH of DAI=01 on CC1, such that it can detect the missing of the PDCCH having DAI=01. The UE for use in the mapping embodiment 6 transmits ACK/NACK information for CC1 in which first DL transmission has been missed to the BS using information bits corresponding to the DTX status. Alternatively, the UE for use in the mapping embodiment 6 may not transmit ACK/NACK information for CC1 in which first DL transmission has been missed to the BS. In this case, non-transmission of the CC1 ACK/NACK information may indicate missing of first DL transmission of the CC1.

Referring to Table 10, the UE checks whether a current status is a DTX (or N/A) status. If an ACK/NACK state of a specific CC corresponds to the DTX (or N/A) status, the UE performs ACK/NACK transmission or non-transmission according to DTX (or N/A) definition. If the ACK/NACK state of the specific CC does not correspond to the DTX (or N/A) status, the UE selects a different ACK/NACK state.

[ACK-Counter as ACK/NACK]

According to the mapping embodiments 7 to 9, if the bundled ACK/NACK is ACK, ACK/NACK information of the corresponding CC is transmitted in the form of an ACK-counter. In this case, the ACL-counter may indicate the number of ACK responses.

Mapping Embodiment 7

Table 11 exemplarily shows mapping of multiple ACK/NACK responses to (b0,b1) according to the mapping embodiment 7.

TABLE 11

| For multiple ($U_{DAI}$ + $N_{SPS}$) ACK/NACK responses | b0, b1 |
|---|---|
| ACK-counter = 0 or None (UE detects at least one DL assignment is missed) | 00 |
| ACK-counter = 1 or 4 | 01 |
| ACK-counter = 2 | 10 |
| ACK-counter = 3 | 11 |

Figure 34:
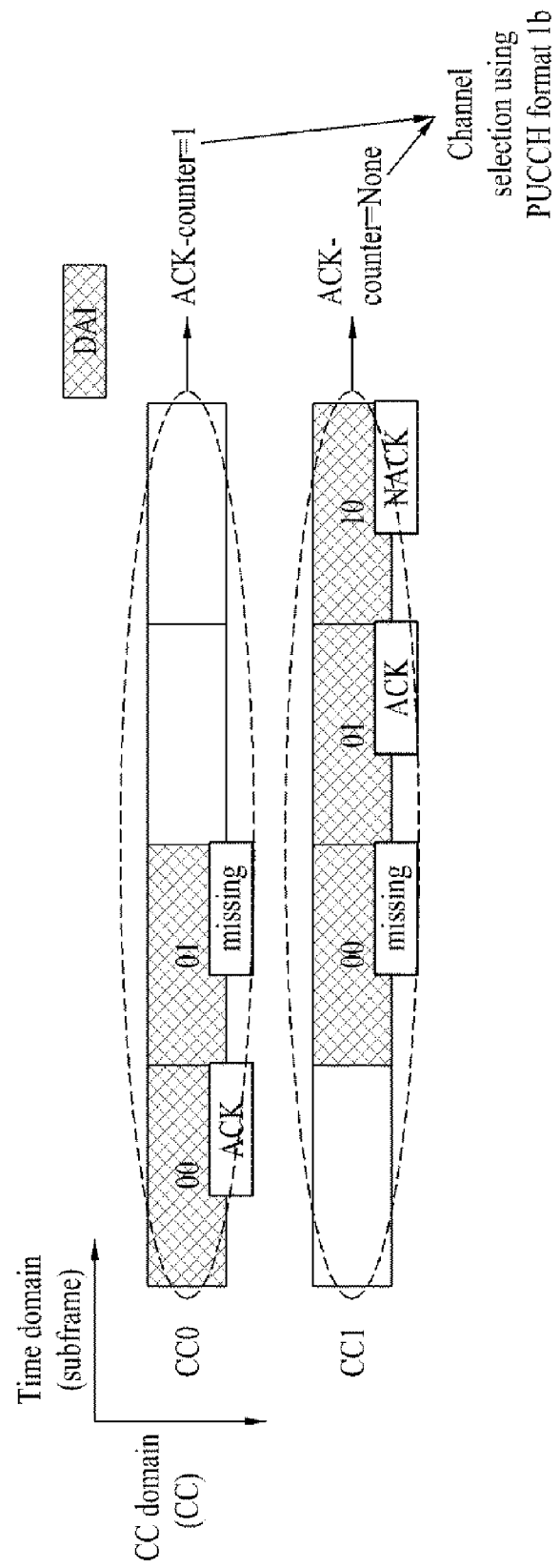

Referring to Table 11 and FIG. 34, in CC0, one PDCCH is successfully received and a second PDCCH has been missed. However, since the UE does not detect the missing of the second PDCCH, the UE generates 2-bit ACK/NACK information '01' indicating that the number of DL transmissions of which responses are ACK in CC0 is 1. In contrast, a PDCCH with DAI=01 is detected in CC1, such that the UE can detect the missing of PDCCH with DAI=00 in the CC1. This situation means "ACKcounter=None". For the CC1 irrespective of the number of ACK responses detected in the corresponding CC, the UE may generate 2-bit ACK/NACK information '00' indicating that at least one DL transmission has been missed in the CC1.

In case of "ACK-counter=0", for example, information bits '00' may also be generated as ACK/NACK information of the corresponding CC even when all DL transmission for use in a CC is set to NACK.

Mapping Embodiment 8

Table 12 exemplarily shows mapping of multiple ACK/NACK responses to (b0,b1) according to the mapping embodiment 8.

TABLE 12

| For multiple ($U_{DAI}$ + $N_{SPS}$) ACK/NACK responses | b0, b1 |
|---|---|
| UE detects at least one DL assignment is missed or no DL assignment is received | DTX (or N/A) |
| ACK-counter = 0 | 00 |
| ACK-counter = 1 or 4 | 01 |
| ACK-counter = 2 | 10 |
| ACK-counter = 3 | 11 |

If a PDCCH other than the last PDCCH has been missed, the UE can detect the missing of the PDCCH. In this case, according to the mapping embodiment 11, the UE includes specific information indicating the presence of the missed PDCCH in ACK/NACK information of the corresponding CC, and transmits the resultant ACK/NACK information to the BS. According to the mapping embodiment 8, not only information indicating the absence of a NACK PDCCH and SPS PDSCH in the corresponding CC but also information indicating the presence or absence of missed DL transmission may be designated by ACK/NACK information of the corresponding CC. Differently from the mapping embodiment 7, according to the mapping embodiment 8, information regarding the presence of the missed PDCCH may be transmitted in a different way from general ACK/NACK information, or may also be denoted by transmission of no response.

Figure 35:
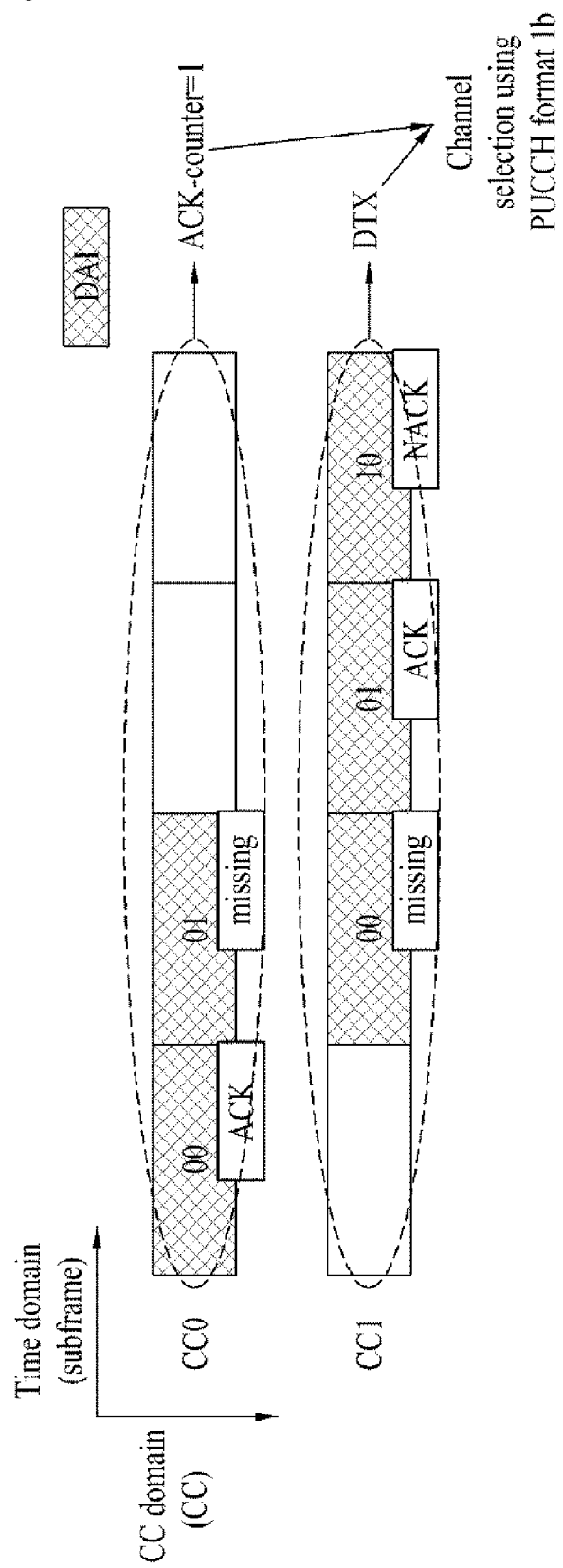

Referring to Table 12 and FIG. 35, the UE detects that only a PDCCH with DAI=00 on CC0 is ACK, and is unable to detect the missing of the PDCCH with DAI=01 because the PDCCH with DAI=01 is missed. As a result, the UE generates 2-bit ACK/NACK information '01' for CC0. Since the UE firstly detects a PDCCH with DAI=01 on CC1, it can detect the missing PDCCH of DAI=00 on CC1. Therefore, for the CC1 irrespective of the number of ACK responses detected in the CC1, the UE may generate 2-bit ACK/NACK information '00' indicating that at least one DL transmission has been missed in the CC1. Information bits corresponding to the ACKcounter=1, instead of information bits corresponding to the DTX status, may be generated as ACK/NACK information. The information bits corresponding to the DTX status may be set to any one of 00, 01, 10, and 11. That is, the DTX status may be transmitted as information bits overlapping other ACK/NACK states. In addition, according to the mapping embodiment 8, if the UE detects a missing of a PDCCH, the ACK/NACK response of the corresponding CC may not be transmitted to the BS at all. In this case, non-transmission of ACK/NACK information related to a CC may indicate the presence of a PDCCH missed in the CC.

Referring to Table 12, the UE checks whether a current status is a DTX (or N/A) status. If an ACK/NACK state of the specific CC corresponds to the DTX (or N/A) status, the UE performs ACK/NACK transmission or non-transmission according to DTX (or N/A) definition. Otherwise, the UE selects a different ACK/NACK state.

Mapping Embodiment 9

Table 13 exemplarily shows the mapping of multiple ACK/NACK responses to (b0,b1) according to the mapping embodiment 9.

TABLE 13

| For multiple ($U_{DAI}$ + $N_{SPS}$) ACK/NACK responses | b0, b1 |
|---|---|
| UE detects the first DL assignment is missed or no DL assignment is received | DTX (or N/A) |
| ACK-counter = 0 | 00 |
| ACK-counter = 1 or 4 | 01 |
| ACK-counter = 2 | 10 |
| ACK-counter = 3 | 11 |

The mapping embodiment 8 does not transmit ACK/NACK information of the corresponding CC or maps the ACK/NACK information to information bits indicating a DTX status and transmits the mapped result, in order to represent the missing status of at least one DL transmission or non-reception status of DL transmission. That is, the mapping embodiment 8 represents the case in which at least one of PDCCH and SPS PDSCH (i.e., at least one DL transmission) has been missed in the corresponding CC, differently from other cases. Differently from the mapping embodiment 8, the mapping embodiment 9 differentiates, from the other cases, the case in which first DL transmission (for example, a PDCCH of DAI=00) from among ACK/NACK responses of individual subframes has been missed, or the case in which no DL transmission is received.

Referring to Table 13 and FIG. 35, the UE firstly detects a PDCCH with DAI=00 on CC0 and does not receive any DL transmission after the first detection of the PDCCH. As a result, the UE determines the ACK/NACK state of the CC0 to be ACK with "ACK-counter=1" and generates 2-bit ACK/

NACK information '01'. The UE firstly detects a PDCCH with DAI=01 on CC1, such that it can detect the missing of a PDCCH with DAI=01 on CC1. The UE according to the mapping embodiment 9 transmits ACK/NACK information for CC1 in which first DL transmission has been missed to the BS using information bits corresponding to the DTX status. Alternatively, the UE for use in the mapping embodiment 9 may not transmit ACK/NACK information for CC1 in which first DL transmission has been missed to the BS. In this case, non-transmission of the CC1 ACK/NACK information may indicate the missing of first DL transmission of the CC1.

Referring to Table 13, the UE checks whether a current status is a DTX (or N/A) status. If an ACK/NACK state of a specific CC corresponds to the DTX (or N/A) status, the UE performs ACK/NACK transmission or non-transmission according to DTX (or N/A) definition. If the ACK/NACK state of the specific CC does not correspond to the DTX (or N/A) status, the UE selects a different ACK/NACK state.

[Contiguous ACK-Counter as ACK/NACK]

The UE can detect the presence or absence of a missed PDCCH using a DAI contained in a PDCCH for each CC. If NACK is transmitted through ACK/NACK bundling, the BS has to perform retransmission (HARQ) for all DL transmission(s)/assignment(s). Therefore, transmitting the greatest number of ACK responses to the BS during one ACK/NACK feedback can reduce the number of unnecessary retransmissions caused by the BS. In order to reduce the number of retransmissions by preserving ACK information as much as possible, the mapping embodiments 10 to 13 use a contiguous ACK-counter from first DL transmission, instead of a pure bundled ACK/NACK in which ACK/NACK responses of respective CCs are bundled, for ACK/NACK feedback. In the present invention, the contiguous ACK-counter may be defined for continuous DL transmission in a time domain, or may also be defined by other methods. For example, a contiguous ACK-counter is used in a time domain for DL transmission with PDCCH. In case of each DL transmission without PDCCH, the DL transmission without is located before or after DL transmission(s) with detected PDCCH(s), and then the entire ACK-counter can be calculated. The scope or spirit of the present invention is not limited to a method for deciding the order of ACK/NACK responses constructing the continuous-ACK counter. For convenience of description and better understanding of the present invention, the ACK-counter is defined on the basis of continuous DL transmission, and a detailed description thereof will hereinafter be described in detail. The contiguous ACK-counter from the first DL transmission indicates the number of contiguous ACK responses counted from the first DL transmission for which ACK/NACK feedback is required. If a response to the first DL transmission is an ACK and a NACK or DTX response occurs later, the UE assumes that all DL transmission from the NACK or DTX position has been missed, and feeds back the number of contiguous ACKs prior to the NACK or DTX as ACK/NACK information. If one or more ACK/NACK responses are bundled and transmitted, the BS having received the bundled ACK for CC from the UE is scheduled to perform retransmission of all DL transmission(s) transmitted on the CC. However, if ACK/NACK feedback is performed using the contiguous ACK-counter, retransmission for ACK response(s) located before a NACK or DTX response is not required, such that the number of DL transmission(s) requiring retransmission is reduced.

Mapping Embodiment 10

Table 14 exemplarily shows the mapping of multiple ACK/NACK responses to (b0,b1) according to the mapping embodiment 10.

TABLE 14

| For multiple ($U_{DAI}$ + $N_{SPS}$) ACK/NACK responses | b0, b1 |
| --- | --- |
| Response for the first PDSCH is NACK or the first PDSCH is missed | 00 |
| Contiguous ACK-counter from the first PDSCH = 1 or 4 | 01 |
| Contiguous ACK-counter from the first PDSCH = 2 | 10 |
| Contiguous ACK-counter from the first PDSCH = 3 | 11 |

Figure 36:
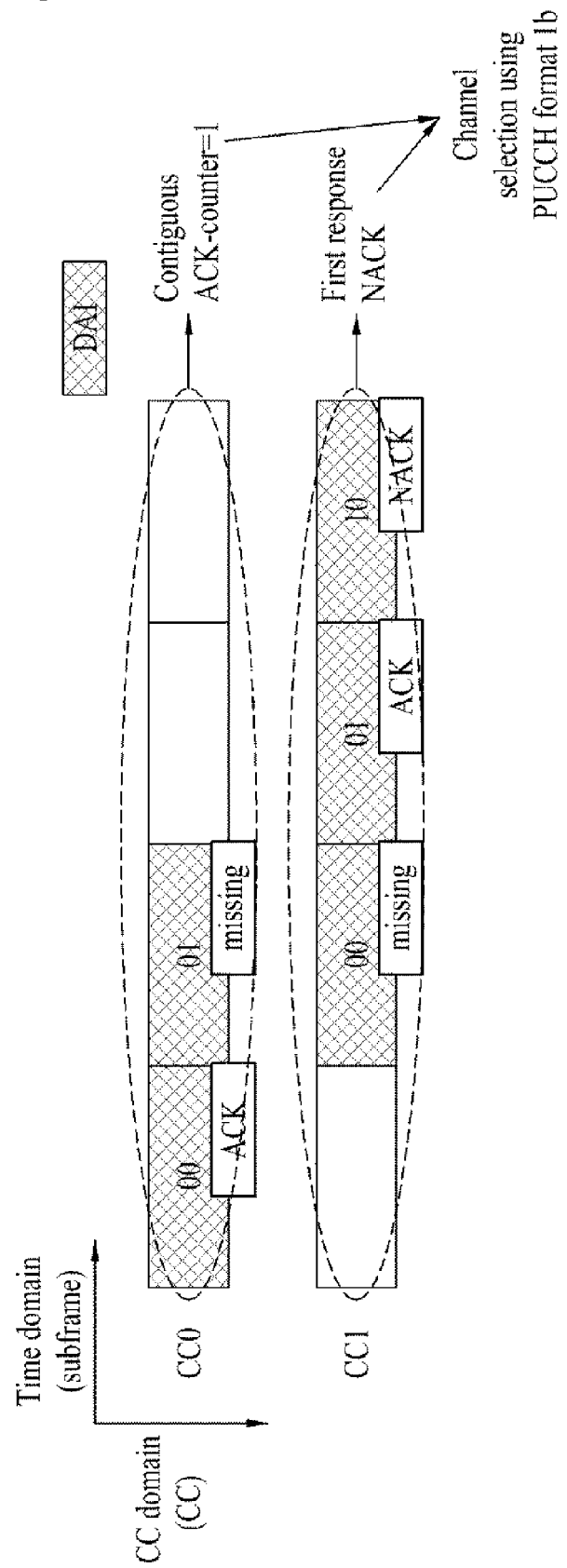

Referring to Table 14 and FIG. 36, a PDSCH with a PDCCH, which is the first DL transmission on CC0, is successfully received. In the CC0, the second PDCCH has been missed and the UE does not detect a PDSCH corresponding to the missed second PDCCH. The UE maps ACK/NACK information of CC0 to (b0,b1)=(0,1) which is corresponding to "contiguous ACK-counter from first transmission=1". In contrast, a PDCCH with DAI=01 is detected in CC1, such that the UE detects the missing of the PDCCH with DAI=00 in the CC1. Therefore, since an ACK/NACK response for the first DL transmission is ACK, "contiguous ACK-counter from the first DL transmission" is set to 0, the UE maps ACK/NACK responses for CC1 to (b0,b1)=(0,0) according to Table 14. Referring to Table 14, for the CC1 irrespective of the number of ACK responses detected in the corresponding CC, the UE mapps ACK/NACK responses for CC1 to (b0,b1)=(0,0) indicating that first DL transmission is not ACK.

Mapping Embodiment 11

Table 15 exemplarily shows the mapping of multiple ACK/NACK responses to (b0,b1) according to the mapping embodiment 11.

TABLE 15

| For multiple ($U_{DAI}$ + $N_{SPS}$) ACK/NACK responses | b0, b1 |
| --- | --- |
| UE detects at least one DL assignment is missed or no DL assignment is received | DTX (or N/A) |
| Response for the first PDSCH is NACK | 00 |
| Contiguous ACK-counter from the first PDSCH = 1 or 4 | 01 |
| Contiguous ACK-counter from the first PDSCH = 2 | 10 |
| Contiguous ACK-counter from the first PDSCH = 3 | 11 |

In the mapping embodiment 10, although ACK/NACK information for CC1 may indicate that a response to the first DL transmission is not an ACKresponse, it is impossible to determine whether the response to the first DL transmission is a NACK or a DTX. Differently from the mapping embodiment 10, the mapping embodiment 11 may transmit information regarding the presence of the missed DL transmission in a different way from general ACK/NACK information, or may transmit no response. In accordance with the mapping embodiment 11, the ACK/NACK response for CC1 may be denoted by information bits indicating a DTX status defined to indicate the presence of a missed PDSCH in the corresponding CC, instead of by information bits indicating a NACK status, or the ACK/NACK response for CC1 is not transmitted at all.

Figure 37:
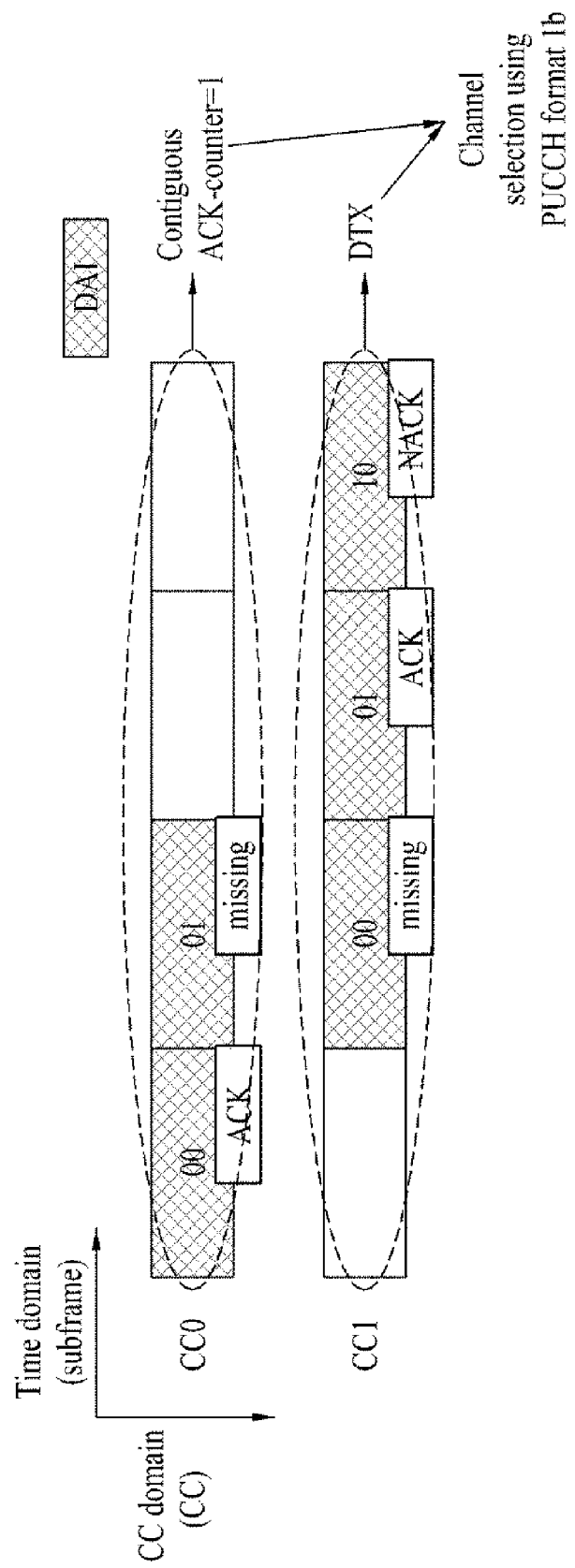

Referring to Table 15 and FIG. 37, a PDSCH with a PDCCH acting as first DL transmission on CC0 is successfully received. In CC0, the second PDCCH has been missed, such that the UE does not detect a PDSCH corresponding to the missed second PDCCH. Therefore, the UE can generate 2-bit ACK/NACK information 01 corresponding to "contiguous ACK-counter from first DL transmission=1" on the CC0. In contrast, PDCCH with DAI=01 is detected on CC1, such that the UE can detect the missing of PDCCH with DAI=00 on the CC1. Accordingly, for the CC1, the UE generates information bits corresponding to either the missing of at least one DL transmission or the absence of received DL transmission, instead of information bits corresponding to the NACK status, as ACK/NACK information. Referring to Table 15, information bits corresponding to the DTX status are generated as ACK/NACK information for CC1. The DTX status may be predefined to be mapped to any one of 00, 01, 10, and 11. In other words, the DTX status may be configured in the form of information bits overlapped with other ACK/NACK state, and may then be transmitted. Alternatively, according to the mapping embodiment 11, if missing of DL transmission is detected by the UE, the ACK/NACK response for the corresponding CC may not be transmitted to the BS at all. In this case, no transmission of ACK/NACK information for a CC may indicate the presence of DL transmission missed in the CC.

Referring to FIG. 15, the UE checks whether a current status is a DTX (or N/A) status. If an ACK/NACK state of the specific CC corresponds to the DTX (or N/A) status, the UE performs ACK/NACK transmission or non-transmission according to DTX (or N/A) definition. Otherwise, the UE selects a different ACK/NACK state.

Mapping Embodiment 12

Table 16 exemplarily shows the mapping of multiple ACK/NACK responses to (b0,b1) according to the mapping embodiment 12.

TABLE 16

| For multiple ($U_{DAI}$ + $N_{SPS}$) ACK/NACK responses | b0, b1 |
|---|---|
| UE detects the first DL assignment is missed or no DL assignment is received | DTX (or N/A) |
| Response for the first PDSCH is NACK | 00 |
| Contiguous ACK-counter from the first PDSCH = 1 or 4 | 01 |
| Contiguous ACK-counter from the first PDSCH = 2 | 10 |
| Contiguous ACK-counter from the first PDSCH = 3 | 11 |

The mapping embodiment 11 does not transmit ACK/NACK information of the corresponding CC or maps the ACK/NACK information to information bits indicating a DTX status and transmits the mapped result, in order to represent the missing status of at least one DL transmission or non-reception status of DL transmission. That is, the mapping embodiment 11 represents the case in which at least one DL transmission has been missed in the corresponding CC, differently from other cases. Differently from the mapping embodiment 11, the mapping embodiment 12 represents the case in which first DL transmission (for example, a PDCCH of DAI=00) from among ACK/NACK responses of individual subframes has been missed or the case in which any DL transmission is not received, differently from other cases.

Referring to Table 16 and FIG. 37, a PDSCH with a PDCCH, which is corresponding to the first DL transmission, is successfully received on CC0. If the second PDCCH has been missed in the CC0, and the UE does not detect a PDSCH corresponding to the missed second PDCCH, the UE can generate 2-bit ACK/NACK information '01' corresponding to "contiguous ACK-counter from first DL transmission=1" in the CC0. In contrast, a PDCCH with DAI=01 is detected in CC1 such that the UE detects missing PDCCH with DAI=00 in the CC1. Therefore, for the CC1, the UE generates information bits corresponding to the missing of first DL transmission or the absence of received DL transmission, instead of information bits corresponding to the NACK status, as ACK/NACK information. Referring to Table 16, information bits corresponding to the DTX status may be generated as ACK/NACK information for CC1. The DTX status may be established to be mapped to any one of 00, 01, 10, and 11. That is, the DTX status may be mapped to information bits overlapping other ACK/NACK states and then transmitted. Alternatively, according to the mapping embodiment 12, if the UE detects the missing of first DL transmission, the ACK/NACK response for the corresponding CC may not be transmitted to the BS at all. In this case, no transmission of CC-related ACK/NACK information may indicate the presence of DL transmission missed in the CC.

Referring to Table 16, the UE checks whether a current status is a DTX (or N/A) status. If an ACK/NACK state of the specific CC corresponds to the DTX (or N/A) status, the UE performs ACK/NACK transmission or non-transmission according to DTX (or N/A) definition. Otherwise, the UE selects a different ACK/NACK state.

Mapping Embodiments 13 and 14

Although the mapping embodiments 7 to 12 have described an ACK-counter of up to 4, it should be noted that the mapping embodiments 4 to 12 can also support a higher number ACK-counter (e.g., an ACK-counter of 8 or 9). The higher ACK-counter may be implemented by increasing the number of transmission bits of ACK/NACK information, and may also be implemented by the same number of transmission bits because the ACK-counter of 5 or higher overlaps with and is mapped to information bits regarding the ACK-counter of up to 4. If the higher ACK-counter is implemented by such overlapped mapping, the state of ACK-counter=0 (or None) excludes the overlapped mapping such that it can be distinguished from another state including no ACK information. If the ACK/NACK state of ACK-counter=0 is not mapped to the same ACK/NACK information bits as another ACK/NACK state, the mapping embodiments can support an ACK-counter of more than 4, and a detailed description thereof is as follows.

Table 17 exemplarily shows the mapping of multiple ACK/NACK responses to (b0,b1) according to the mapping embodiment 13. Table 18 exemplarily shows the mapping of multiple ACK/NACK responses to (b0,b1) according to the mapping embodiment 14.

TABLE 17

| For multiple ($U_{DAI}$ + $N_{SPS}$) ACK/NACK responses | b0, b1 |
|---|---|
| UE detects at least one DL assignment is missed or no DL assignment is received | DTX (or N/A) |
| Response for the first PDSCH is NACK | 00 |
| Contiguous ACK-counter from the first PDSCH = 1 or 4 or 7 | 01 |
| Contiguous ACK-counter from the first PDSCH = 2 or 5 or 8 | 10 |
| Contiguous ACK-counter from the first PDSCH = 3 or 6 or 9 | 11 |

TABLE 18

| For multiple ($U_{DAI}$ + $N_{SPS}$) ACK/NACK responses | b0, b1 |
|---|---|
| UE detects the first DL assignment is missed or no DL assignment is received | DTX (or N/A) |
| Response for the first PDSCH is NACK | 00 |
| Contiguous ACK-counter from the first PDSCH = 1 or 4 or 7 | 01 |
| Contiguous ACK-counter from the first PDSCH = 2 or 5 or 8 | 10 |
| Contiguous ACK-counter from the first PDSCH = 3 or 6 or 9 | 11 |

In the mapping embodiment 13, under the condition that the missing of at least one DL transmission is detected or no DL transmission is received, ACK/NACK information for the corresponding CC may correspond to a DTX or N/A (not applicable) status. In the mapping embodiment 14, under the condition that the UE misses first DL transmission and receives no DL transmission, ACK/NACK information for the corresponding CC may correspond to the DTX or N/A status. For convenience of description and better understanding of the present invention, the DTX (or N/A status) will hereinafter be referred to as an 'ACK-counter=0' state.

States each having the ACK-counter of 4 or higher overlap with or are mapped to the remaining ACK/NACK information bits other than some information bits mapped to the 'ACK-counter=0' state. For example, ACK/NACK states corresponding to ACK-counters 1, 4 and 7 (i.e., contiguous ACK-counters from first DL transmission) are mapped to the same information bits '01', ACK/NACK states corresponding to ACK-counters 2, 5 and 8 (i.e., contiguous ACK-counters from first DL transmission) are mapped to the same information bits '10', and ACK/NACK states corresponding to ACK-counters 3, 6 and 9 (i.e., contiguous ACK-counters from first DL transmission) overlap with or are mapped to the same information bits '11'.

[Minimization of Overlapped Mapping Errors]

Meanwhile, referring to Tables 5 to 18, if ACK/NACK information indicating four or more multiple ACK/NACK responses needs to be transmitted, at least one ACK/NACK state may overlap with and be mapped to information bits. In this way, if the overlapped mapping is present, loss of information occurs by ACK/NACK states mapped to the same information bits. For example, it may be assumed that the ratio of DL to UL (DL:UL) for one ACK/NACK feedback is set to 4:1, namely, it may be assumed that ACK/NACK responses for 4 DL subframes are collected and transmitted in one UL subframe. If the BS performs DL transmission or DL assignment for the UE in all the four DL subframes, the UE may receive the corresponding DL transmission in any one of ACK, NACK, and DTX states. In this case, the DTX status means that the corresponding DL transmission is not received or has been missed.

Hereinafter, problems caused by such overlapped mapping and various embodiments capable of reducing the number of the problems caused by overlapped mapping will hereinafter be described with reference to Table 9. In the following tables, 'A' indicates the ACK status, 'N' indicates the NACK status, and 'D' indicates the DTX status. In addition, 'N/D' indicates the NACK or DTX status, and 'any' indicates one arbitrary status from among the ACK, NACK, and DTX states. In the following tables, it is assumed that the probability that the UE detects the ACK status in response to DL transmission is set to 0.9 (90%), the probability that the UE detects the NACK status in response to DL transmission is set to 0.09 (9%), and the probability of causing the missed status (or the probability of detecting the DTX status) is set to 0.01 (1%). However, it should be noted that the probability of errors to be mentioned in the following description are calculated without considering the probability of PDCCH detection. Generally, the probability of PDCCH detection is about 0.99 (99%), such that the probability of errors is less affected by the probability of PDCCH detection.

TABLE 19

| ACK/NACK state | ACK/NACK responses detected at UE | b0, b1 (to which ACK/NACK responses are mapped) | Probability | Success/Fail at BS (under no channel error) |
|---|---|---|---|---|
| 1 | A, A, A, A | 01 | $0.9^4 = 0.6561$ | ? (collision) |
| 2 | A, A, A, N/D | 11 | $(0.9^3) *$ $(0.09 + 0.01) =$ $0.0729$ | Success |

TABLE 19-continued

| ACK/NACK state | ACK/NACK responses detected at UE | b0, b1 (to which ACK/NACK responses are mapped) | Probability | Success/Fail at BS (under no channel error) |
|---|---|---|---|---|
| 3 | A, A, N/D, any | 10 | $(0.9^2) *$ $(0.09 + 0.01) =$ $0.0810$ | Success |
| 4 | A, N/D, any, any | 01 | $(0.9^1) *$ $(0.09 + 0.01) =$ $0.0900$ | ? (collision) |
| 5 | N, any, any | 00 | 0.09 | Fail |
| 6 | D, any, any, any | N/A | 0.01 | — |

In Table 19, 'A' indicates the ACK response, 'N' indicates the NACK response, 'N/D' indicates the NACK/DTX response, 'D' indicates the DTX response, and 'any' indicates an arbitrary response.

Referring to Table 19, ACK/NACK state 1 and ACK/NACK state 4 overlap a with the same ACK/NACK information (01). ACK/NACK information corresponding to the ACK/NACK state 1 may collide with ACK/NACK information corresponding to the ACK/NACK state 4. If the BS receives ACK/NACK information including such overlapping state, it is impossible for the BS to correctly analyze which ACK/NACK state is represented by the ACK/NACK information. For example, if the ratio of DL:UL configured by the BS for one ACK/NACK feedback is set to 4:1 and DL transmission is scheduled in 4 DL subframes, the BS having received the ACK/NACK feedback as '01' is unable to recognize whether the ACK/NACK feedback indicates the ACK/NACK state 1 or the ACK/NACK state 4. Although the UE transmits the ACK/NACK feedback corresponding to the ACK/NACK state 4 to the BS, if the BS recognizes the above-mentioned ACK/NACK feedback as the ACK/NACK state 1, there occur NACK-to-ACK errors through which the NACK and ACK are wrongly recognized. In general, in case of designing and operating the system, the probability of NACK-to-ACK errors needs to be less than 0.01% (=0.0001) or less. However, the probability of causing the ACK/NACK state 4 is 0.09 (9%) higher than a maximum allowable value of general NACK-to-ACK errors, such that unexpected problems may be encountered in HARQ processing. Therefore, in order to perform HARQ processing at a low error ratio, the corresponding state is preferably always considered to be the ACK/NACK state 4 including a less number of As.

In addition, although the DL:UL ratio for the ACK/NACK feedback is set to 4:1, the number of DL subframes in which DL transmission is scheduled for a specific UE by the BS may be established differently from the ratio of 4:1 as necessary. In other words, the DL:UL ratio for ACK/NACK feedback indicates the ratio of a maximum number of DL subframes capable of being fed back in one UL subframe, and another ACK/NACK feedback for a smaller number of DL subframes than the maximum number of DL subframes needs to be efficiently supported. For example, if the 4DL:1UL ratio for one ACK/NACK feedback is configured, simultaneous transmission of four ACK/NACK responses must be supported, and at the same time simultaneous transmission of one, two, or three ACK/NACK responses must be efficiently supported. However, due to ACK/NACK states mapped to the same information bits, the BS is unable to confirm correct ACK/NACK information on the basis of the ACK/NACK feedback transmitted using the overlap-mapped information bits. In order to solve this problem, scheduling performed by the BS may be restricted. For example, as can be seen from Table 19, the BS having received ACK/NACK information '01' may be configured not to perform scheduling corresponding to the ACK/NACK state 1 including many As, but to always perform scheduling corresponding to ACK/NACK states each including a smaller number of As, resulting in reduction in errors in which DL transmission requiring retransmission is mistaken for ACK and retransmission is not performed. For example, if the 4DL:1UL ratio is configured for one ACK/NACK feedback, the BS performs DL retransmission only in the three preceding DL subframes, resulting in reduction in errors in which DL transmission requiring retransmission is mistaken for ACK and retransmission is not performed. However, the above-mentioned scheduling restriction is not desirable in terms of system throughput.

Embodiments for minimizing errors caused by overlapped mapping of the ACK/NACK states will hereinafter be described in detail.

In order to minimize the number of errors encountered by the use of overlapped ACK/NACK state mapping, one embodiment of the present invention applies an additional condition to one or more states from among overlapped states.

In order to minimize the number of errors encountered by the use of overlapped ACK/NACK state mapping, there is needed an additional condition in which at least one of the overlapped states includes no NACK. For example, at least one of the overlapped states may be restricted to be used only when multiple ACK/NACKs detected or to be transmitted do not have any NACK. By means of the above-mentioned restriction, the BS can minimize confusion between the overlapped states when analyzing ACK/NACK responses corresponding to the overlapped states.

In order to minimize errors associated with the overlapped ACK/NACK state mapping, one embodiment of the present invention is designed to use an additional condition in which the DTX (or missed) status is not present in one or more overlapped states. For example, one or more overlapped states may be allowed to be used only when the DTX (or missed state) is not present in the detected multiple ACK/NACK states or multiple ACK/NACK states to be transmitted. The BS can minimize confusion among the overlapped states when analyzing ACK/NACK responses corresponding to the overlapped states.

Mapping Embodiment 15

In Table 20, one case in which a contiguous ACK-counter is set to 1 has the same mapping value as the other case in which a contiguous ACK-counter is set to 4, in the same manner as in Table 16. Differently from Table 16, according to Table 20, in the case in which the contiguous ACK-counter from among states overlap-mapped to '01' is set to 1, it is determined whether a current state includes no NACK. For example, as can be seen from Table 20, the ACK/NACK state in which there are no NACK responses and there is one contiguous ACK response is mapped to '01'. The other ACK/NACK state in which one contiguous ACK response is present and the detected NACK is also present corresponds to 'Otherwise' such that the 'Otherwise' state is mapped to '00'. The 'Otherwise' state means a plurality of states not contained in some states specified in Table 20. That is, the 'Otherwise' state is the remaining cases other than the ACK/NACK states 1, 2, 3, 4, 5, 7.

TABLE 20

| ACK/NACK state | For multiple ($U_{DAI}$ + $N_{SPS}$) ACK/NACK responses | b0, b1 |
| --- | --- | --- |
| 1 | Contiguous ACK-counter from the first PDSCH = 4 | 01 |
| 2 | Contiguous ACK-counter from the first PDSCH = 3 | 11 |
| 3 | Contiguous ACK-counter from the first PDSCH = 2 | 10 |
| 4 | Contiguous ACK-counter from the first PDSCH = 1 and UE detects there are no NACK response(s) | 01 |
| 5 | Response for the first PDSCH is NACK | 00 |
| 6 | Otherwise | 00 |
| 7 | UE detects the first DL assignment is missed or no DL assignment is received. | N/A |

In Table 20, one state in which first DL transmission is NACK is mapped to '00' in the same manner as in the 'Otherwise' case. NACK is detected starting from the first DL transmission, such that entire retransmission is required in any case. Therefore, one state in which first DL transmission is NACK may be combined with the 'Otherwise' state without being identified from the otherwise state. That is, multiple ACK/NACK responses may be mapped to information bits according to the following Table 21.

TABLE 21

| ACK/NACK state | For multiple ($U_{DAI}$ + $N_{SPS}$) ACK/NACK responses | b0, b1 |
| --- | --- | --- |
| 1 | Contiguous ACK-counter from the first PDSCH = 4 | 01 |
| 2 | Contiguous ACK-counter from the first PDSCH = 3 | 11 |
| 3 | Contiguous ACK-counter from the first PDSCH = 2 | 10 |
| 4 | Contiguous ACK-counter from the first PDSCH = 1 and UE detects there are no NACK response(s) | 01 |
| 5 | Otherwise | 00 |
| 6 | UE detects the first DL assignment is missed or no DL assignment is received. | N/A |

In the mapping embodiment 15, the mapping relationship between the corresponding ACK/NACK state and information bits (b0, b1) may be different from those of Tables 20 and 21. The mapping embodiment 15 is characterized in that [A, A, A, A] and [A, D, D, D] are mapped to the same information bits.

Mapping Embodiment 16

Referring to Table 22, the case corresponding to the contiguous ACK-counter of 1 has the same mapping values as those of the other case corresponding to the contiguous ACK-counter of 4 in the same manner as in Table 21. Differently from Table 21, in case of Table 22, if the contiguous ACK-counter from among several states overlap-mapped to '01' is 1, additional conditions are applied. For example, as can be seen from Table 22, the ACK/NACK state in which one contiguous ACK exists and other ACK/NACK responses are in the DTX state is mapped to '01'. A different ACK/NACK state in which one contiguous ACK exists and other ACK/NACK responses are not in the DTX state may correspond to the otherwise state, such that it is mapped to '00'. In this case, the otherwise case conceptually covers the remaining cases not pertaining to the states specified in Table 22. That is, the remaining cases not pertaining to the ACK/NACK states 1, 2, 3, 4, and 6 indicate the otherwise case.

The mapping embodiment 16 is characterized in that [A, A, A, A] and [A, D, D, D] are mapped to the same information bits. By means of Table 21, the probability of each ACK/

NACK state can be recalculated in the same manner as in Table 19, and the calculated probability is shown in the following Table 22.

TABLE 22

| ACK/NACK state | ACK/NACK responses detected at UE | b0, b1 (to which ACK/NACK responses are mapped) | Probability | Success/Fail at BS (under no channel error) |
|---|---|---|---|---|
| 1 | A, A, A, A | 01 | $0.9^4 = 0.6561$ | Almost Success (collision) |
| 2 | A, A, A, N/D | 11 | $(0.9^3) * (0.09 + 0.01) = 0.0729$ | Success |
| 3 | A, A, N/D, any | 10 | $(0.9^2) * (0.09 + 0.01) = 0.0810$ | Success |
| 4 | A, D, D, D | 01 | $(0.9^1) * (0.01^3) = 0.0000009$ | Fail (collision) |
| 5 | Otherwise | 00 | 0.18 | Fail |
| 6 | D, any, any, any | N/A | 0.01 | — |

In Table 22, 'A' is an ACK response, 'N' is a NACK response, 'N/D' is a NACK/DTX response, 'D' is a DTX response, and 'any' is an arbitrary response.

In Table 22, 'Otherwise' is a generic term of the remaining ACK/NACK sequences other than [A, A, A, A], [A, A, A, N/D], [A, A, N/D, any], [A, D, D, D], and [D, any, any, any]. For example, an ACK/NACK sequence of [N, any, any, any], an ACK/NACK sequence including at least one NACK located after the first ACK, and the like may correspond to the otherwise case.

Referring to Table 22, the probability of generating [A, D, D, D] is 0.0000009, which is much smaller than a maximum allowable value of a general NACK-to-ACK error. Therefore, the BS having received the ACK/NACK feedback set to '01' may regard as having received the ACK/NACK information indicating the ACK/NACK state 1 of [A, A, A, A]. If the UE transmitted the ACK/NACK state 4 of [A, N/D, any, any] in fact, a NACK-to-ACK error occurs. The probability of the ACK/NACK state 4 is much smaller than a maximum allowable value of the NACK-to-ACK error, to the point of being of no concern. Therefore, according to the mapping embodiment 16, the BS can freely assign resources to the UE without any scheduling restriction, and can receive/analyze the ACK/NACK feedback performed by the UE.

The mapping embodiment 16 can also be applied to ACK/NACK feedback of 1DL:1UL, 2DL:1UL, 3DL:1UL or 4DL:1UL. Referring to the mapping embodiment 16, if [A, A, A, A] and [A, D, D, D] are mapped to the same information bits, the number of DL subframes in which the BS performs DL transmission scheduling to the UE is 4 or less, it is impossible to generate [A, A, A, A], such that no overlapped mapping occurs in the range from the 3DL:1UL structure for one ACK/NACK feedback.

As previously stated above, the contiguous ACK-counter correctly transmits some ACKs to the BS such that the number of retransmission times can be minimized. If the ACK/NACK state is mapped to information bits as shown in Table 22, it is impossible for the contiguous ACK-counter to be correctly used in the 2DL:1UL structure for one ACK/NACK feedback. However, the efficiency of the contiguous ACK-counter is increased proportional to the DL:UL ratio for ACK/NACK feedback. Therefore, supporting the contiguous ACK-counter in the 3DL:1UL or 4DL:1UL structure can obtain a higher gain than the 2DL:1UL or 1DL:1UL structure.

Embodiments in which ACK/NACK responses for use in the 9DL:1UL structure are mapped to information bits will hereinafter be described in detail. The following embodiments can be applied to all TDD structures (1DL:1UL, 2DL:1UL, 3DL:1UL, 4DL:1UL, 9DL:1UL and the like). Alternatively, the following embodiments may be used only in the 9DL:1UL or the states shown in Table 21 may be applied to the remaining TDD structures.

Mapping Embodiment 17

Table 23 exemplarily shows the mapping of ACK/NACK responses of the mapping embodiment 17 capable of supporting the 9DL:1UL ACK/NACK feedback to (b0,b1).

TABLE 23

| For multiple ($U_{DAI} + N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detect there are no NACK response(s) and 'Contiguous ACK-counter from the first PDSCH' = 1 | 01 |
| 'Contiguous ACK-counter from the first PDSCH' = 2 | 10 |
| 'Contiguous ACK-counter from the first PDSCH' = 3 | 11 |
| 'Contiguous ACK-counter from the first PDSCH' = 4 | 01 |
| UE detect there are no NACK response(s) and 'Contiguous ACK-counter from the first PDSCH' = 5 | 10 |
| UE detect there are no NACK response(s) and 'Contiguous ACK-counter from the first PDSCH' = 6 | 11 |
| UE detect there are no NACK response(s) and 'Contiguous ACK-counter from the first PDSCH' = 7 | 01 |
| UE detect there are no NACK response(s) and 'Contiguous ACK-counter from the first PDSCH' = 8 | 10 |
| UE detect there are no NACK response(s) and 'Contiguous ACK-counter from the first PDSCH' = 9 | 11 |
| Otherwise | 00 |

The mapping embodiment 17 can support the 9DL:1UL structure by extending the mapping embodiment 15. For example, the scope of Table 20 can be extended in such a manner that the mapping embodiment 15 can further support the 9DL:1UL structure. In this case, the 9DL:1UL structure seldom occurs. Therefore, the mapping embodiment 17 is characterized in that the mapping embodiment 15, which is optimized for the 4DL:1UL structure, can be extended even to the 9DL:1UL structure, rather than in optimization for the 9DL:1UL structure. In Table 20, in the case in which the contiguous ACK-counter from the first DL transmission is any one of 5 to 9, all states for use in the above-mentioned case may overlap with other ACK/NACK states. In this case, if one condition "No NACK present" is added as shown in the mapping embodiment 15, multiple ACK/NACK responses for one CC may be represented by one piece of ACK/NACK information. Table 23 exemplarily shows the extended version for enabling Table 20 to support the 9DL:1UL structure.

In Table 23, one state in which first DL assignment is NACK is mapped to the same information bits '00' as in the otherwise case. NACK is included in DL assignment starting from the first DL assignment, such that entire retransmission is required in any case. Therefore, one state in which first DL assignment is NACK may be combined with the otherwise state without being differentiated from the otherwise state.

Mapping Embodiment 18

Table 24 exemplarily shows the mapping of ACK/NACK responses to (b0, b1) according to the mapping embodiment 18 capable of supporting the 9DL:1UL ACK/NACK feedback.

TABLE 24

| For multiple ($U_{DAI}$ + $N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detect there are no NACK/missing(/DTX) response(s) and 'Contiguous ACK-counter from the first PDSCH' = 1 | 01 |
| 'Contiguous ACK-counter from the first PDSCH' = 2 | 10 |
| 'Contiguous ACK-counter from the first PDSCH' = 3 | 11 |
| 'Contiguous ACK-counter from the first PDSCH' = 4 | 01 |
| UE detect there are no NACK/missing(/DTX) response(s) and 'Contiguous ACK-counter from the first PDSCH' = 5 | 10 |
| UE detect there are no NACK/missing(/DTX) response(s) and 'Contiguous ACK-counter from the first PDSCH' = 6 | 11 |
| UE detect there are no NACK/missing(/DTX) response(s) and 'Contiguous ACK-counter from the first PDSCH' = 7 | 01 |
| UE detect there are no NACK/missing(/DTX) response(s) and 'Contiguous ACK-counter from the first PDSCH' = 8 | 10 |
| UE detect there are no NACK/missing(/DTX) response(s) and 'Contiguous ACK-counter from the first PDSCH' = 9 | 11 |
| Otherwise | 00 |

Table 24 exemplarily shows another extension version of Table 20 so as to support the 9DL:1UL ACK/NACK feedback. As can be seen from Table 25, the condition "if there are no NACK or missing (/DTX) response(s)" is added to states (i.e., states of ACK-counters 5~9) that are additionally overlapped with those of Table 20. In this way, if the missing (or DTX) condition is added, it may be possible to reduce the probability that different ACK/NACK states overlap.

In Table 24, one state in which first DL transmission is NACK is mapped to the same information bits '00' as those of the otherwise state. Since the first DL transmission is NACK, retransmission for all DL transmissions is required in any case. Therefore, one state in which first DL transmission is NACK may be combined with the otherwise state without being differentiated from the otherwise state.

Mapping Embodiment 19

Table 25 exemplarily shows the mapping of ACK/NACK responses to (b0, b1) according to the mapping embodiment 19 capable of supporting the 9DL:1UL ACK/NACK feedback.

TABLE 25

| For multiple ($U_{DAI}$ + $N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detects there are no NACK response(s) and 'Contiguous ACK-counter from the first PDSCH' = 1 | 01 |
| 'Contiguous ACK-counter from the first PDSCH' = 2 | 10 |
| 'Contiguous ACK-counter from the first PDSCH' = 3 | 11 |
| 'Contiguous ACK-counter from the first PDSCH' = 4 | 01 |
| UE detect there are no NACK/missing(/DTX) response(s) and 'Contiguous ACK-counter from the first PDSCH' = 5 | 10 |
| UE detect there are no NACK/missing(/DTX) response(s) and 'Contiguous ACK-counter from the first PDSCH' = 6 | 11 |
| UE detect there are no NACK/missing(/DTX) response(s) and 'Contiguous ACK-counter from the first PDSCH' = 7 | 01 |
| UE detect there are no NACK/missing(/DTX) response(s) and 'Contiguous ACK-counter from the first PDSCH' = 8 | 10 |
| UE detect there are no NACK/missing(/DTX) response(s) and 'Contiguous ACK-counter from the first PDSCH' = 9 | 11 |
| Otherwise | 00 |

The mapping embodiment 18 can apply the missing (or DTX) condition not only to one case in which the ACK-counter is higher than 4 (e.g., the 9DL:1UL structure) but also to the other case in which the ACK-counter is identical to or less than 4 (for example, 1DL:1UL, 2DL:1UL, 3DL:1UL, 4DL:1UL), whereby it extends the mapping embodiment 15. In contrast, the mapping embodiment 19 applies the missing (/DTX) status only to the case in which the ACK-counter is higher than 4, whereby extends the mapping embodiment 15.

In Table 25, one state in which first DL transmission is NACK is mapped to the same information bits '00' as in the otherwise state. Since the first DL transmission is NACK, retransmission for every DL transmission is required in any case. Therefore, one state in which first DL transmission is NACK may be combined with the otherwise state without being differentiated from the otherwise state.

In the mapping embodiments 16 to 18, the presence or absence of NACK and the presence or absence of NACK/missing(/DTX) may be applied to states including a large number of ACK responses from among overlapping states. However, if multiple ACK/NACK feedbacks are needed, the probability of a small number of ACK responses is higher than the probability of a large number of ACK responses. For example, the probability of the ACK/NACK state of (A,A,A,D,D,D,D,D,D) is $(0.9^3)*(0.01^6)=7.2900*10^{-013}$, the probability of the ACK/NACK state of (A,A,A,A,A,A,A,A,A) is $(0.9^9)=0.3874$. However, the probability of the ACK/NACK state of (A,A,A,N/D,any,any,any,any,any) is $(0.9^3)*(0.09+0.01)=0.0729$. In this way, the probability of (A,A,A,N/D,any,any,any,any,any) is considerably high, such that the BS may have difficulty in analyzing the overlapping ACK/NACK states.

In order to solve the above-mentioned problem, when the ACK/NACK feedback for the 9DL:1UL configuration is additionally defined, in a contiguous ACK-counter with a small number, the presence or absence of NACK or the presence or absence of NACK/missing(/DTX) may be determined. If the mapping embodiments 17, 18, and 19 are changed using the above-mentioned method, the changed results may correspond to the mapping embodiments 20, 21 and 22.

Mapping Embodiment 20

Table 26 exemplarily shows the mapping of the ACK/NACK response to (b0,b1) according to the mapping embodiment 20.

TABLE 26

| For multiple ($U_{DAI}$ + $N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detect there are no NACK response(s) and 'Contiguous ACK-counter from the first PDSCH' = 1 | 01 |
| UE detect there are no NACK response(s) and 'Contiguous ACK-counter from the first PDSCH' = 2 | 10 |
| UE detect there are no NACK response(s) and 'Contiguous ACK-counter from the first PDSCH' = 3 | 11 |
| UE detect there are no NACK response(s) and 'Contiguous ACK-counter from the first PDSCH' = 4 | 01 |
| UE detect there are no NACK response(s) and 'Contiguous ACK-counter from the first PDSCH' = 5 | 10 |
| UE detect there are no NACK response(s) and 'Contiguous ACK-counter from the first PDSCH' = 6 | 11 |
| (UE detect there are no NACK response(s) and) 'Contiguous ACK-counter from the first PDSCH' = 7 | 01 |
| (UE detect there are no NACK response(s) and) 'Contiguous ACK-counter from the first PDSCH' = 8 | 10 |
| (UE detect there are no NACK response(s) and) 'Contiguous ACK-counter from the first PDSCH' = 9 | 11 |
| Otherwise | 00 |

Mapping Embodiment 21

Table 27 exemplarily shows the mapping of the ACK/NACK response to (b0,b1) according to the mapping embodiment 21.

TABLE 27

| For multiple ($U_{DAI}$ + $N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detect there are no NACK/missing(/DTX) response(s) and 'Contiguous ACK-counter from the first PDSCH' = 1 | 01 |
| UE detect there are no NACK/missing(/DTX) response(s) and 'Contiguous ACK-counter from the first PDSCH' = 2 | 10 |
| UE detect there are no NACK/missing(/DTX) response(s) and 'Contiguous ACK-counter from the first PDSCH' = 3 | 11 |
| UE detect there are no NACK/missing(/DTX) response(s) and 'Contiguous ACK-counter from the first PDSCH' = 4 | 01 |
| UE detect there are no NACK/missing(/DTX) response(s) and 'Contiguous ACK-counter from the first PDSCH' = 5 | 10 |
| UE detect there are no NACK/missing(/DTX) response(s) and 'Contiguous ACK-counter from the first PDSCH' = 6 | 11 |
| (UE detect there are no NACK/missing(/DTX) response(s) and) 'Contiguous ACK-counter from the first PDSCH' = 7 | 01 |
| (UE detect there are no NACK/missing(/DTX) response(s) and) 'Contiguous ACK-counter from the first PDSCH' = 8 | 10 |
| (UE detect there are no NACK/missing(/DTX) response(s) and) 'Contiguous ACK-counter from the first PDSCH' = 9 | 11 |
| Otherwise | 00 |

Mapping Embodiment 22

Table 28 exemplarily shows the mapping of the ACK/NACK response to (b0,b1) according to the mapping embodiment 22.

TABLE 28

| For multiple ($U_{DAI}$ + $N_{SPS}$) ACK/NACK responses | b0, b1 |
|---|---|
| UE detect the first DL assignment (e.g., DAI = 00) is missed or no DL assignment is received. | N/A |
| Response for the first PDSCH is NACK | 00 |
| UE detects there are no NACK response(s) and 'Contiguous ACK-counter from the first PDSCH' = 1 | 01 |
| 'Contiguous ACK-counter from the first PDSCH' = 2 | 10 |
| 'Contiguous ACK-counter from the first PDSCH' = 3 | 11 |
| 'Contiguous ACK-counter from the first PDSCH' = 4 | 01 |
| UE detect there are no NACK/missing(/DTX) response(s) and 'Contiguous ACK-counter from the first PDSCH' = 5 | 10 |
| UE detect there are no NACK/missing(/DTX) response(s) and 'Contiguous ACK-counter from the first PDSCH' = 6 | 11 |
| UE detect there are no NACK/missing(/DTX) response(s) and 'Contiguous ACK-counter from the first PDSCH' = 7 | 01 |
| UE detect there are no NACK/missing(/DTX) response(s) and 'Contiguous ACK-counter from the first PDSCH' = 8 | 10 |
| UE detect there are no NACK/missing(/DTX) response(s) and 'Contiguous ACK-counter from the first PDSCH' = 9 | 11 |
| Otherwise | 00 |

In the mapping embodiments 20 to 22, in the same manner as in a low-numbered contiguous ACK-counter, the condition indicating the presence or absence of NACK or the other condition indicating the presence or absence of NACK/missing(/DTX) are applied to the high-numbered contiguous ACK-counter (e.g., contiguous ACK-counters 7~9). However, the corresponding condition may be excluded from the high-number contiguous ACK-counters 7, 8 and 9 as necessary. The contiguous ACK-counter 7, 8 or 9 has a large number of ACK responses, such that information as to whether the condition indicating the presence or absence of NACK or the other condition indicating the presence or absence of NACK/missing(/DTX) is applied may not greatly affect the probability of causing the corresponding ACK/NACK state.

[ACK/NACK Transmission with Channel Selection]

If ACK/NACK information of multiple CCs is transmitted at one ACK/NACK feedback instance, 'b0b1' indicating the ACK/NACK state of each CC that has been described in the mapping embodiments 1 to 22 may not be actually transmitted. In another example, '0b1' of each CC may serve as intermediary information used when ACK/NACK information of multiple CCs is mapped to transmission resources or transmission bits.

Figure 38:
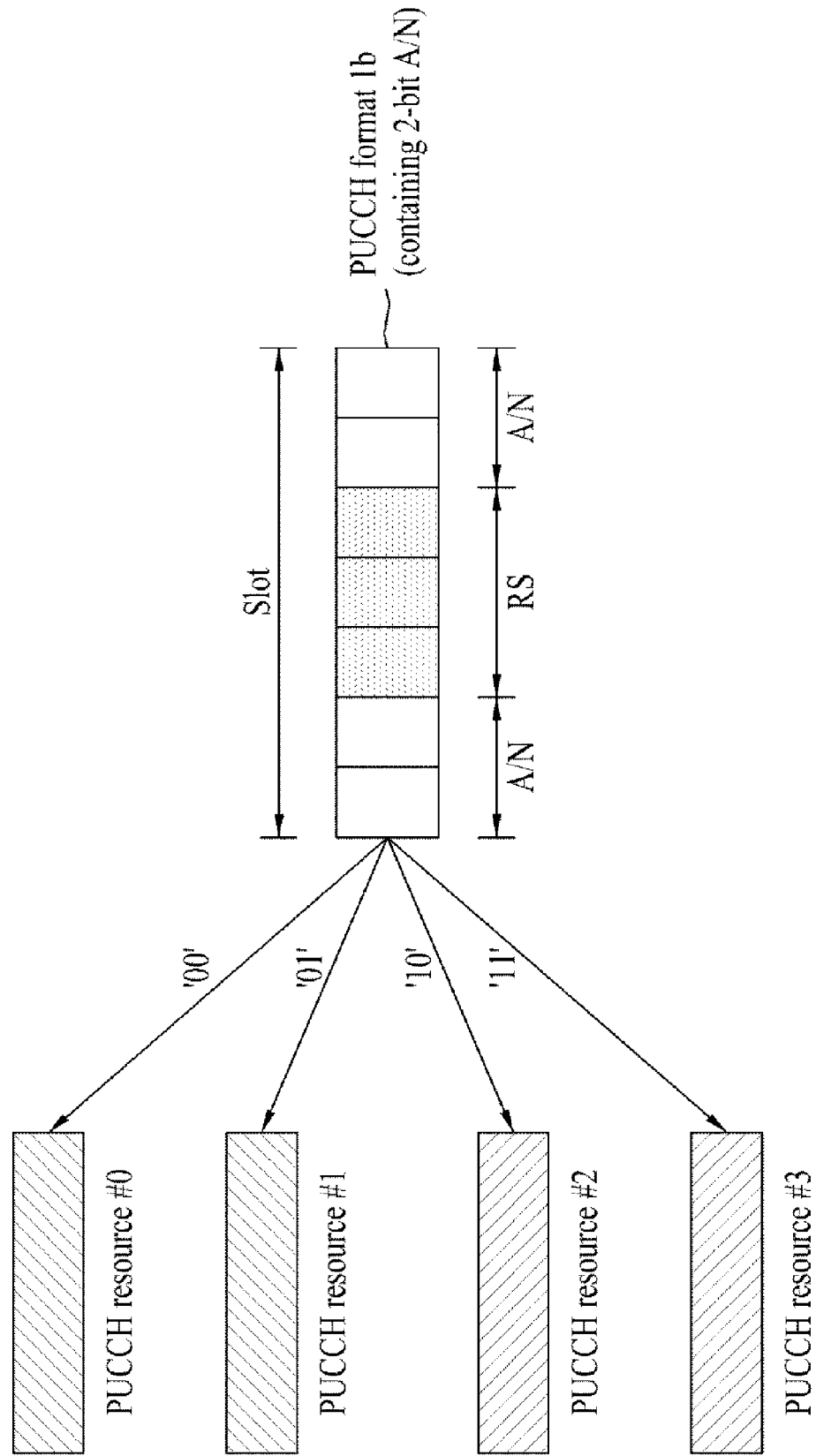
FIG. 38 is a conceptual diagram illustrating a method for transmitting ACK/NACK information of 4 bits using channel selection with PUCCH Format 1b.

FIG. 38 is a conceptual diagram illustrating a method for transmitting ACK/NACK information of 4 bits using channel selection based on PUCCH Format 1b.

In the mapping embodiments 1 to 22, the ACK/NACK state for each CC is mapped to b0b1, and ACK/NACK information corresponding to a combination of b0b1 generated for each CC can be transmitted by channel selection. For example, it is assumed that the ACK/NACK state of CC0 is mapped to 01 and the ACK/NACK state of CC1 is mapped to 00, such that ACK/NACK information corresponding to 0100 for CC0 and CC1 needs to be transmitted to the BS. If PUCCH format 1b is used to transmit the ACK/NACK information, information bits capable of being carried by the PUCCH format 1b are 2 bits, such that it is impossible to transmit 4-bit information '0100' to the BS using only one PUCCH resource. Therefore, although the number of bits actually transmitted on one PUCCH resource is 2, two additional bits can be represented using channel selection. For example, if it is assumed that ACK/NACK transmission information capable of being carried by one PUCCH resource is composed of 2 bits, the UE selects one PUCCH resource from among four PUCCH resources, and the ACK/NACK transmission information is transmitted to the BS through the selected PUCCH resource, such that the ACK/NACK information of 4 bits can be transmitted to the BS. That is, 2 bits represented by the ACK/NACK transmission information and 2 bits represented by selection of one PUCCH resource from among 4 PUCCH resources may be fed back to the BS as ACK/NACK information for two CCs.

For reference, according to the above-mentioned mapping embodiments, if the ACK/NACK responses of four DL transmissions on each CC are mapped to 2-bit information 'b0b1' there may arise one case in which multiple ACK/NACK states are mapped to the same information 'b0b1'. For example, referring to the mapping embodiment 1 and Table 5, the bundled ACK (ACK/NACK state 1) of which the last detected PDCCH has DAI=00 and the other bundled ACK (ACK/NACK state 2) of which the last detected PDCCH has DAI=11 are equally mapped to 'b0b1=00'. In another example, as can be seen from the mapping embodiment 16 and Table 22, the ACK/NACK state 1 composed of ACK/NACK/DTX responses of [A, A, A, A] and the ACK/NACK state 2 composed of ACK/NACK/DTX responses of [A, D, D, D] are mapped to the same information 'b0b1'.

Assuming that multiple ACK/NACK states of any one of two CCs are mapped to the same information 'b0b1' if an ACK/NACK state of the other CC are constant, a combination of any one of the multiple ACK/NACK states and the constant ACK/NACK states is mapped to one ACK/NACK information. For example, referring to the mapping embodiment 16 and Table 22, provided that ACK/NACK responses for CC0 are set to [A, A, A, A] and an ACK/NACK state for CC1 is any one of 11, 10, 01, 00, and N/A (for example, 11), it is assumed that ACK/NACK information generated on the basis of the ACK/NACK state of the CC1 and the ACK/NACK state of the CC2 is set to X. Under the above-mentioned assumption, in so far as 'b0b1' mapped to the ACK/NACK responses of the CC1 is 11, although the ACK/NACK responses of the CC0 are denoted by [A, D, D, D] but not [A, A, A, A], the same ACK/NACK information X is generated. However, if it is assumed that ACK/NACK responses of the CC1 are mapped to 'b0b1' instead of '11' although the ACK/NACK response sequence of the CC0 is [A, A, A, A] or [A, D, D, D], a different value may be generated as ACK/NACK information for CC0 and CC1.

In the meantime, combinations of ACK/NACK states of a first CC mapped to some information bits and ACK/NACK states of a second CC mapped to the same information bits as those of the first CC are mapped to the same ACK/NACK information. For example, referring to the mapping embodiment 1 and Table 5, the ACK/NACK state 1 in which the bundled ACK/NACK response is ACK and the last detected DAI is 00 and the ACK/NACK state 2 in which the bundled ACK/NACK response is ACK and a DAI of the last detected PDCCH is 11 are mapped to 00. As a result, the same ACK/NACK information (e.g., 0000) can be generated from the combinations of CC0's ACK/NACK states and CC1's ACK/NACK states, i.e., (CC0=ACK/NACK state 1, CC1=ACK/NACK state 1), (CC0=ACK/NACK state 1, CC1=ACK/NACK state 2), (CC0=ACK/NACK state 2, CC1=ACK/NACK state 1), (CC0=ACK/NACK state 2, CC1=ACK/NACK state 2). In another example, referring to the mapping embodiment 1 and Table 22, [A, A, A, A] and [A, D, D, D] are mapped to the same information 'b0b1'. As a result, the same ACK/NACK information (for example, 1010) can be generated from the combination of CC0's ACK/NACK response sequences and CC1's ACK/NACK response sequences (i.e., ([A, A, A, A], [A, A, A, A]), ([A, A, A, A], [A, D, D, D]), ([A, D, D, D], [A, A, A, A]), and ([A, D, D, D], [A, D, D, D])).

As described above, in order to indicate ACK/NACK information of multiple CCs (for example, 2 CCs) using a limited size of transmission bits, channel selection may be used. For such channel selection, it is possible to configure the mapping table in which the mapping relationship among ACK/NACK information, and transmission resource(s) and transmission bit(s) of multiple CCs is defined.

For example, for convenience of description and better understanding of the present invention, it is assumed that 'b0b1' indicating ACK/NACK states of two CCs may be mapped to the mapping table for channel selection according to the following formats, and a detailed description thereof is as follows.

(1) '00' is a status for (mainly) indicating NACK(s), and may be mapped to an 'N,N' status of the channel selection mapping table.

(2) '01' is a status for (mainly) indicating one ACK, and may be mapped to an 'A,N' status of the channel selection mapping table.

(3) '10' is a status for (mainly) indicating two ACKs, and may be mapped to an 'N,A' status of the channel selection mapping table.

(4) '11' is a status for (mainly) indicating three ACKs, and may be mapped to an 'A,A' status of the channel selection mapping table.

For reference, 'N/A' indicates that information to be transmitted is not present in the corresponding CC. The mapping embodiments 1 to 22 have assumed that there is only one CC and the ACK/NACK state for the corresponding CC is mapped to 'N/A' and have described that no ACK/NACK transmission occurs in the corresponding CC. However, ACK/NACK information for one CC may be mapped to a specific status in such a manner that the ACK/NACK information can be transmitted in a different CC instead of the above-mentioned CC. If the ACK/NACK status for one CC is the 'N/A' status, i.e., if a current status is 'no transmission', ACK/NACK states for two CCs may be mapped to the 'D,D' (DTX) status.

Tables shown in the above-mentioned mapping embodiments 1 to 22 may be used to map the ACK/NACK status for each CC from among two CCs to any one of 'N,N', 'A,N', 'N,A', and 'A,A' (or any one of 'N,N', 'A,N', 'N,A', 'A,A', and 'D,D'). For example, Table 20 can be used to map ACK/NACK information of two CCs to the channel selection mapping table, as shown in the following Table 29.

TABLE 29

| For multiple ($U_{DAI} + N_{SPS}$) ACK/NACK responses | Mapped state(b0, b1 for the first CC/b2, b3 for the second CC) |
|---|---|
| Contiguous ACK-counter from the first PDSCH = 4 | A, N |
| Contiguous ACK-counter from the first PDSCH = 3 | A, A |
| Contiguous ACK-counter from the first PDSCH = 2 | N, A |
| Contiguous ACK-counter from the first PDSCH = 1 | A, N |
| Response for the first PDSCH is NACK | N, N |
| Otherwise | N, N |
| UE detects the first DL assignment is missed or no DL assignment is received. | D, D |

Table 29 (or Table 20) may be applied to the mapping table for channel selection. For example, if two CCs are configured, the b0,b1 (or HARQ-ACK(0), HARQ-ACK(1)) status is (logically) obtained from the ACK/NACK responses of a first CC according to Table 29, and the b2,b3 (or HARQ-ACK(2), HARQ-ACK(3)) status is (logically) obtained from the ACK/NACK responses of a second CC according to Table 29. In this case, the order of CCs may be predetermined, and may be determined by distinguishing PCell from SCell. For example, the b0,b1 (or HARQ-ACK(0), HARQ-ACK(1)) status may be configured from ACK/NACK responses of the PCell, and may be configured from ACK/NACK responses of the SCell. Thereafter, b0,b1,b2,b3 (or HARQ-ACK(0), HARQ-ACK(1), HARQ-ACK(2), HARQ-ACK(3)) can be transmitted using the channel selection mapping table used for 4-bit transmission. As previously stated in the mapping embodiments 1 to 22, Table 29 can be used only for the 4DL:1UL structure for one ACK/NACK feedback, or can also be equally applied to other structures such as the 3DL:1UL structure or the like.

For example, Table 30 or 31 may be used as the channel selection mapping table. Tables 30 and 31 exemplarily illustrate the channel selection mapping tables. Specifically, Table 30 exemplarily shows channel selection mapping tables that are capable of being applied to 1-bit, 2-bit, 3-bit, and 4-bit transmission. Table 31 exemplarily shows the universal channel selection mapping table capable of being applied to 1-bit, 2-bit, 3-bit, and 4-bit transmission.

TABLE 30

| HARQ-ACK (0) | HARQ-ACK (1) | HARQ-ACK (2) | HARQ-ACK (3) | $n^{(1,p)}_{PUCCHi}$ | Constellation (a0, a1) |
|---|---|---|---|---|---|
| ACK | ACK | ACK | ACK | $n^{(1)}_{PUCCH1}$ | 1, 1 |
| ACK | NACK/DTX | ACK | ACK | $n^{(1)}_{PUCCH2}$ | 0, 1 |
| NACK/DTX | ACK | ACK | ACK | $n^{(1)}_{PUCCH1}$ | 0, 1 |
| NACK/DTX | NACK/DTX | ACK | ACK | $n^{(1)}_{PUCCH3}$ | 1, 1 |
| ACK | ACK | ACK | NACK/DTX | $n^{(1)}_{PUCCH1}$ | 1, 0 |
| ACK | NACK/DTX | ACK | NACK/DTX | $n^{(1)}_{PUCCH2}$ | 0, 0 |

TABLE 30-continued

| HARQ-ACK (0) | HARQ-ACK (1) | HARQ-ACK (2) | HARQ-ACK (3) | $n^{(1,p)}_{PUCCHi}$ | Constellation (a0, a1) |
|---|---|---|---|---|---|
| NACK/DTX | ACK | ACK | NACK/DTX | $n^{(1)}_{PUCCH1}$ | 0, 0 |
| NACK/DTX | NACK/DTX | ACK | NACK/DTX | $n^{(1)}_{PUCCH3}$ | 1, 0 |
| ACK | ACK | NACK/DTX | ACK | $n^{(1)}_{PUCCH2}$ | 1, 1 |
| ACK | NACK/DTX | NACK/DTX | ACK | $n^{(1)}_{PUCCH2}$ | 1, 0 |
| NACK/DTX | ACK | NACK/DTX | ACK | $n^{(1)}_{PUCCH3}$ | 0, 1 |
| NACK/DTX | NACK/DTX | NACK/DTX | ACK | $n^{(1)}_{PUCCH3}$ | 0, 0 |
| ACK | ACK | NACK/DTX | NACK/DTX | $n^{(1)}_{PUCCH0}$ | 1, 1 |
| ACK | NACK/DTX | NACK/DTX | NACK/DTX | $n^{(1)}_{PUCCH0}$ | 1, 0 |
| NACK/DTX | ACK | NACK/DTX | NACK/DTX | $n^{(1)}_{PUCCH0}$ | 0, 1 |
| NACK/DTX | NACK | NACK/DTX | NACK/DTX | $n^{(1)}_{PUCCH0}$ | 0, 0 |
| NACK | NACK/DTX | NACK/DTX | NACK/DTX | $n^{(1)}_{PUCCH0}$ | 0, 0 |
| DTX | DTX | NACK/DTX | NACK/DTX | No Transmission | |

TABLE 31

| M bits ACK/NACK responses | | | | M = 4 | | | | | |
|---|---|---|---|---|---|---|---|---|---|
| | | | | M = 3 | | | | | |
| | | | | M = 2 | | | | | |
| | | | | M = 1 | | | | | |
| | | | | PCC b0 | PCC/SCC b1 | SCC b2 | SCC b3 | $n^{(1)}_{PUCCHi}$ | Constellation (a0, a1) |
| M = 4 | M = 3 | M = 2 | M = 1 | DTX | N/D | N/D | N/D | DTX | — |
| | | | | N | N/D | N/D | N/D | $n^{(1)}_{PUCCH0}$ | 1 |
| | | | | A | N/D | N/D | N/D | $n^{(1)}_{PUCCH0}$ | −1 |
| | | | | N/D | A | N/D | N/D | $n^{(1)}_{PUCCH1}$ | −j |
| | | | | A | A | N/D | N/D | $n^{(1)}_{PUCCH1}$ | j |
| | | | | N/D | N/D | A | N/D | $n^{(1)}_{PUCCH2}$ | 1 |
| | | | | A | N/D | A | N/D | $n^{(1)}_{PUCCH2}$ | j |
| | | | | N/D | A | A | N/D | $n^{(1)}_{PUCCH2}$ | −j |
| | | | | A | A | A | N/D | $n^{(1)}_{PUCCH2}$ | −1 |
| | | | | N/D | N/D | N/D | A | $n^{(1)}_{PUCCH3}$ | 1 |
| | | | | A | N/D | N/D | A | $n^{(1)}_{PUCCH0}$ | −j |
| | | | | N/D | A | N/D | A | $n^{(1)}_{PUCCH3}$ | j |
| | | | | A | A | N/D | A | $n^{(1)}_{PUCCH0}$ | j |
| | | | | N/D | N/D | A | A | $n^{(1)}_{PUCCH3}$ | −j |
| | | | | A | N/D | A | A | $n^{(1)}_{PUCCH3}$ | −1 |
| | | | | N/D | A | A | A | $n^{(1)}_{PUCCH1}$ | 1 |
| | | | | A | A | A | A | $n^{(1)}_{PUCCH1}$ | −1 |

In Tables 30 and 31, $n^{(1)}_{PUCCHi}$ indicates PUCCH resource (i) corresponding to the i-th PUCCH resource from among PUCCH resources available for channel selection. If four PUCCH resources are used for channel selection, the value of i is set to 0, 1, 2 and 3 (i=0, 1, 2, 3). In Table 31, $n^{(P)}_{PUCCHi}$=DTX indicates the 'N/A' (no transmission) status. On the other hand, (a0,a1) may indicate transmission information composed of 2 bits transmitted on one PUCCH resource. The 2-bit information is QPSK-modulated such that it is modulated into any one of four complex modulation symbols (1, −1, j, −j). That is, (a0,a1) may indicate transmission bits of 2 bits or constellation. The complex modulation symbols (1, −1, j, −j) may indicate the position in constellation of the transmission bits (a0, a1). For example, 2-bit transmission information (a0, a1) may be modulated into complex modulation modules according to Table 32, such that the modulated result can be transmitted in one PUCCH resource.

TABLE 32

| Modulation | Binary bits (a0, a1) | Modulation symbol |
|---|---|---|
| QPSK | 0, 0 | 1 |
| | 0, 1 | −j |

TABLE 32-continued

| Modulation | Binary bits (a0, a1) | Modulation symbol |
|---|---|---|
| | 1, 0 | j |
| | 1, 1 | −1 |

A method for transmitting ACK/NACK information of two or more CCs using channel selection will hereinafter be described with reference to the mapping relationship of the mapping embodiments. Although ACK/NACK information of two CCs is transmitted from the UE to the BS using channel selection according to the mapping embodiment 16, it should be noted that the following method can also be applied to other mapping embodiments without departing from the scope or spirit of the present invention.

Referring to either Table 20 or Table 22 based on Table 21 showing modification of Table 20, the number of combinations of ACK/NACK states capable of being generated for two CCs is 36, as represented by the following Table 33.

TABLE 33

| Case | ACK/NACK responses for first CC(b0, b1) | ACK/NACK responses for second CC(b2, b3) | Mapped state b0, b1, b2, b3 |
|---|---|---|---|
| 1 | A, A, A, A(A, N) | A, A, A, A(A, N) | A, N, A, N |
| 2 | A, A, A, A(A, N) | A, A, A, N/D(A, A) | A, N, A, A |
| 3 | A, A, A, A(A, N) | A, A, N/D, any(N, A) | A, N, N, A |
| 4 | A, A, A, A(A, N) | A, D, D, D(A, N) | A, N, A, N |
| 5 | A, A, A, A(A, N) | Otherwise(N, N) | A, N, N, N |
| 6 | A, A, A, A(A, N) | D, any, any, any(D, D) | A, N, D, D |
| 7 | A, A, A, N/D(A, A) | A, A, A, A(A, N) | A, A, A, N |
| 8 | A, A, A, N/D(A, A) | A, A, A, N/D(A, A) | A, A, A, A |
| 9 | A, A, A, N/D(A, A) | A, A, N/D, any(N, A) | A, A, N, A |
| 10 | A, A, A, N/D(A, A) | A, D, D, D(A, N) | A, A, A, N |
| 11 | A, A, A, N/D(A, A) | Otherwise(N, N) | A, A, N, A |
| 12 | A, A, A, N/D(A, A) | D, any, any, any(D, D) | A, A, D, D |
| 13 | A, A, N/D, any(N, A) | A, A, A, A(A, N) | N, A, A, N |
| 14 | A, A, N/D, any(N, A) | A, A, A, N/D(A, A) | N, A, A, A |
| 15 | A, A, N/D, any(N, A) | A, A, N/D, any(N, A) | N, A, N, A |
| 16 | A, A, N/D, any(N, A) | A, D, D, D(A, N) | N, A, A, N |
| 17 | A, A, N/D, any(N, A) | Otherwise(N, N) | N, A, N, N |
| 18 | A, A, N/D, any(N, A) | D, any, any, any(D, D) | N, A, D, D |
| 19 | A, D, D, D(A, N) | A, A, A, A(A, N) | A, N, A, N |
| 20 | A, D, D, D(A, N) | A, A, A, N/D(A, A) | A, N, A, A |
| 21 | A, D, D, D(A, N) | A, A, N/D, any(N, A) | A, N, N, A |
| 22 | A, D, D, D(A, N) | A, D, D, D(A, N) | A, N, A, N |
| 23 | A, D, D, D(A, N) | Otherwise(N, N) | A, N, N, N |
| 24 | A, D, D, D(A, N) | D, any, any, any(D, D) | A, N, D, D |
| 25 | Otherwise(N, N) | A, A, A, A(A, N) | N, N, A, N |
| 26 | Otherwise(N, N) | A, A, A, N/D(A, A) | N, N, A, A |
| 27 | Otherwise(N, N) | A, A, N/D, any(N, A) | N, N, N, A |
| 28 | Otherwise(N, N) | A, D, D, D(A, N) | N, N, A, N |
| 29 | Otherwise(N, N) | Otherwise(N, N) | N, N, N, N |
| 30 | Otherwise(N, N) | D, any, any, any(D, D) | N, N, D, D |
| 31 | D, any, any, any(D, D) | A, A, A, A(A, N) | D, D, A, N |
| 32 | D, any, any, any(D, D) | A, A, A, N/D(A, A) | D, D, A, A |
| 33 | D, any, any, any(D, D) | A, A, N/D, any(N, A) | D, D, N, A |
| 34 | D, any, any, any(D, D) | A, D, D, D(A, N) | D, D, A, N |
| 35 | D, any, any, any(D, D) | Otherwise(N, N) | D, D, N, N |
| 36 | D, any, any, any(D, D) | D, any, any, any(D, D) | D, D, D, D |

In Table 33, (N,N), (A,N), (N,A), (A,A), and (D,D) can be derived from five CC ACK/NACK states '00', '01', '10', '11', and 'N/A', respectively. In Table 31, based on the mapping relationship of M=4, the mapping relationship among (b0,b1,b2,b3), PUCCH resources and modulation symbols can be represented as follows.

TABLE 34

| Case | ACK/NACK responses for first CC(b0, b1) | ACK/NACK responses for second CC(b2, b3) | b0, b1, b2, b3 | $n^{(1)}_{PUCCHi}$ | Constellation (a0, a1) |
|---|---|---|---|---|---|
| 1 | A, A, A, A(A, N) | A, A, A, A(A, N) | A, N, A, N | $n^{(1)}_{PUCCH2}$ | j(1, 0) |
| 2 | A, A, A, A(A, N) | A, A, A, N/D(A, A) | A, N, A, A | $n^{(1)}_{PUCCH3}$ | −1(1, 1) |
| 3 | A, A, A, A(A, N) | A, A, N/D, any(N, A) | A, N, N, A | $n^{(1)}_{PUCCH0}$ | −j(0, 1) |
| 4 | A, A, A, A(A, N) | A, D, D, D(A, N) | A, N, A, N | $n^{(1)}_{PUCCH2}$ | j(1, 0) |
| 5 | A, A, A, A(A, N) | Otherwise(N, N) | A, N, N, N | $n^{(1)}_{PUCCH0}$ | −1(1, 1) |
| 6 | A, A, A, A(A, N) | D, any, any, any(D, D) | A, N, D, D | $n^{(1)}_{PUCCH0}$ | −1(1, 1) |
| 7 | A, A, A, N/D(A, A) | A, A, A, A(A, N) | A, A, A, N | $n^{(1)}_{PUCCH2}$ | −1(1, 1) |
| 8 | A, A, A, N/D(A, A) | A, A, A, N/D(A, A) | A, A, A, A | $n^{(1)}_{PUCCH1}$ | −1(1, 1) |
| 9 | A, A, A, N/D(A, A) | A, A, N/D, any(N, A) | A, A, N, A | $n^{(1)}_{PUCCH0}$ | j(1, 0) |
| 10 | A, A, A, N/D(A, A) | A, D, D, D(A, N) | A, A, A, N | $n^{(1)}_{PUCCH2}$ | −1(1, 1) |
| 11 | A, A, A, N/D(A, A) | Otherwise(N, N) | A, A, N, A | $n^{(1)}_{PUCCH0}$ | j(1, 0) |
| 12 | A, A, A, N/D(A, A) | D, any, any, any(D, D) | A, A, D, D | $n^{(1)}_{PUCCH1}$ | 1(1, 0) |
| 13 | A, A, N/D, any(N, A) | A, A, A, A(A, N) | N, A, A, N | $n^{(1)}_{PUCCH2}$ | −j(0, 1) |
| 14 | A, A, N/D, any(N, A) | A, A, A, N/D(A, A) | N, A, A, A | $n^{(1)}_{PUCCH1}$ | 1(0, 0) |
| 15 | A, A, N/D, any(N, A) | A, A, N/D, any(N, A) | N, A, N, A | $n^{(1)}_{PUCCH3}$ | j(1, 0) |
| 16 | A, A, N/D, any(N, A) | A, D, D, D(A, N) | N, A, A, N | $n^{(1)}_{PUCCH2}$ | −j(0, 1) |
| 17 | A, A, N/D, any(N, A) | Otherwise(N, N) | N, A, N, N | $n^{(1)}_{PUCCH1}$ | −j(0, 1) |
| 18 | A, A, N/D, any(N, A) | D, any, any, any(D, D) | N, A, D, D | $n^{(1)}_{PUCCH1}$ | −j(0, 1) |
| 19 | A, D, D, D(A, N) | A, A, A, A(A, N) | A, N, A, N | $n^{(1)}_{PUCCH2}$ | j(1, 0) |
| 20 | A, D, D, D(A, N) | A, A, A, N/D(A, A) | A, N, A, A | $n^{(1)}_{PUCCH3}$ | −1(1, 1) |
| 21 | A, D, D, D(A, N) | A, A, N/D, any(N, A) | A, N, N, A | $n^{(1)}_{PUCCH0}$ | −j(0, 1) |
| 22 | A, D, D, D(A, N) | A, D, D, D(A, N) | A, N, A, N | $n^{(1)}_{PUCCH2}$ | j(1, 0) |
| 23 | A, D, D, D(A, N) | Otherwise(N, N) | A, N, N, N | $n^{(1)}_{PUCCH0}$ | −1(1, 1) |
| 24 | A, D, D, D(A, N) | D, any, any, any(D, D) | A, N, D, D | $n^{(1)}_{PUCCH0}$ | −1(1, 1) |
| 25 | Otherwise(N, N) | A, A, A, A(A, N) | N, N, A, N | $n^{(1)}_{PUCCH2}$ | 1(0, 0) |
| 26 | Otherwise(N, N) | A, A, A, N/D(A, A) | N, N, A, A | $n^{(1)}_{PUCCH3}$ | −j(0, 1) |
| 27 | Otherwise(N, N) | A, A, N/D, any(N, A) | N, N, N, A | $n^{(1)}_{PUCCH3}$ | 1(0, 0) |

TABLE 34-continued

| Case | ACK/NACK responses for first CC(b0, b1) | ACK/NACK responses for second CC(b2, b3) | b0, b1, b2, b3 | $n^{(1)}_{PUCCHi}$ | Constellation (a0, a1) |
|---|---|---|---|---|---|
| 28 | Otherwise(N, N) | A, D, D, D(A, N) | N, N, A, N | $n^{(1)}_{PUCCH2}$ | 1(0, 0) |
| 29 | Otherwise(N, N) | Otherwise(N, N) | N, N, N, N | $n^{(1)}_{PUCCH0}$ | 1(0, 0) |
| 30 | Otherwise(N, N) | D, any, any, any(D, D) | N, N, D, D | $n^{(1)}_{PUCCH0}$ | 1(0, 0) |
| 31 | D, any, any, any(D, D) | A, A, A, A(A, N) | D, D, A, N | $n^{(1)}_{PUCCH2}$ | 1(0, 0) |
| 32 | D, any, any, any(D, D) | A, A, A, N/D(A, A) | D, D, A, A | $n^{(1)}_{PUCCH3}$ | −j(0, 1) |
| 33 | D, any, any, any(D, D) | A, A, N/D, any(N, A) | D, D, N, A | $n^{(1)}_{PUCCH3}$ | 1(0, 0) |
| 34 | D, any, any, any(D, D) | A, D, D, D(A, N) | D, D, A, N | $n^{(1)}_{PUCCH2}$ | 1(0, 0) |
| 35 | D, any, any, any(D, D) | Otherwise(N, N) | D, D, N, N | DTX | — |
| 36 | D, any, any, any(D, D) | D, any, any, any(D, D) | D, D, D, D | DTX | — |

In Tables 33 and 34, 'A' indicates an ACK response, 'N' is a NACK response, 'N/D' is a NACK/DTX response, 'D' is a DTX response, and 'any' is an arbitrary response. In addition, the remaining ACK/NACK sequences other than [A, A, A, A], [A, A, A, N/D], [A, A, N/D, any], [A, D, D, D], and [D, any, any, any] may pertain to the 'Otherwise' sequences.

In Table 34, (a0,a1) is derived from Table 31 showing the mapping relationship between constellation modulation symbols (also called only constellation) and binary bits.

Referring to Table 34, if (b0, b1, b2, b3) is the same, the same (b0, b1, b2, b3) is modulated into the same complex modulation symbol and transmitted one the same PUCCH resource. If (b0, b1, b2, b3) is the same, this means the same ACK/NACK information to be fed back. For example, although Cases 1, 4, 19, and 22 shown in Table 34 have different ACK/NACK response sequences, ACK/NACK information indicating the cases 1, 4, 19 or 22 is configured in the form of transmission bits (1, 0) and is transmitted using a PUCCH resource having a PUCCH resource index $n^{(1)}_{PUCCH2}$.

FIG. 39 shows some parts of Table 34. From among the cases shown in Table 34, FIG. 39 shows some parts of cases in which ACK/NACK state of one of the CCs is corresponding to [A, A, A, A] or [A, D, D, D].

Referring to FIG. 39, if the ACK/NACK state of a first CC (or a second CC) is constant, the ACK/NACK states [A, A, A, A] and [A, D, D, D] of the other CC are mapped to the same information bits on the same PUCCH resource or modulation symbols of the same constellation, thereby indicating the same ACK/NACK information. For example, in Case 7, ACK/NACK responses of the first CC are arranged in the order of A A A N/D (i.e., [A, A, A, N/D]), and ACK/NACK responses of the second CC are arranged in the order of A A A A (i.e., [A, A, A, A]). Although ACK/NACK responses of the first CC of the Case 10 are [A, A, A, N/D] as those of the Case 7, ACK/NACK responses of the second CC are [A, D, D, D] different from those of the Case 7. However, the mapping embodiments of the present invention considers the ACK/NACK states, each of which is mapped to the same information bits (b0, b1), to be identical to one another. According to the mapping embodiment 16, [A, A, A, A] and [A, D, D, D] are mapped to the same information bits. Therefore, if sequences of ACK/NACK responses of the first CC are constant, the ACK/NACK sequences [A, A, A, A] and [A, D, D, D] of the second CC are mapped to the same transmission information (a0, a1) of the same PUCCH resource, thereby obtaining the same ACK/NACK information values. Referring to FIG. 39, Case 7 and Case 10 are mapped to (a0,a1)= (1,1) of the same PUCCH resource ($n^{(1)}_{PUCCH2}$), ACK/NACK information transmitted to the BS becomes identical. In another example, in Case 3 and Case 21, the ACK/NACK sequences [A, A, A, A] and [A, D, D, D] of the first CC are mapped to the same transmission information (a0,a1)=(1,0) on the same PUCCH resource ($n^{(1)}_{PUCCH2}$), because the ACK/NACK sequence of the second CC is [A, A, N/D, any]. As a result, the same ACK/NACK information is transmitted to the BS.

If ACK/NACK sequences of one CC from among two CCs are identical, ACK/NACK information that is fed back to the BS on the basis of the ACK/NACK sequence of the one CC and the ACK/NACK sequence [A, A, A, A] of the remaining CCs must be identical to ACK/NACK information that is fed back to the BS on the basis of the ACK/NACK sequence of the one CC and the ACK/NACK sequence [A, D, D, D] of the remaining CCs. For example, referring to Case 7 and Case 10, since ACK/NACK information corresponding to the ACK/NACK sequence [A, A, A, N/D] of the first CC and the ACK/NACK sequence [A, A, A, A] of the second CC is identical to ACK/NACK information corresponding to the ACK/NACK sequence [A, A, A, N/D] of the first CC and the ACK/NACK sequence [A, A, A, A] of the second CC, ACK/NACK information of the case 7 and ACK/NACK information of the case 10 are mapped to the same information (a0,a1) and are transmitted on the same PUCCH resource, such that it can be recognized that the same ACK/NACK information is transmitted to the BS.

In the meantime, it is assumed that the ACK/NACK sequence of one CC from among two CCs is [A, A, A, A] or [A, D, D, D], and the ACK/NACK sequence of the remaining CC is [A, A, A, A] or [A, D, D, D]. In this case, a total of combinations of available ACK/NACK sequences is 4, the four combinations are mapped to the same transmission bits (a0, a1) of the same PUCCH resource, such that the same ACK/NACK information for the four combinations is transmitted to the BS. In accordance with one embodiment of the present invention, [A, A, A, A] and [A, D, D, D] are considered to have the same state. Therefore, referring to FIG. 39, ACK/NACK information pieces based on Case 1, Case 2, Case 19 and Case 22 are identical to one another. ACK/NACK information corresponding to Case 1, Case 2, Case 19 and Case 22 is modulated into the same information (a0, a1) (for example, 10), and the modulated ACK/NACK information is transmitted to the BS. In addition, ACK/NACK information corresponding to Case 1, Case 2, Case 19 and Case 22 is identical, such that the ACK/NACK information is transmitted on the same PUCCH resource (for example, PUCCH resource corresponding to $n^{(1)}_{PUCCH2}$).

The mapping table for channel selection is predefined in the BS and the UE. In case of ACK/NACK transmission based on channel selection, the ACK/NACK information is specified by PUCCH resource selection+transmission bits (or constellation modulation symbol) carried on PUCCH resource. Therefore, the BS can recognize ACK/NACK information transmitted by the UE on the basis of a PUCCH received from the UE and ACK/NACK transmission information carried by the PUCCH. For example, referring to FIG. 39, if the BS receives information of (a0,a1)=(0,1) on a PUCCH resource corresponding to $n^{(1)}{}_{PUCCH0}$, the BS can recognize that ACK/NACK information fed back by the UE on the basis of the mapping table stored in the BS corresponds to Case 3 or Case 21. That is, based on '(a0,a1)=(0,1)' received through the PUCCH resource corresponding to $n^{(1)}{}_{PUCCH0}$, the BS may determine that the UE has detected ACK/NACK responses of [A, A, A, A] or [A, D, D, D] on the first CC and has detected ACK/NACK responses of [A, A, N/D, any] on the second CC. In this case, if the BS performs DL transmission in each of four subframes through the first CC, the probability of the responses [A, D, D, D] is very low. Therefore, the BS can interpret the ACK/NACK feedback for the first CC as [A, A, A, A]. In addition, if the BS performs DL transmissions only in three preceding subframes through a first CC, the BS determines that the ACK/NACK feedback of [A, A, A, A] is impossible, so it can determine that the UE has detected ACK/NACK responses of [A, D, D, D] in the first CC.

In another example, referring to FIG. 39, if the BS receives (a0,a1)=(1,0) through a PUCCH resource corresponding to $n^{(1)}{}_{PUCCH0}$, the BS can determine that the ACK/NACK responses detected in the first and second CCs by the UE are any one of Case 1, 4, 19 or 22.

The BS may determine whether to retransmit DL transmission(s) transmitted through the first CC and/or the second CC upon receiving ACK/NACK information from the UE. For example, if the BS transmits four PDCCH and/or SPS PDSCHs through the second CC and receives ACK/NACK information corresponding to [A, D, D, D], the BS may retransmit the remaining DL transmissions other than the first DL transmission corresponding to ACK to the UE. However, in the case of DL transmission determined to be a DTX status, the DL transmission may be determined to be DTX not only when the DL transmission arrive at the UE although the BS has transmitted the DL transmission, but also when the BS has not allocated the DL transmission to the UE and thus the DL transmission has not been transmitted to the UE. Therefore, although a current status is determined to be the DTX status, PDCCH and/or SPS PDSCH not scheduled to the UE by the BS may not be retransmitted.

Referring to the cases of FIG. 39, the ACK/NACK state of a CC may be [A, A, A, A] or [A, D, D, D]. In this case, the BS may determine that the ACK/NACK state of the corresponding CC is [A, A, A, A], such that no retransmission of each DL transmission transmitted through the corresponding CC may occur. As previously stated in the mapping embodiment 16, the probability of generating [A, D, D, D] is very low.

The BS processor 400b configures one or more CCs for the UE, and may transmit/allocate DL transmission(s) (PDCCH(s) and/or SPS PDSCH, etc.) for the UE on the one or more CCs. The BS processor 400b may control the BS transmitter 100b in such a manner that DL transmission(s) assigned to the corresponding CC can be transmitted through each CC.

The UE receiver 300a receives one or more DL CCs from the BS, and receives DL transmission(s) such as PDCCH(s) and/or SPS PDSCH(s) through the one or more DL CCs. The UE receiver 300a may receive or detect DL CC(s).

The UE processor 400a according to an embodiment of the present invention can detect ACK/NACK response(s) for one or more DL transmission(s) for each CC, that must be simultaneously transmitted as one ACK/NACK feedback. For example, if ACK/NACK responses for four DL transmissions transmitted on each CC need to be simultaneously transmitted in the form of one ACK/NACK feedback, the UE processor 400a may control the UE receiver 300a to detect ACK/NACK responses of each of the four DL transmissions through each CC.

The UE processor 400a may control the UE transmitter 100a using the ACK/NACK responses detected in each CC such that ACK/NACK information of one or more CCs can be transmitted as one ACK/NACK feedback to the BS. For example, if two CCs are configured for the UE, ACK/NACK responses detected in each of the two CCs are configured as one ACK/NACK information, such that the resultant ACK/NACK information can be transmitted to the BS at one UL transmission time point. The UE processor 400a may determine that the ACK/NACK responses detected in the order of [A, A, A, A] are identical to the ACK/NACK responses detected in the order of [A, D, D, D]. In other words, if ACK/NACK responses of other CCs are identical, information as to whether the ACK/NACK state of one CC is [A, A, A, A] or [A, D, D, D] does not affect the configuration of ACK/NACK information to be fed back to the BS. For example, referring to Table 34 or FIG. 39, if the ACK/NACK sequences of one CC are identical as shown in Case 3, Case 21, Case 13 or Case 16, ACK/NACK sequences [A, A, A, A] and [A, D, D, D] of other CCs are mapped to the same information bits, and the information bits are modulated into the corresponding complex modulation symbol and then transmitted to the BS via the same PUCCH resource.

The UE processor 400a can select a PUCCH resource for ACK/NACK information of multiple CCs and generate transmission information (a0, a1) using the channel selection mapping table. The UE processor 400a can control the UE transmitter 100a to transmit the transmission information (a0, a1) on the selected PUCCH resource. The UE processor 400a can control the modulation mapper 305 in such a manner that the transmission information (a0, a1) is modulated into a complex modulation symbol using QPSK modulation. The UE transmitter 100a may transmit the complex modulation symbol on the selected PUCCH resource under the control of the UE processor 400a.

The BS processor 400b already knows DL subframe(s) for which one ACK/NACK feedback is performed, and knows which UL subframe will be used by the UE to transmit ACK/NACK information for the DL subframe(s). Therefore, the BS processor 400b controls the BS receiver 300b, such that the BS processor 400b can monitor, in the UL subframe, several PUCCH resources available to transmit the ACK/NACK information by the UE. The BS receiver 300b may receive ACK/NACK information transmitted from the UE from any one of the PUCCH resources.

Based on the PUCCH resource on which the UE's ACK/NACK information is fed back and the value of (a0, a1) transmitted on the PUCCH resource, the BS processor 400b may determine whether one or more CCs (for example, DL transmission(s) transmitted through two CCs) of the DL subframe(s) has been successfully received by the UE. The BS processor 400b may determine the ACK/NACK state for each CC according to one of the embodiments on the basis of ACK/NACK information received from the UE. If ACK/NACK information of two CCs is transmitted to the BS using channel selection, the BS processor 400b may determine ACK/NACK information having been transmitted by the UE using a PUCCH resource used for the UE's CK/NACK feedback and transmission information carried by the PUCCH resource. By means of the channel selection mapping table, the BS processor 400b may determine the ACK/NACK state of each CC corresponding to the ACK/NACK information having been transmitted from the UE. For example, referring to Table 34 or FIG. 39, the BS processor 400b may recognize that ACK/NACK information of two CCs is any one of Cases 1, 4, 19 and 22, on the basis of transmission information of (a0,a1)=(1,0) in PUCCH resource $n^{(1)}{}_{PUCCH0}$ from among PUCCH resources $n^{(1)}_{PUCCH0}$, $n^{(1)}_{PUCCH1}$, $n^{(1)}_{PUCCH2}$, and $n^{(1)}_{PUCCH3}$ from the UE receiver 300a.

The BS processor 400b may control the BS transmitter 100b in such a manner that the UE can perform retransmission of failed DL transmission(s). In addition, in relation to DL transmission having been successfully received by the UE, the BS processor 400b assigns new DL transmission without retransmission of the DL transmission, and may transmit the new DL transmission to the UE by controlling the BS transmitter 100b. If the ACK/NACK state of the CC is [A, A, A, A] or [A, D, D, D], or if the number of subframes in which DL transmission is performed through the CC is 4, the BS processor 400b may consider the ACK/NACK state of the CC to be [A, A, A, A] or [A, D, D, D], or new DL transmission may be assigned to the CC. For example, referring to Table 34 or FIG. 39, if the BS receiver 300b receives information corresponding to (a0,a1)=(1,1) through PUCCH resource $n^{(1)}_{PUCCH3}$, and if the number of subframes in which the BS performs DL transmission through the CC is 4, the BS processor 400b may determine the ACK/NACK responses of the first CC to be [A, A, A, A] or may determine the ACK/NACK responses of the second CC to be [A, A, A, N/D]. The BS processor 400b may control the BS memory 200b to empty packets corresponding to first to third DL transmissions of the second CC, and may assign at least one DL transmission to the second CC. The BS processor 400b may control the BS transmitter 100b to retransmit the fourth DL transmission. The BS processor 400b may control the BS memory 200b to empty packets of DL transmission having been transmitted on the first CC, and may assign new DL transmission to the first CC.

Provided that the BS transmitter 100b performs DL transmission only in three or less preceding subframes in a time domain from among DL subframes for one ACK/NACK feedback through a CC (alternatively, the BS transmitter performs DL transmission in DL subframe(s) excluding the last subframe of a time domain from among DL subframes for one ACK/NACK feedback), if the CC ACK/NACK state may be [A, A, A, A] or [A, D, D, D], the BS processor 400b determines the ACK/NACK state to be [A, A, A, A] because the CC ACK/NACK state [A, A, A, A] cannot occur, and may assign retransmission or new DL transmission to the CC according to DL transmission or non-transmission. For example, referring to Table 34 and FIG. 39, although the BS receiver 300b has received ACK/NACK information of (a0,a1)=(1,1) over PUCCH resource $n^{(1)}_{PUCCH3}$, if the last subframe from among subframes for one ACK/NACK feedback is not used for DL transmission through the first CC, ACK/NACK responses of the first CC cannot be [A, A, A, A]. As a result, the BS processor 400b may determine that the ACK/NACK responses of the first CC are [A, D, D, D] and the ACK/NACK responses of the second CC are [A, A, A, N/D]. The BS processor 400b may assign retransmission or new DL transmission to the first CC according to DL transmission or non-transmission on the first CC. The BS processor 400b may control the BS memory 200b to empty packets corresponding to the first to third DL transmissions on the second CC, and may assign at least one new DL transmission to the second CC. The BS processor 400b may control the BS transmitter 100b to retransmit fourth DL transmission.

In the above-mentioned embodiments, one of multiple CCs may be a PCC and the remaining CC(s) may be SCC(s). If two CCs are configured, one CC may be a PCC and the other one may be an SCC. In Table 34, the first CC may be a PCC and the second CC may be an SCC. In addition, the PCC and the SCC may be referred to as a PCell and an SCell, respectively.

In the above-mentioned embodiments, a plurality of PUCCH resources available for channel selection may be implicitly determined by a predetermined rule on the basis of resources (for example, $n_{CCE}$ resources) used for associated PDCCH transmission, or may be a specific value that is determined by a higher layer of the BS and be signaled to the UE. Alternatively, based on resources used for PDCCH transmission and a value provided to the UE by higher layer signaling of the BS, the plurality of PUCCH resources may be determined according to a predetermined rule as necessary. In any case, since the UE can recognize PUCCH resources to be used for ACK/NACK feedback, the BS can monitor the PUCCH resources and can recognize additional bit information on the basis of which PUCCH resource from among the plurality of PUCCH resources has been used to transmit the UE's ACK/NACK information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The embodiments of the present invention can be applied to a BS, a UE, or other communication devices in a wireless communication system.

The invention claimed is:

1. A method for transmitting, by a user equipment (UE), uplink control information to a base station (BS) in a wireless communication system, the method comprising:
   detecting a first ACKnowledgement (ACK)/Negative ACK (NACK)/Discontinuous Transmission (DTX) response sequence [x(0), x(1), x(2), x(3)] for 4 downlink (DL) transmissions on a first carrier, where x(i) is an ACK/NACK/DTX response for an i-th DL transmission on the first carrier;
   detecting a second ACK/NACK/DTX response sequence [y(0), y(1), y(2), y(3)] for 4 DL transmissions on a second carrier, where y(i) is an ACK/NACK/DTX response for an i-th DL transmission on the second carrier;
   performing channel selection, by selecting one of a plurality of physical uplink control channel (PUCCH) resources and generating transmission bits for ACK/NACK information of the first and second carriers, based on the first and second ACK/NACK/DTX response sequences; and
   transmitting the generated transmission bits on the selected PUCCH resource,
   wherein the channel selection is performed according to a mapping table and the manning table includes a mapping relationship shown in the following table:

TABLE

| ACK/NACK/DTX response sequence for primary cell | ACK/NACK/DTX response sequence for secondary cell | PUCCH resource | a0, a1 |
|---|---|---|---|
| ACK, ACK, ACK, ACK | ACK, ACK, ACK, ACK | $n^{(1)}_{PUCCH2}$ | 1, 0 |
| ACK, ACK, ACK, ACK | ACK, ACK, ACK, NACK/DTX | $n^{(1)}_{PUCCH3}$ | 1, 1 |
| ACK, ACK, ACK, ACK, | ACK, ACK, NACK/DTX, any | $n^{(1)}_{PUCCH0}$ | 0, 1 |
| ACK, ACK, ACK, ACK | ACK, DTX, DTX, DTX | $n^{(1)}_{PUCCH2}$ | 1, 0 |
| ACK, ACK, ACK, NACK/DTX | ACK, ACK, ACK, ACK | $n^{(1)}_{PUCCH2}$ | 1, 1 |
| ACK, ACK, ACK, NACK/DTX | ACK, DTX, DTX, DTX | $n^{(1)}_{PUCCH2}$ | 1, 1 |
| ACK, ACK, NACK/DTX, any | ACK, ACK, ACK, ACK | $n^{(1)}_{PUCCH2}$ | 0, 1 |
| ACK, ACK, NACK/DTX, any | ACK, DTX, DTX, DTX | $n^{(1)}_{PUCCH2}$ | 0, 1 |

TABLE-continued

| ACK/NACK/DTX response sequence for primary cell | ACK/NACK/DTX response sequence for secondary cell | PUCCH resource | a0, a1 |
|---|---|---|---|
| ACK, DTX, DTX, DTX | ACK, ACK, ACK, ACK | $n^{(1)}_{PUCCH2}$ | 1, 0 |
| ACK, DTX, DTX, DTX | ACK, ACK, ACK, NACK/DTX | $n^{(1)}_{PUCCH3}$ | 1, 1 |
| ACK, DTX, DTX, DTX | ACK, ACK, NACK/DTX, any | $n^{(1)}_{PUCCH0}$ | 0, 1 |
| ACK, DTX, DTX, DTX | ACK, DTX, DTX, DTX | $n^{(1)}_{PUCCH2}$ | 1, 0 | wherein "$n^{(1)}_{PUCCHi}$" is a PUCCH resource i ($0 \leq i \leq 3$) from among the plurality of PUCCH resources, and "a0, a1" denotes transmission bits, and wherein one of the first and second carriers is the primary cell and the other is the secondary cell.

2. The method according to claim 1, wherein same transmission bits are generated for cases shown in the following table:

| Case | x(0), x(1), x(2), x(3) | y(0), y(1), y(2), y(3) |
|---|---|---|
| 1 | ACK, ACK, ACK, ACK | ACK, ACK, ACK, ACK |
| 2 | ACK, ACK, ACK, ACK | ACK, DTX, DTX, DTX |
| 3 | ACK, DTX, DTX, DTX | ACK, ACK, ACK, ACK |
| 4 | ACK, DTX, DTX, DTX | ACK, DTX, DTX, DTX. |

3. The method according to claim 2, wherein a same PUCCH resource is selected for the cases 1 to 4.

4. A method for receiving, by a base station (BS), uplink (UL) control information from a user equipment (UE) in a wireless communication system, the method comprising:

transmitting a first carrier and a second carrier to the user equipment (UE); and receiving, from the user equipment (UE), transmission bits corresponding to ACKnowledgement (ACK)/Negative ACK (NACK) information of the first and second carriers on one of a plurality of physical uplink control channel (PUCCH) resources, wherein the transmission bits received from the UE and the one PUCCH resource on which the transmission bits are received correspond to a first ACK/NACK/Discontinuous Transmission (DTX) response sequence [x(0), x(1), x(2), x(3)] for the first carrier detected by the UE, where x(i) is an ACK/NACK/DTX response for an i-th DL transmission on the first carrier, and a second ACK/NACK/DTX response sequence [y(0), y(1), y(2), y(3)] for the second carrier detected by the UE, where y(i) is an ACK/NACK/DTX response for an i-th DL transmission on the second carrier, wherein the transmission bits for ACK/NACK information of the first and second carriers are generated by the UE which performs channel selection based on the first and second ACK/NACK/DTX response sequences by selecting one of a plurality of physical unlink control channel (PUCCH) resources, and the generated transmission bits are received from the UE on the one PUCCH resource, wherein the first and second ACK/NACK/DTX response sequences are determined using a mapping table, and the mapping table includes a mapping relationship shown in the following table:

TABLE

| ACK/NACK/DTX response sequence for primary cell | ACK/NACK/DTX response sequence for secondary cell | PUCCH resource | a0, a1 |
|---|---|---|---|
| ACK, ACK, ACK, ACK | ACK, ACK, ACK, ACK | $n^{(1)}_{PUCCH2}$ | 1, 0 |
| ACK, ACK, ACK, ACK | ACK, ACK, ACK, NACK/DTX | $n^{(1)}_{PUCCH3}$ | 1, 1 |
| ACK, ACK, ACK, ACK, | ACK, ACK, NACK/DTX, any | $n^{(1)}_{PUCCH0}$ | 0, 1 |
| ACK, ACK, ACK, ACK | ACK, DTX, DTX, DTX | $n^{(1)}_{PUCCH2}$ | 1, 0 |
| ACK, ACK, ACK, NACK/DTX | ACK, ACK, ACK, ACK | $n^{(1)}_{PUCCH2}$ | 1, 1 |
| ACK, ACK, ACK, NACK/DTX | ACK, DTX, DTX, DTX | $n^{(1)}_{PUCCH2}$ | 1, 1 |
| ACK, ACK, NACK/DTX, any | ACK, ACK, ACK, ACK | $n^{(1)}_{PUCCH2}$ | 0, 1 |
| ACK, ACK, NACK/DTX, any | ACK, DTX, DTX, DTX | $n^{(1)}_{PUCCH2}$ | 0, 1 |
| ACK, DTX, DTX, DTX | ACK, ACK, ACK, ACK | $n^{(1)}_{PUCCH2}$ | 1, 0 |
| ACK, DTX, DTX, DTX | ACK, ACK, ACK, NACK/DTX | $n^{(1)}_{PUCCH3}$ | 1, 1 |
| ACK, DTX, DTX, DTX | ACK, ACK, NACK/DTX, any | $n^{(1)}_{PUCCH0}$ | 0, 1 |
| ACK, DTX, DTX, DTX | ACK, DTX, DTX, DTX | $n^{(1)}_{PUCCH2}$ | 1, 0, | wherein "$n^{(1)}_{PUCCHi}$" is a PUCCH resource i ($0 \leq i \leq 3$) from among the plurality of PUCCH resources, and "a0, a1" denotes transmission bits, and wherein one of the first and second carriers is the primary cell and the other is the secondary cell.

5. A user equipment (UE) for transmitting uplink (UL) control information to a base station (BS) in a wireless communication system, the user equipment (UE) comprising:

a receiver configured to:

receive a first ACKnowledgement (ACK)/Negative ACK (NACK)/Discontinuous Transmission (DTX) response sequence [x(0), x(1), x(2), x(3)] for 4 downlink (DL) transmissions on a first carrier, where x(i) is an ACK/NACK/DTX response for an i-th DL transmission on the first carrier, and receive a second ACK/NACK/DTX response sequence [y(0), y(1), y(2), y(3)] for 4 DL transmissions on a second carrier, where y(i) is an ACK/NACK/DTX response for an i-th DL transmission on the second carrier;

a processor configured to perform channel selection by selecting one of a plurality of physical uplink control channel (PUCCH) resources and generating transmission bits for ACK/NACK information of the first and second carriers, based on the first and second ACK/NACK/DTX response sequences; and a transmitter configured to transmit the generated transmission bits on the selected PUCCH resource, the processor further configured to control the receiver and transmitter, and perform the channel selection using a mapping table, wherein the mapping table includes a mapping relationship shown in the following table:

TABLE

| ACK/NACK/DTX response sequence for primary cell | ACK/NACK/DTX response sequence for secondary cell | PUCCH resource | a0, a1 |
|---|---|---|---|
| ACK, ACK, ACK, ACK | ACK, ACK, ACK, ACK | $n^{(1)}_{PUCCH2}$ | 1, 0 |
| ACK, ACK, ACK, ACK | ACK, ACK, ACK, NACK/DTX | $n^{(1)}_{PUCCH3}$ | 1, 1 |
| ACK, ACK, ACK, ACK, | ACK, ACK, NACK/DTX, any | $n^{(1)}_{PUCCH0}$ | 0, 1 |
| ACK, ACK, ACK, ACK | ACK, DTX, DTX, DTX | $n^{(1)}_{PUCCH2}$ | 1, 0 |
| ACK, ACK, ACK, NACK/DTX | ACK, ACK, ACK, ACK | $n^{(1)}_{PUCCH2}$ | 1, 1 |
| ACK, ACK, ACK, NACK/DTX | ACK, DTX, DTX, DTX | $n^{(1)}_{PUCCH2}$ | 1, 1 |
| ACK, ACK, NACK/DTX, any | ACK, ACK, ACK, ACK | $n^{(1)}_{PUCCH2}$ | 0, 1 |
| ACK, ACK, NACK/DTX, any | ACK, DTX, DTX, DTX | $n^{(1)}_{PUCCH2}$ | 0, 1 |
| ACK, DTX, DTX, DTX | ACK, ACK, ACK, ACK | $n^{(1)}_{PUCCH2}$ | 1, 0 |
| ACK, DTX, DTX, DTX | ACK, ACK, ACK, NACK/DTX | $n^{(1)}_{PUCCH3}$ | 1, 1 |
| ACK, DTX, DTX, DTX | ACK, ACK, NACK/DTX, any | $n^{(1)}_{PUCCH0}$ | 0, 1 |
| ACK, DTX, DTX, DTX | ACK, DTX, DTX, DTX | $n^{(1)}_{PUCCH2}$ | 1, 0, | wherein "$n^{(1)}_{PUCCHi}$" is a PUCCH resource i ($0 \le i \le 3$) from among the plurality of PUCCH resources, and "a0, a1" denotes transmission bits, and wherein one of the first and second carriers is the primary cell and the other is the secondary cell.

6. The user equipment (UE) according to claim 5, wherein the processor is configured to generate same transmission bits for cases shown in the following table:

TABLE

| Case | x(0), x(1), x(2), x(3) | y(0), y(1), y(2), y(3) |
|---|---|---|
| 1 | ACK, ACK, ACK, ACK | ACK, ACK, ACK, ACK |
| 2 | ACK, ACK, ACK, ACK | ACK, DTX, DTX, DTX |
| 3 | ACK, DTX, DTX, DTX | ACK, ACK, ACK, ACK |
| 4 | ACK, DTX, DTX, DTX | ACK, DTX, DTX, DTX. |

7. The user equipment (UE) according to claim 6, wherein the processor is configured to select same PUCCH resource for the cases 1 to 4.

8. A base station (BS) for receiving uplink (UL) control information from a user equipment (UE) in a wireless communication system, the base station (BS) comprising:

a transmitter configured to transmit a first carrier and a second carrier to the user equipment (UE);

a receiver configured to receive transmission bits corresponding to ACKnowledgement (ACK)/Negative ACK (NACK) information of the first and second carriers on one of a plurality of physical uplink control channel (PUCCH) resources from the UE; and a processor configured to control the transmitter and receiver, wherein the transmission bits received from the UE and the one PUCCH resource on which the transmission bits are received correspond to a first ACK/NACK/Discontinuous Transmission (DTX) response sequence [x(0), x(1), x(2), x(3)] for the first carrier detected by the UE, where x(i) is an ACK/NACK/DTX response for an i-th DL transmission on the first carrier, and a second ACK/NACK/DTX response sequence [y(0), y(1), y(2), y(3)] for the second carrier detected by the UE, where y(i) is an ACK/NACK/DTX response for an i-th DL transmission on the second carrier, wherein the transmission bits for ACK/NACK information of the first and second carriers are generated by the UE which performs channel selection based on the first and second ACK/NACK/DTX response sequences by selecting one of a plurality of physical uplink control channel (PUCCH) resources, and the generated transmission bits are received from the UE on the one PUCCH resource, and wherein the first and second ACK/NACK/DTX response sequences are determined using a mapping table, and the mapping table includes a mapping relationship shown in the following table:

TABLE

| ACK/NACK/DTX response sequence for primary cell | ACK/NACK/DTX response sequence for secondary cell | PUCCH resource | a0, a1 |
|---|---|---|---|
| ACK, ACK, ACK, ACK | ACK, ACK, ACK, ACK | $n^{(1)}_{PUCCH2}$ | 1, 0 |
| ACS, ACK, ACK, ACK | ACK, ACK, ACK, NACK/DTX | $n^{(1)}_{PUCCH3}$ | 1, 1 |
| ACK, ACK, ACK, ACK, | ACK, ACK, NACK/DTX, any | $n^{(1)}_{PUCCH0}$ | 0, 1 |
| ACK, ACK, ACK, ACK | ACK, DTX, DTX, DTX | $n^{(1)}_{PUCCH2}$ | 1, 0 |
| ACK, ACK, ACK, NACK/DTX | ACK, ACK, ACK, ACK | $n^{(1)}_{PUCCH2}$ | 1, 1 |
| ACK, ACK, ACK, NACK/DTX | ACK, DTX, DTX, DTX | $n^{(1)}_{PUCCH2}$ | 1, 1 |
| ACK, ACK, NACK/DTX, any | ACK, ACK, ACK, ACK | $n^{(1)}_{PUCCH2}$ | 0, 1 |
| ACK, ACK, NACK/DTX, any | ACK, DTX, DTX, DTX | $n^{(1)}_{PUCCH2}$ | 0, 1 |
| ACK, DTX, DTX, DTX | ACK, ACK, ACK, ACK | $n^{(1)}_{PUCCH2}$ | 1, 0 |
| ACK, DTX, DTX, DTX | ACK, ACK, ACK, NACK/DTX | $n^{(1)}_{PUCCH3}$ | 1, 1 |

TABLE-continued

| ACK/NACK/DTX response sequence for primary cell | ACK/NACK/DTX response sequence for secondary cell | PUCCH resource | a0, a1 |
| --- | --- | --- | --- |
| ACK, DTX, DTX, DTX | ACK, ACK, NACK/DTX, any | $n^{(1)}_{PUCCH0}$ | 0, 1 |
| ACK, DTX, DTX, DTX | ACK, DTX, DTX, DTX | $n^{(1)}_{PUCCH2}$ | 1, 0, | wherein "$n^{(1)}_{PUCCHi}$" is a PUCCH resource i ($0 \leq i \leq 3$) from among the plurality of PUCCH resources, and "a0, a1" indicates transmission bits, and wherein one of the first and second carriers is the primary cell and the other is the secondary cell.

* * * * *